(12) United States Patent
Takeuchi et al.

(10) Patent No.: US 6,574,987 B2
(45) Date of Patent: Jun. 10, 2003

(54) EJECTOR CYCLE SYSTEM WITH CRITICAL REFRIGERANT PRESSURE

(75) Inventors: Hirotsugu Takeuchi, Nagoya (JP); Hiroshi Ishikawa, Kariya (JP); Kunio Iritani, Anjo (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 10/201,057

(22) Filed: Jul. 23, 2002

(65) Prior Publication Data

US 2002/0184903 A1 Dec. 12, 2002

Related U.S. Application Data

(62) Division of application No. 09/805,414, filed on Mar. 13, 2001, now Pat. No. 6,477,857.

(30) Foreign Application Priority Data

| Mar. 15, 2000 | (JP) | 2000-77827 |
| Aug. 4, 2000 | (JP) | 2000-237344 |
| Sep. 8, 2000 | (JP) | 2000-273585 |
| Dec. 20, 2000 | (JP) | 2000-387618 |
| Jan. 12, 2001 | (JP) | 2000-5196 |

(51) Int. Cl.$^7$ .............. F25B 1/06; F25B 43/00
(52) U.S. Cl. .................. 62/500; 62/512
(58) Field of Search .............. 62/175, 191, 500, 62/503, 512, 84, 471

(56) References Cited

U.S. PATENT DOCUMENTS

| 1,836,318 A | * | 12/1931 | Gay .................. 62/116 |
| 3,277,660 A | | 10/1966 | Kemper et al. .......... 62/191 |
| 3,447,339 A | * | 6/1969 | Rietdijk .............. 62/500 |
| 3,456,456 A | | 7/1969 | Rietdijk .............. 62/500 |
| 3,464,230 A | * | 9/1969 | Rietdijk .............. 62/500 |
| 3,488,678 A | * | 1/1970 | Wagner .............. 62/503 |
| 3,496,735 A | * | 2/1970 | Haisma .............. 62/500 |
| 3,670,519 A | | 6/1972 | Newton .............. 62/116 |
| 3,701,264 A | | 10/1972 | Newton .............. 61/191 |
| 4,187,695 A | * | 2/1980 | Schumacher ......... 62/503 |
| 4,484,457 A | * | 11/1984 | Mugele .............. 62/500 |
| 4,528,822 A | | 7/1985 | Glamm .............. 62/238.7 |
| 5,245,836 A | | 9/1993 | Lorentzen et al. |
| 5,343,711 A | | 9/1994 | Kornhauser et al. ...... 62/116 |
| 5,493,875 A | | 2/1996 | Kozinski ............ 62/503 |
| 5,551,255 A | * | 9/1996 | Rothfleisch .......... 62/502 |

FOREIGN PATENT DOCUMENTS

| EP | 0 487 002 | 11/1991 |
| JP | A-4-316962 | 6/1926 |
| JP | A-6-11197 | 1/1994 |
| JP | A-10-205898 | 8/1998 |

* cited by examiner

Primary Examiner—William C. Doerrler
(74) Attorney, Agent, or Firm—Harness, Dickey & Pierce, PLC

(57) ABSTRACT

In an ejector cycle system using carbon dioxide as refrigerant, an ejector decompresses and expands refrigerant from a radiator to suck gas refrigerant evaporated in an evaporator, and converts an expansion energy to a pressure energy to increase a refrigerant pressure to be sucked into a compressor. Because refrigerant is decompressed and expanded in a super-critical area, a pressure difference during the decompression operation becomes larger, and a specific enthalpy difference becomes larger. Accordingly, energy converting efficiency in the ejector becomes higher, and efficiency of the ejector cycle system is improved.

11 Claims, 43 Drawing Sheets

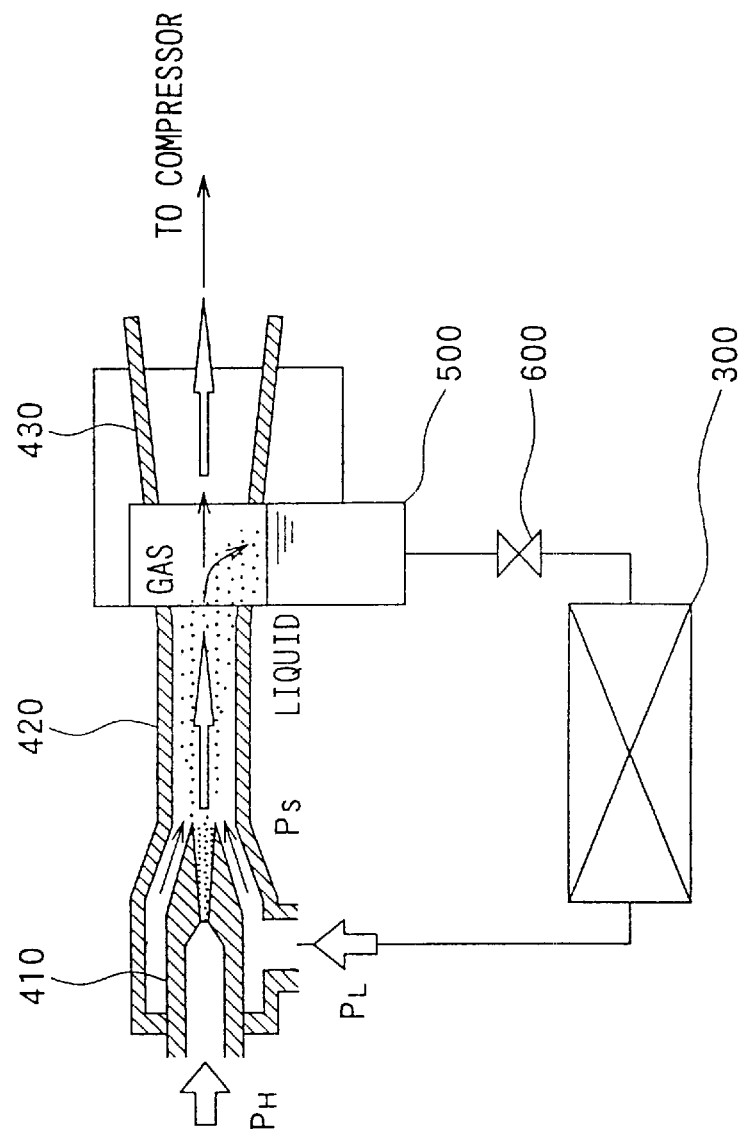

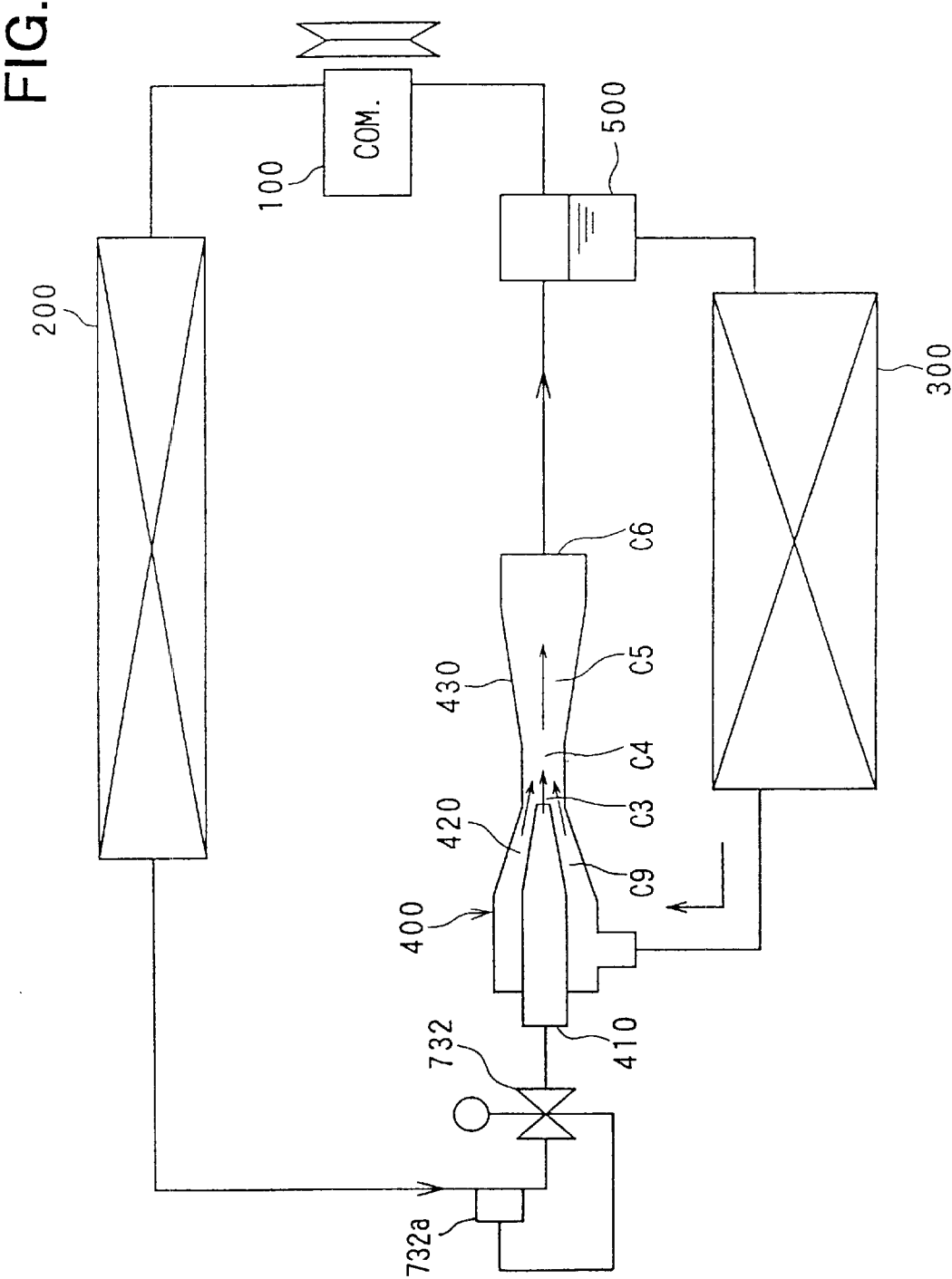

EJECTOR CYCLE SYSTEM WITH CRITICAL REFRIGERANT PRESSURE

CROSS-REFERENCE TO RELATED APPLICATION

This application is a divisional application of Ser. No. 09/805,414, filed Mar. 13, 2001 and relates to Japanese Patent Applications No. 2000-77827 filed on Mar. 15, 2000, No. 2000-237344 filed on Aug. 4, 2000, No. 2000-273585 filed on Sep. 8, 2000, No. 2000-387618 filed on Dec. 20, 2000, and No. 2001-5196 filed on Jan. 12, 2001, the contents of which are hereby incorporated by reference.

BACKGROUND OF THE INVENTION

1. Field of the Invention

The present invention relates to an ejector cycle system with a high-pressure side refrigerant pressure equal to or higher than the critical pressure of refrigerant. The ejector cycle system has an ejector in which high-pressure side refrigerant is decompressed and expanded so that gas refrigerant evaporated in an evaporator is sucked therein, and a refrigerant pressure sucked into a compressor is increased by converting an expansion energy to a pressure energy.

2. Description of Related Art

In recent years, instead of flon refrigerant, the other refrigerant is used in a vapor compression refrigerant cycle. For example, U.S. Pat. No. 5,245,836 describes a vapor compression refrigerant cycle using carbon dioxide. However, in this case, because it is necessary to increase high-pressure side refrigerant pressure to be equal to or higher than the critical pressure, a necessary power for operating a compressor becomes larger, and coefficient of performance of the refrigerant cycle is decreased.

SUMMARY OF THE INVENTION

In view of the foregoing problems, it is an object of the present invention to provide an ejector cycle system with a high-pressure side refrigerant pressure equal to or higher than a critical pressure, which improves coefficient of performance (COP) of a refrigerant cycle.

According to the present invention, an ejector cycle system includes a compressor for sucking and compressing refrigerant, a radiator for cooling refrigerant discharged from the compressor, an evaporator in which refrigerant is evaporated by absorbing heat, an ejector which decompresses and expands refrigerant from the radiator to suck gas refrigerant evaporated in the evaporator and converts an expansion energy to a pressure energy to increase a refrigerant pressure to be sucked into the compressor, and a gas-liquid separator for storing refrigerant and for separating refrigerant into gas refrigerant and liquid refrigerant. In the refrigerant cycle system, a refrigerant pressure before being decompressed in the ejector is equal to or higher than the critical pressure of refrigerant. When refrigerant is used in a super-critical area (trans-critical area), a ratio of a specific enthalpy difference to a pressure change ($\Delta P$) becomes larger, and a pressure difference during the decompression and expansion becomes larger, as compared with a case using flon as refrigerant. Thus, in the present invention, the expansion energy is sufficiently recovered during the decompression. Further, in the ejector, the pressure of refrigerant discharged from the ejector is increased from a middle pressure higher than a pressure within the evaporator to a pressure lower than the critical pressure. Therefore, consumption power of the compressor can be reduced. In the super-critical area of refrigerant, because a density of gas refrigerant is approximately equal to that of liquid refrigerant, refrigerant decompressed and expanded in the ejector has approximately equal speed in both gas refrigerant and liquid refrigerant. For example, when carbon dioxide is used as refrigerant, an ejector efficiency is increased approximately twice, as compared with a case where flon is used as refrigerant. As a result, in the ejector cycle of the present invention, because the refrigerant pressure before being decompressed in the ejector is equal to or higher than the critical pressure of refrigerant, the coefficient of performance of the ejector cycle system can be improved.

Preferably, the gas-liquid separator is disposed so that gas refrigerant in the gas-liquid separator is supplied toward a suction side of the compressor and liquid refrigerant in the gas-liquid separator is supplied to the evaporator, and the ejector cycle system further includes a heating unit which heats refrigerant sucked into the compressor. Therefore, temperature of refrigerant sucked into the compressor can be increased, the refrigerant temperature discharged from the compressor is also increased, and the radiator capacity and the efficiency of the ejector cycle system can be improved.

Preferably, an ejector efficiency control unit is provided to control a converting efficiency of the energy in the ejector. Further, flow amount adjusting means for adjusting a flow amount of refrigerant flowing into the ejector is provided. Thus, the ejector cycle system operates while the ejector efficiency is improved.

Further, a control valve is disposed in a refrigerant passage of the ejector cycle system so that refrigerant pressure before being decompressed in the ejector is equal to or higher the critical pressure of refrigerant. Therefore, the ejector cycle system operates while the ejector efficiency is improved. preferably, the control valve and the ejector are integrated. Therefore, the structure of the ejector cycle system can be made simple. More preferably, the ejector includes a nozzle in which a pressure energy of high-pressure refrigerant flowing from the radiator is converted to a speed energy so that refrigerant is decompressed and expanded, and a pressure increasing portion in which the speed energy is converted to the pressure energy so that the pressure of refrigerant is increased while refrigerant discharged from the nozzle and refrigerant sucked from the evaporator are mixed. The control valve can be integrated with the nozzle of the ejector.

Preferably, the gas-liquid separator has a tank portion in which refrigerant is stored while gas refrigerant and liquid refrigerant are separated from each other, and a part of the ejector is integrated with the tank portion. For example, the ejector is disposed so that refrigerant flows within the ejector from a lower side upwardly, and the ejector is integrated with the tank portion so that an outlet of the ejector is positioned upper than a liquid surface of refrigerant within the tank portion. In this case, a collision wall to which refrigerant flowing from the outlet of the ejector collides can be provided. Alternatively, the ejector is integrated with the tank portion so that the outlet of the ejector is positioned upper than the liquid surface of refrigerant within the tank portion, and refrigerant discharged from the outlet of the ejector collides with an inner wall surface of the tank portion.

BRIEF DESCRIPTION OF THE DRAWINGS

Additional objects and advantages of the present invention will be more readily apparent from the following detailed description of preferred embodiments when taken together with the accompanying drawings, in which:

FIG. 6 is a schematic diagram showing a main part of an ejector cycle system according to a fourth preferred embodiment of the present invention;

FIG. 29 is a schematic diagram showing an ejector cycle system according to an eighteenth preferred embodiment of the present invention;

DETAILED DESCRIPTION OF THE PRESENTLY PREFERRED EMBODIMENTS

Preferred embodiments of the present invention will be described hereinafter with reference to the accompanying drawings.

A first preferred embodiment of the present invention will be now described with reference to FIGS. 1–3. In the first embodiment, an ejector cycle system of the present invention is typically applied to a reference cycle using carbon dioxide as refrigerant, for a vehicle air conditioner.

Figure 1:
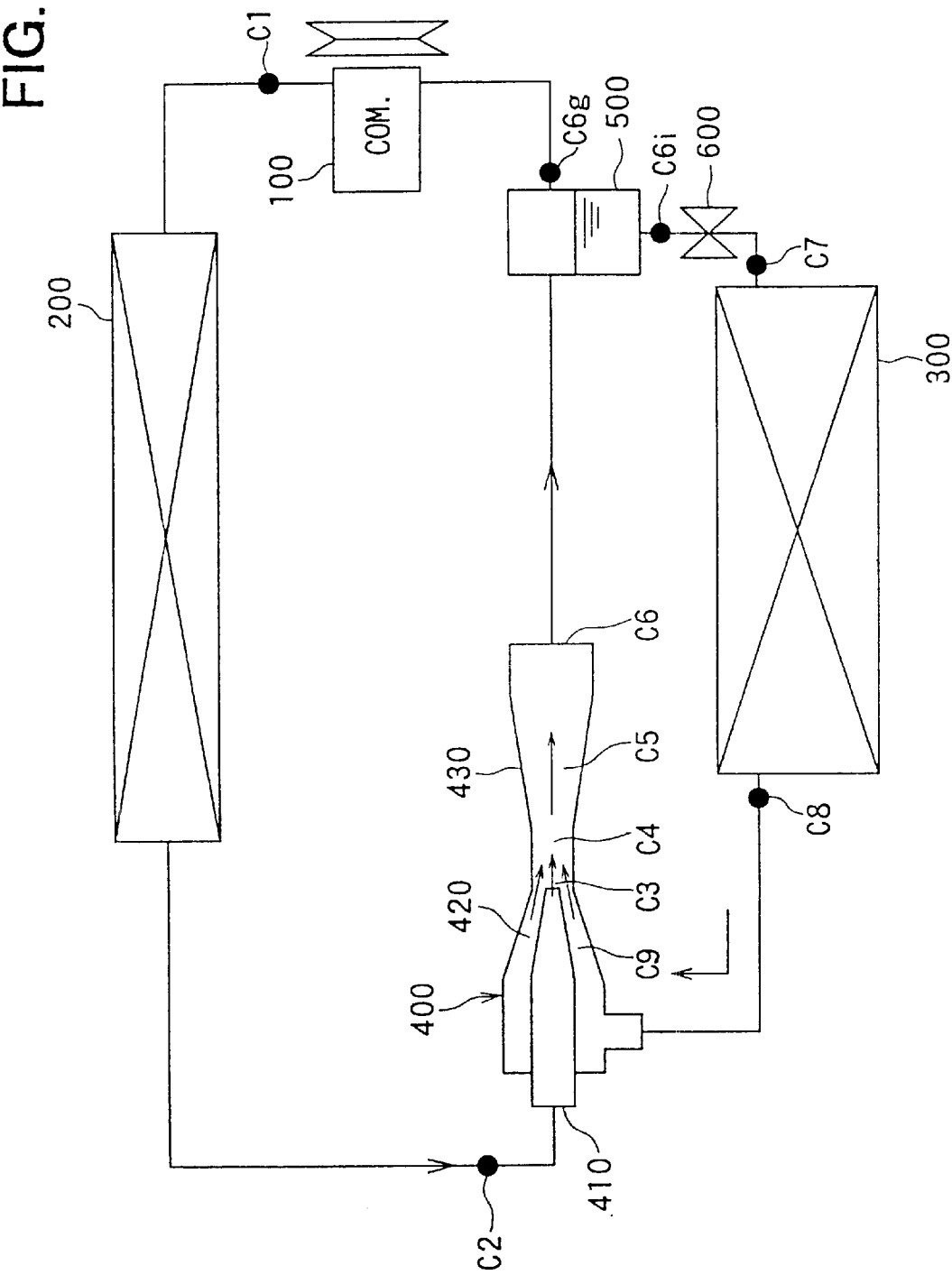
FIG. 1 is a schematic diagram of an ejector cycle system according to a first preferred embodiment of the present invention.

As shown in FIG. 1, a compressor 100 which sucks and compresses refrigerant using a driving force from a driving source such as a vehicle engine is disposed in the ejector cycle system. A radiator 200 (gas cooler) is disposed so that refrigerant discharged from the compressor 100 is heat-exchanged with outside air outside a passenger compartment and is cooled by outside air.

An evaporator 300 is disposed in the ejector cycle system so that air blown into the passenger compartment and liquid refrigerant flowing through the evaporator 300 are heat-exchanged. In the evaporator 300, cooling capacity can be obtained by the evaporation of liquid refrigerant. Refrigerant from the radiator 200 is decompressed and expanded in an ejector 400, and evaporated gas refrigerant is sucked into the ejector 400. The ejector 400 decompresses and expands refrigerant from the radiator 200 so that gas refrigerant evaporated in the evaporator 300 is sucked therein, and converts an expansion energy to a pressure energy to increase a sucked refrigerant pressure of the compressor 100.

The ejector 400 includes a nozzle 410 which decompresses and expands refrigerant by converting a pressure energy (pressure head) of high-pressure side refrigerant flowing from the radiator 200 to a speed energy (speed head), a mixing portion 420 in which gas refrigerant evaporated in the evaporator 300 is sucked by a high-speed refrigerant flow (jet flow) discharged from the nozzle 410, and a diffuser 430 in which the speed energy is converted to the pressure energy so that the refrigerant pressure to be sucked into the compressor 100 is increased while refrigerant from the nozzle 410 and refrigerant sucked from the evaporator 300 are mixed.

A gas-liquid separator 500 is disposed so that refrigerant discharged from the ejector 400 flows into the gas-liquid separator 500. The gas-liquid separator 500 stores refrigerant therein, and refrigerant from the ejector 400 is separated into gas refrigerant and liquid refrigerant. Separated gas refrigerant in the gas-liquid separator 500 is sucked into the compressor 100, and separated liquid refrigerant in the gas-liquid separator 500 is sucked toward the evaporator 300. A first decompression unit 600 is disposed between the gas-liquid separator 500 and the evaporator 300 so that liquid refrigerant flowing from the gas-liquid separator 600 to the evaporator 300 is decompressed. By the first decompression unit 600, pressure (evaporation pressure) within the evaporator 300 can be sufficiently reduced.

Next, operation of the ejector cycle system according to the first embodiment will be now described. When the compressor 100 operates, gas refrigerant is sucked from the gas-liquid separator 500 into the compressor 100, and compressed refrigerant having a high pressure equal to or higher than the critical pressure of refrigerant is discharged to the radiator 200. Refrigerant is cooled in the radiator 200, and flows into the ejector 400. Refrigerant from the radiator 200 is decompressed and expanded in the nozzle 410 of the ejector 400, and gas refrigerant in the evaporator 300 is sucked into the mixing portion 420 due to the high-speed jet flow of refrigerant from the nozzle 410. While refrigerant sucked from the evaporator 300 and refrigerant jetted from the nozzle 410 are mixed in the mixing portion 420, the dynamic pressure (speed energy) of refrigerant is converted to the static pressure (pressure energy) of refrigerant in the diffuser 430. Thereafter, refrigerant from the ejector 400 flowing into the gas-liquid separator 500.

On the other hand, because gas refrigerant within the evaporator 300 is sucked into the ejector 400, liquid refrigerant in the gas-liquid separator 500 flows into the evaporator 300, and evaporates in the evaporator 300 by absorbing heat from air blown into the passenger compartment.

Figure 2:
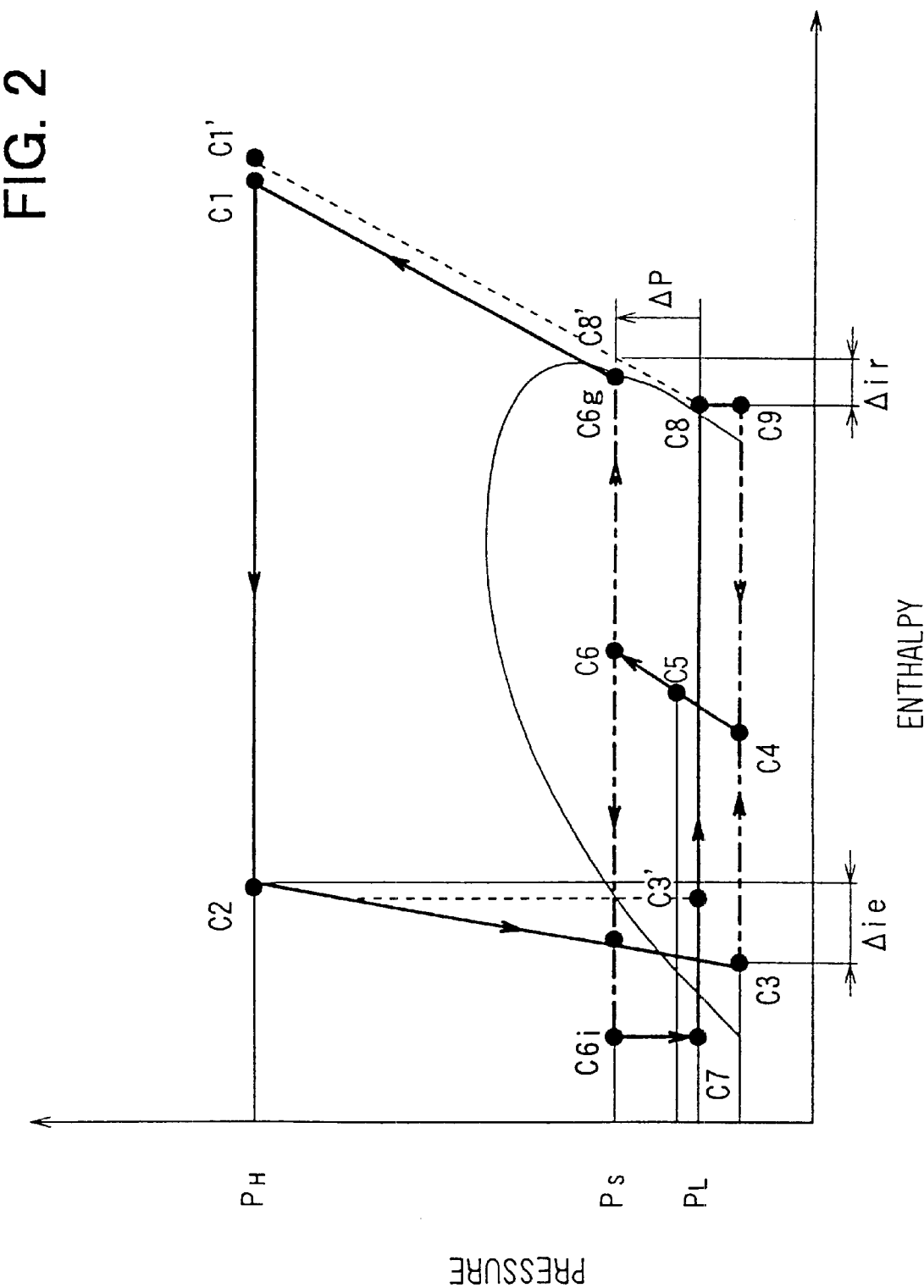
FIG. 2 is a Mollier diagram of the ejector cycle system using carbon dioxide as refrigerant, according to the first embodiment.
Figure 3:
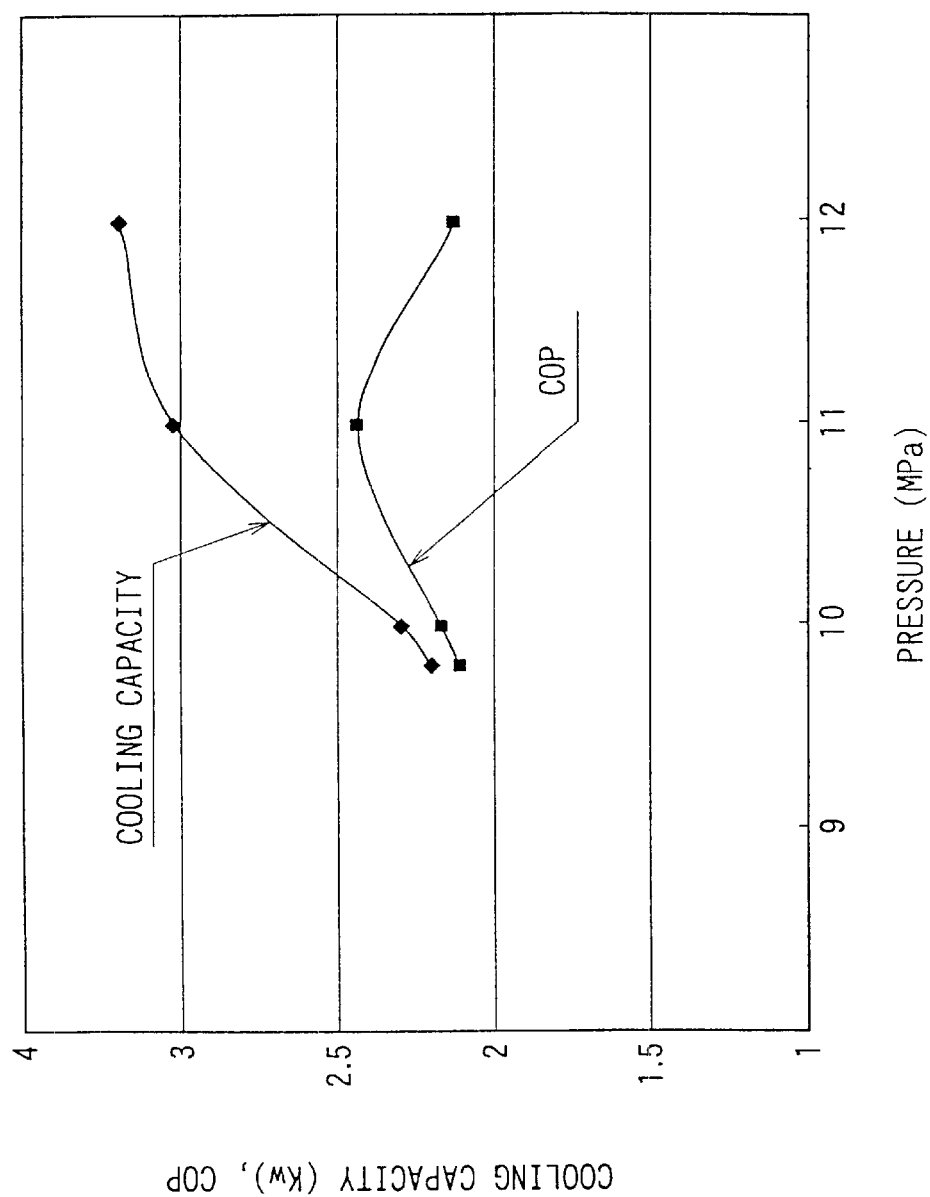
FIG. 3 is a graph showing relationships between a high-pressure side refrigerant pressure, coefficient of performance (COP) and cooling capacity, according to the first embodiment.

FIG. 2 is a Mollier diagram (p-h diagram) showing operation of the ejector cycle system according to the first embodiment. In FIG. 2, refrigerant states of different positions (e.g., C1, C2 . . . ) shown in FIG. 1 are indicated. An increased pressure $\Delta P$ of suction refrigerant pressure of the compressor 100 is changed in accordance with operation efficiency of the mixing portion 420 and the diffuser 430, and becomes larger as a specific enthalpy difference between refrigerant at a refrigerant inlet (the point shown by C2 in FIG. 1) of the nozzle 410 and refrigerant at a refrigerant outlet (the point shown by C3 in FIG. 1) of the nozzle 410 becomes larger.

In the first embodiment, because carbon dioxide is used as refrigerant, refrigerant pressure is increased to a supercritical area by the compressor 100, and then is decompressed by the nozzle 410 of the ejector 400. Accordingly, the pressure difference of refrigerant before decompression and after decompression becomes larger, and the specific enthalpy difference (adiabatic heat drop) between refrigerant of the refrigerant inlet (the C2 point in FIGS. 1 and 2) of the nozzle 410 and refrigerant of the refrigerant outlet (the C3 point in FIGS. 1 and 2) of the nozzle 410 becomes larger. In the first embodiment, because the expansion energy generated during the refrigerant decompression can be accurately sufficiently recovered, the pressure difference of refrigerant before decompression and after decompression becomes larger. Therefore, the increased pressure (changed pressure) $\Delta P$ of suction refrigerant pressure of the compressor 100 can be increased, and coefficient of performance of the ejector cycle system can be improved.

Because gas refrigerant has a density approximately equal to that of liquid refrigerant in the super-critical area, gas refrigerant and liquid refrigerant decompressing and expanding in the nozzle 410 of the ejector 400 are accelerated to an approximately equal speed. Therefore, in the super-critical area of refrigerant, an energy conversion efficiency at the nozzle 410 of the ejector 400 becomes higher. For example, it is compared with a case where flon is used as refrigerant, the energy conversion efficiency can be improved approximately twice. Therefore, in the first embodiment, the expansion energy generated in the refrigerant decompression operation can be sufficiently recovered.

The isentropic curve of carbon dioxide from the critical point to the saturated liquid line has a large ratio of an enthalpy variation amount ($\Delta h$) to a pressure variation amount ($\Delta P$) as compared with that of flon. Therefore, in the ejector cycle system using carbon dioxide as refrigerant, when refrigerant is decompressed and expanded in the ejector 400, the specific enthalpy difference (adiabatic heat drop) between refrigerant at the refrigerant inlet of the nozzle 410 and refrigerant at the refrigerant inlet of the diffuser 430 can be made larger, as compared with an ejector cycle system using flon as refrigerant.

According to the first embodiment, in the ejector cycle system using carbon dioxide as refrigerant, the coefficient of performance (efficiency) of ejector cycle system can be improved. FIG. 3 shows relationships between the performance coefficient (COP), a cooling capacity in the evaporator 300, and a high-pressure side refrigerant pressure before being decompressed in the nozzle 410 of the ejector 400. As shown in FIG. 3, as the high-pressure side refrigerant pressure increases, the cooling capacity increases. However, when the high-pressure side refrigerant pressure increases excessively, the coefficient of performance (COP) of the ejector cycle system is decreased. Accordingly, in the first embodiment, the shape and the size of the nozzle 410 of the ejector 400, a discharge amount of refrigerant from the compressor 100 and the like can be adjusted, so that a high-pressure side refrigerant pressure at which the coefficient of performance (COP) becomes larger can be maintained.

Figure 4:
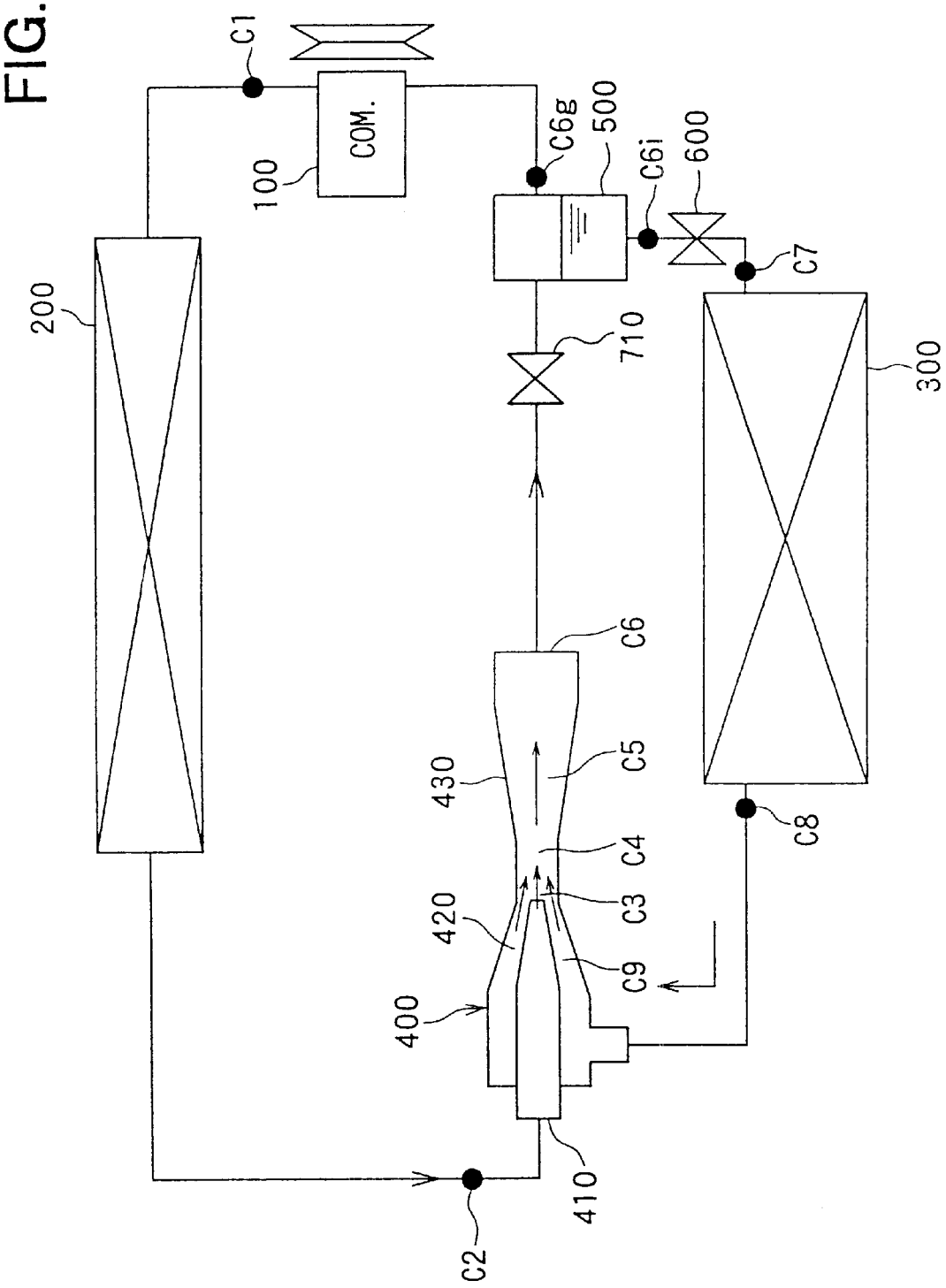
FIG. 4 is a schematic diagram of an ejector cycle system according to a second preferred embodiment of the present invention.

A second preferred embodiment of the present invention will be now described with reference to FIG. 4. In the second embodiment, as shown in FIG. 4, a second decompression unit 710, which reduces the refrigerant pressure increased in the diffuser 430 of the ejector 400, is disposed at a downstream side of the ejector 400. Therefore, the increased pressure of refrigerant in the diffuser 430 of the ejector 400 is decompressed in the second decompression unit 710 to have a predetermined decompressed pressure lower than the critical pressure. Thereafter, refrigerant having the predetermined decompressed pressure lower than the critical pressure flows into the gas-liquid separator 500 to be sufficiently separated into gas refrigerant and liquid refrigerant.

In the ejector cycle system using carbon dioxide as refrigerant, because the high-pressure side refrigerant pressure is equal to or higher than the super-critical pressure (trans-critical pressure), the refrigerant pressured is charged from the diffuser 430 may become equal to or higher than the critical pressure. In this case, it is difficult to separate refrigerant into gas refrigerant and liquid refrigerant within the gas-liquid separator 500, and it is difficult to supply liquid refrigerant from the gas-liquid separator 500 to the evaporator 300. However, according to the second embodiment, because the second decompression unit 710 is disposed between the ejector 400 and the gas-liquid separator 500, the pressure of refrigerant increased in the diffuser 430 of the ejector 400 can be adjusted to become lower than the critical pressure.

Figure 5:
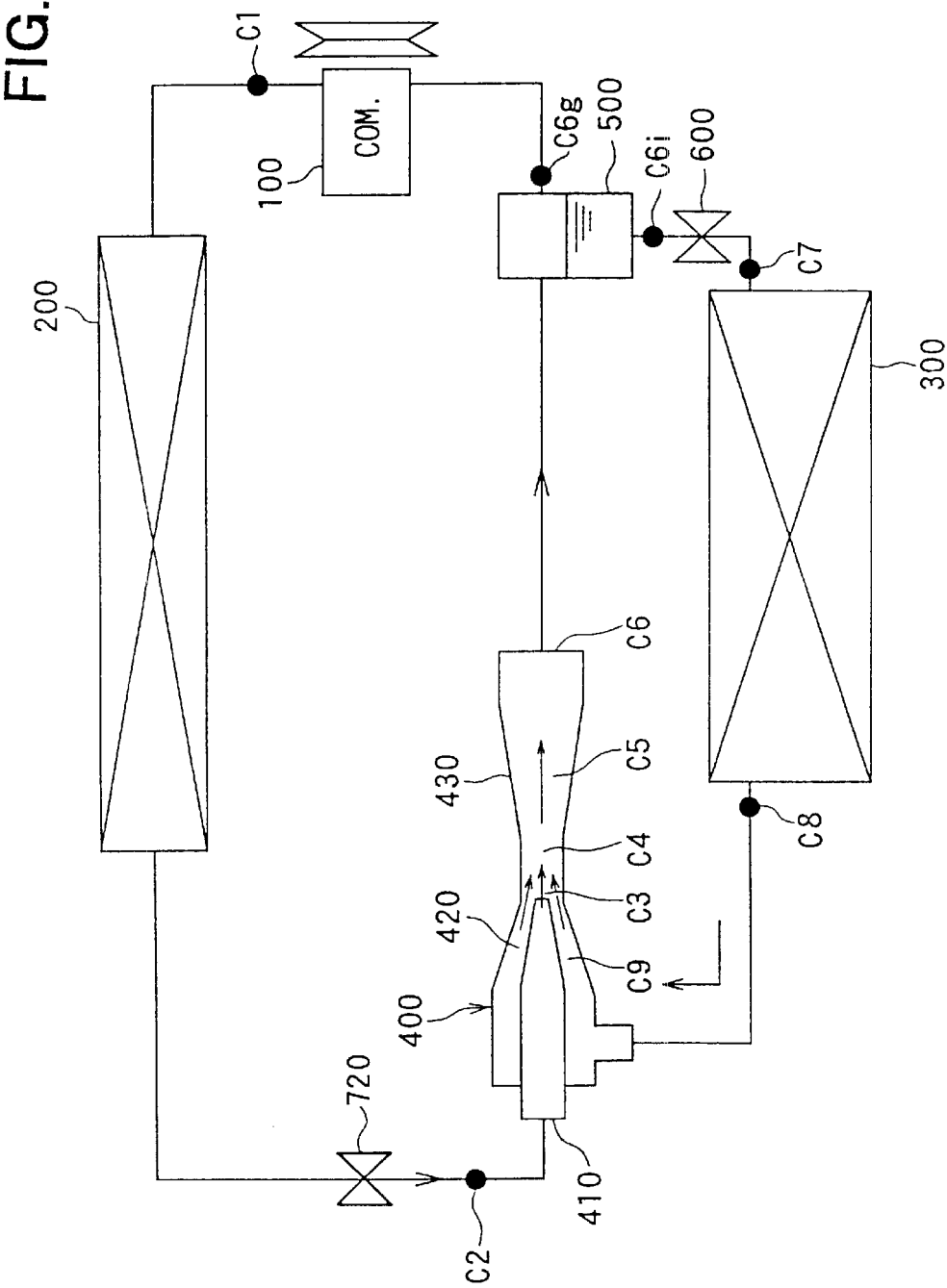
FIG. 5 is a schematic diagram of an ejector cycle system according to a third preferred embodiment of the present invention.

A third preferred embodiment of the present invention will be now described with reference to FIG. 5. In the above-described second embodiment, the second decompression unit (i.e., pressure adjustment unit) 710 is disposed at a downstream refrigerant side of the ejector 400 so that refrigerant from the ejector 400 becomes a predetermined pressure lower than the critical pressure. However, in the third embodiment, as shown in FIG. 5, a third decompression unit (pressure adjustment unit) 720 is disposed at an upstream refrigerant side of the ejector 400 so that the refrigerant pressure from the ejector 400 to be introduced into the gas-liquid separator 500 can be reduced lower than the critical pressure by the third decompression unit 720 and the nozzle 410 of the ejector 400.

The third decompression unit 720 according to the third embodiment and the second decompression unit 710 according to the second embodiment adjust the refrigerant pressure to be introduced from the ejector 400 into the gas-liquid separator 500 to be lower than the critical pressure. However, even when the second and third decompression units 710, 720 are not provided, the refrigerant pressure from the ejector 400 may be lower than the critical pressure in accordance with the high-pressure side refrigerant pressure and the efficiency of the ejector 400. In this case, when the second decompression unit 710 is disposed at the downstream refrigerant side of the ejector 400, a flow resistance of refrigerant becomes larger due to the arrangement of the second decompression unit 710. However, in the third embodiment, because the third decompression unit 720 is disposed at the upstream refrigerant side of the ejector 400, the decompression operation of the third decompression unit 720 is always performed in the super-critical pressure area. Accordingly, in the third embodiment, it can prevent the flow resistance (pressure loss) of refrigerant from being increased due to the third decompression unit 720, while the refrigerant pressure discharged from the ejector 400 becomes lower than the critical pressure.

A fourth preferred embodiment of the present invention will be now described with reference to FIGS. 6–9. In the above-described first through the third embodiments, after the refrigerant is discharged from the diffuser 430 of the ejector 400, refrigerant is separated into gas refrigerant and liquid refrigerant in the gas-liquid separator 500 so that gas refrigerant in the gas-liquid separator 500 flows toward the suction side of the compressor 100 and liquid refrigerant in the gas-liquid separator 500 flows toward the evaporator 300. However, in the fourth embodiment, as shown in FIG. 6, the gas-liquid separator 500 is disposed at a refrigerant outlet portion of the mixing portion 420, so that liquid refrigerant is separated and extracted from refrigerant before flowing out from the ejector 400. The separated and extracted liquid refrigerant is supplied toward the evaporator 300, and gas refrigerant flowing from the ejector 400 is supplied to the suction side of the compressor 100. As shown in FIG. 6, refrigerant having a high pressure PH is introduced into the nozzle 410, and is decompressed in the nozzle 410 to have a pressure Ps. Thereafter, refrigerant pressure is increased in the diffuser 430 to have a pressure PD at the outlet of the diffuser 430. Refrigerant from the outlet side of the mixing portion 420 is introduced into the gas-liquid separator 500. Liquid refrigerant from the gas-liquid separator 500 is decompressed in the decompression unit 600, and is introduced into the evaporator 300 to be evaporated. On the other hand, gas refrigerant having a low pressure PL (Pe) is sucked into the ejector 400, similarly to the above-described first embodiment.

Figure 7A:
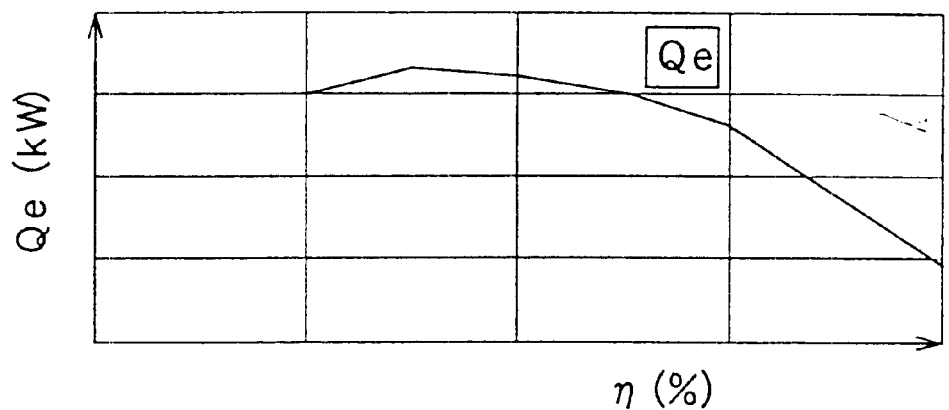
FIG. 7A is a graph showing a relationship between an ejector efficiency $\eta$ and a cooling capacity Qe of an evaporator.
Figure 7B:
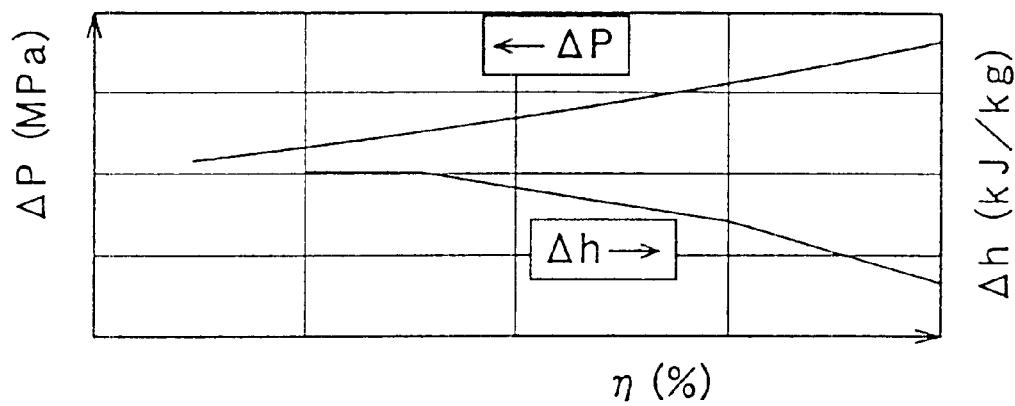
FIG. 7B is a graph showing relationships between the ejector efficiency $\eta$, an increased pressure $\Delta P$ sucked into a compressor and a specific enthalpy difference $\Delta h$ between a refrigerant inlet and a refrigerant outlet of the evaporator.

FIG. 7A is a simulation result of the fourth embodiment, showing a relationship between an ejector efficiency η and a cooling capacity Qe (Qe=Ge×Δh) generated in the evaporator 300. FIG. 7B is a simulation result of the fourth embodiment, showing relationships between the ejector efficiency η, the increased pressure ΔP of the compressor 100 and the specific enthalpy difference Δh of refrigerant between the refrigerant inlet and the refrigerant outlet of the evaporator 300. Further, FIG. 7C is a simulation result of the fourth embodiment, showing relationships between the ejector efficiency η, a refrigerant flow amount Gr sucked into the compressor 100, and a refrigerant flow amount Ge flowing in the evaporator 300.

Figure 7C:
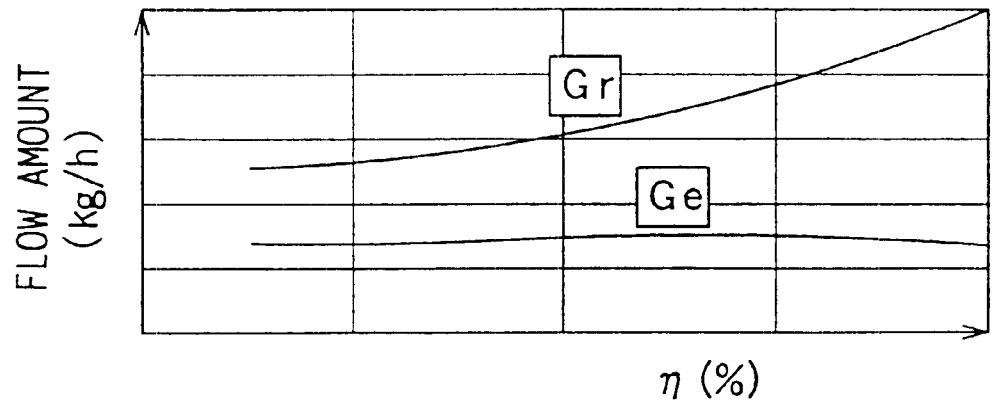
FIG. 7C is a graph showing relationships between the ejector efficiency $\eta$, a refrigerant flow amount Gr sucked into the compressor and a refrigerant flow amount Ge flowing in the evaporator, according to the fourth embodiment.
Figure 8:
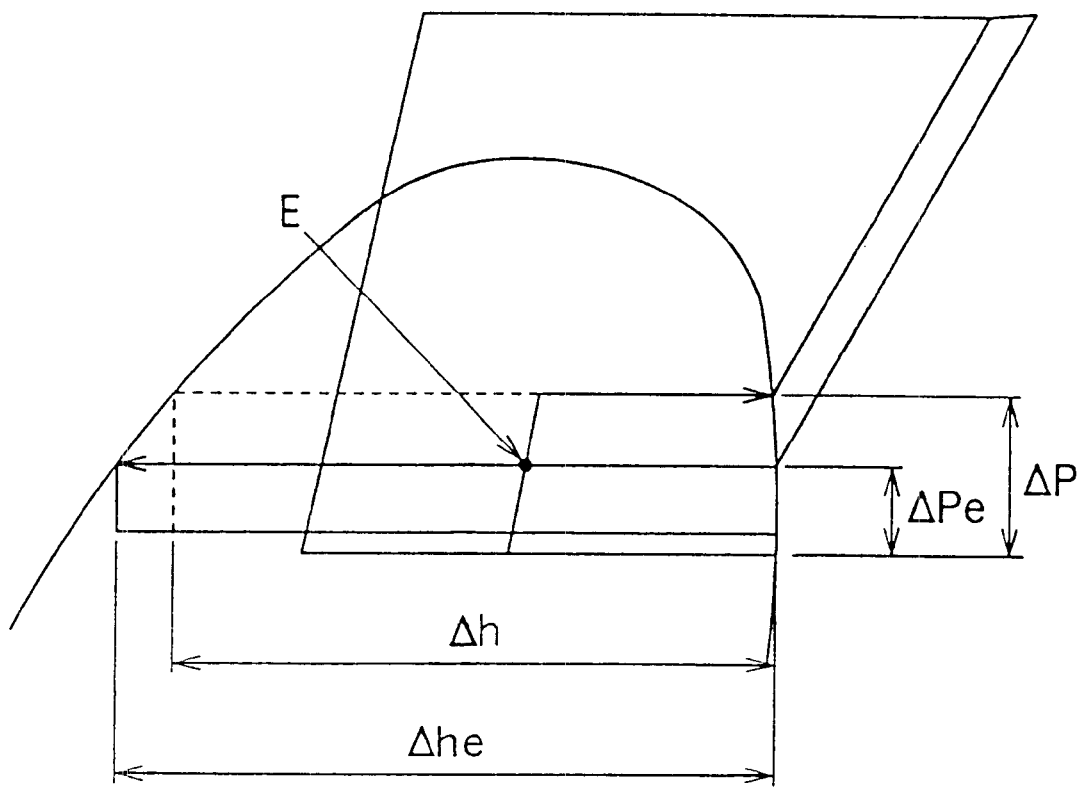
FIG. 8 is a Mollier diagram of the ejector cycle system using carbon dioxide as refrigerant, according to the fourth embodiment.

As shown in FIGS. 7A, 7B, 7C, when the ejector efficiency η becomes larger, the increased pressure ΔP becomes larger, and the compression operation of the compressor 100 can be reduced. When the increased pressure ΔP becomes larger, because the pressure with in the gas-liquid separator 500 is increased, the specific enthalpy of refrigerant flowing into the evaporator 300 becomes larger as shown by the chain line in FIG. 8. Accordingly, the specific enthalpy difference Δh becomes smaller, and the cooling capacity Qe generated by the evaporator 300 becomes smaller.

The ejector efficiency η can be calculated in accordance with the following formula (1).

$$\eta=[\Delta P(Gn+Ge)/\rho g-Ge(Ue2/2)]/(\Delta ie \cdot Gn)=[(Gn+Ge)\Delta ir-Ge(Ue2/2)]/(\Delta ie \cdot Gn) \quad (1)$$

wherein, Δie [Δie=i(C2)−i(C3) shown in FIG. 2] is an enthalpy difference between a refrigerant inlet and a refrigerant outlet of the nozzle 410, Δir=i(C8')−i(C8), Gn is the amount of refrigerant flowing into the radiator 200, Ge is the amount of refrigerant flowing into the evaporator 300, ΔP (suction pressure increased amount) is the increased pressure of refrigerant sucked into the compressor, Ue is a suction flow speed of refrigerant in the ejector 400, and ρg is a suction flow gas density of refrigerant in the ejector 400.

According to the fourth embodiment, liquid refrigerant to be supplied to the evaporator 300 is separated and extracted from refrigerant before being discharged from the ejector 400. Therefore, as shown by the solid line in FIG. 8, even when the suction pressure increased amount ΔP becomes larger, a pressure increased amount ΔPe of liquid refrigerant flowing from the gas-liquid separator 500 can be made smaller than the suction pressure increased amount ΔP.

Accordingly, it can prevent the specific enthalpy of refrigerant at the inlet of the evaporator 300 from being larger, and the specific enthalpy difference Δhe between the refrigerant inlet and the refrigerant outlet of the evaporator 300 can be made larger than the specific enthalpy difference Δh. As a result, the cooling capacity Qe generated by the evaporator 300 can be increased.

Figure 9:
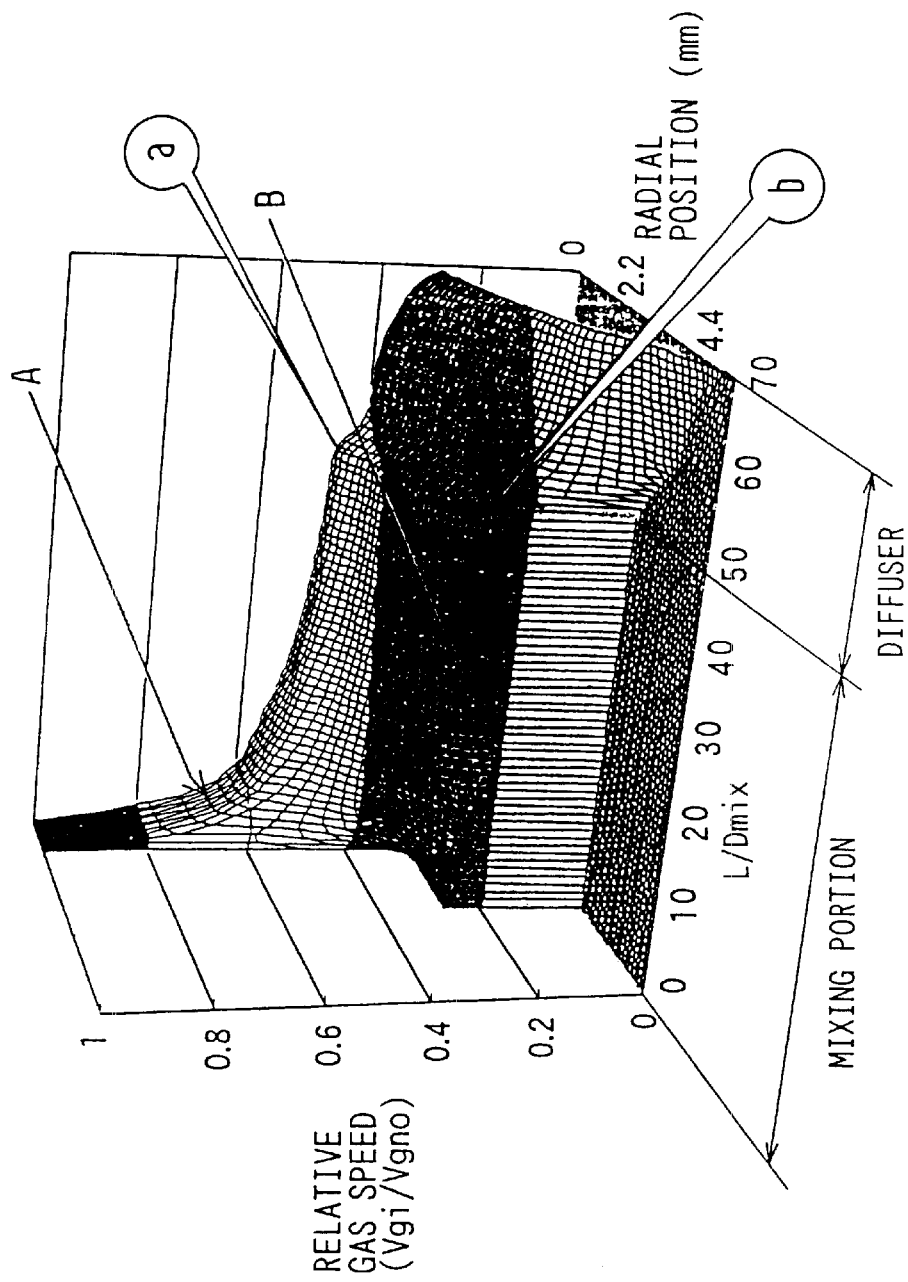
FIG. 9 is a three-dimensional characteristic view showing a relationship between a refrigerant relative flow speed from a refrigerant outlet of a nozzle to a refrigerant outlet of a diffuser, and a radial position in a radial direction from a center in a refrigerant passage section of the ejector, according to the fourth embodiment.

FIG. 9 shows a simulation result showing a relationship between a refrigerant flow speed (relative speed Vgi/Vgno) from the refrigerant outlet of the nozzle 410 to the refrigerant outlet of the diffuser 430, and a radial position in a radial direction from a center in a refrigerant passage cross-section of the ejector 400. The simulation of FIG. 9 is performed, assuming that the refrigerant flow speed distribution (gas flow speed distribution) is symmetrical relative to a center axial line, and assuming that the refrigerant flow speed at the outlet of the nozzle 410 is 1. In FIG. 9, A indicates a jet-flow gas refrigerant flowing from the nozzle 410, and B indicates a suction gas refrigerant (suction flow gas) sucked from the evaporator 300. As shown in FIG. 9, the flow speed of the jet-flow gas refrigerant discharged from the nozzle 410 becomes lower while the jet-flow gas refrigerant sucks and accelerates refrigerant from the evaporator 300. Therefore, at a refrigerant outlet side of the mixing portion 420 (refrigerant inlet side of the diffuser 430), the flow speed decrease of the jet-flow gas refrigerant is nearly finished as shown by "a" in FIG. 9, and the sucked gas refrigerant from the evaporator 300 is sufficiently accelerated as shown by "b" in FIG. 9. That is, at the refrigerant outlet side of the mixing portion 420 (refrigerant inlet side of the diffuser 430), gas refrigerant discharged from the nozzle 410 and gas refrigerant sucked from the evaporator 300 are mixed so that the flow speed of the gas refrigerant sucked from the evaporator 300 becomes approximately equal to that of the gas refrigerant from the nozzle 410. The mixed refrigerant mixed in the mixing portion 420 flows into the diffuser 430, and the refrigerant pressure is increased in the diffuser 430 while the flow speed of the refrigerant pressure is decreased.

As described above, the suction of gas refrigerant from the evaporator 300 is finished at the refrigerant outlet of the mixing portion 420, and the refrigerant pressure is increased in the diffuser 430. Therefore, when the gas-liquid separator 500 is provided at the refrigerant outlet of the mixing portion 420 and liquid refrigerant from the gas-liquid separator 500 is supplied to the evaporator 300, it can prevent the specific enthalpy of refrigerant flowing into the evaporator 300 from being larger while the suction pressure increased amount ΔP of the compressor 100 is maintained. Accordingly, in the fourth embodiment, the cooling capacity Qe generated by the evaporator 300 can be made larger while the ejector efficiency η is maintained at a high level.

A fifth preferred embodiment of the present invention will be now described with reference to FIGS. 10 and 11. In the fifth embodiment, similarly to the above-described fourth embodiment, liquid refrigerant is separated and extracted from refrigerant flowing in the ejector 400 at the refrigerant outlet side of the mixing portion 420, and is introduced into a first gas-liquid separator 500. Liquid refrigerant flowing from the refrigerant outlet side of the mixing portion 420 of the ejector 400 is supplied into the evaporator 300 through the first gas-liquid separator 500. On the other hand, refrigerant flowing from the diffuser 430 of the ejector 400 flows into a second gas-liquid separator 510, and is separated into gas refrigerant and liquid refrigerant in the second gas-liquid separator 510. Liquid refrigerant separated in the second gas-liquid separator 510 is supplied to the evaporator 300, and gas refrigerant separated in the second gas-liquid separator 510 is supplied to the suction side of the compressor 100.

In the fifth embodiment, even when a sufficient amount of liquid refrigerant cannot be separated and extracted from the outlet side of the mixing portion 420, because the second gas-liquid separator 510 is disposed, refrigerant flowing from the diffuser 430 of the ejector 400 is separated into gas refrigerant and liquid refrigerant in the second gas-liquid separator 510, and the separated liquid refrigerant is introduced into the evaporator 300. Therefore, liquid refrigerant can be sufficiently supplied to the evaporator 300.

Because the pressure within the first gas-liquid separator 500 is the pressure before being increased in the diffuser 430, a decompression unit is not provided in a refrigerant passage connecting the first gas-liquid separator 500 and the evaporator 300. On the other hand, because the pressure within the second gas-liquid separator 510 is the pressure increased in the diffuser 430, the decompression unit 600 is disposed between the second gas-liquid separator 510 and the evaporator 300 so that a pressure increase within the evaporator 300 is prevented.

Figure 11:
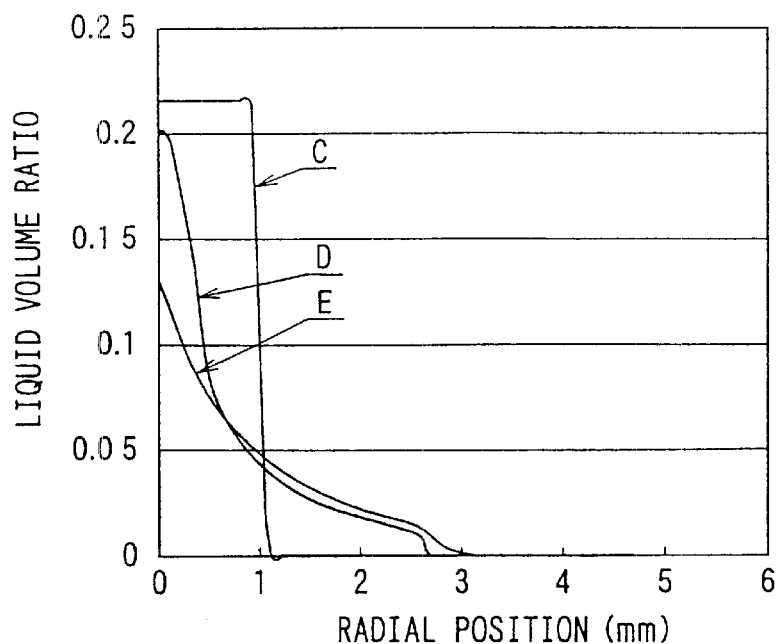
FIG. 11 is a graph showing a relationship between the radial position and a liquid volume ratio in an ejector, according to the fifth embodiment.

FIG. 11 is a simulation result showing a relationship between a radial position within the ejector 400 and a liquid volume ratio (i.e., the ratio of liquid refrigerant amount). In FIG. 11, graph C indicates the liquid volume ratio around the outlet of the nozzle 410, graph D indicates the liquid volume ratio around the outlet of the mixing portion 420, and graph E indicates the liquid volume ratio around the outlet of the diffuser 430. As shown in FIG. 11, at the center portion of the refrigerant passage section within the ejector 400, the liquid volume ratio becomes largest. In the fifth embodiment, the simulation conditions are similar to those of the above-described fourth embodiment.

Figure 10:
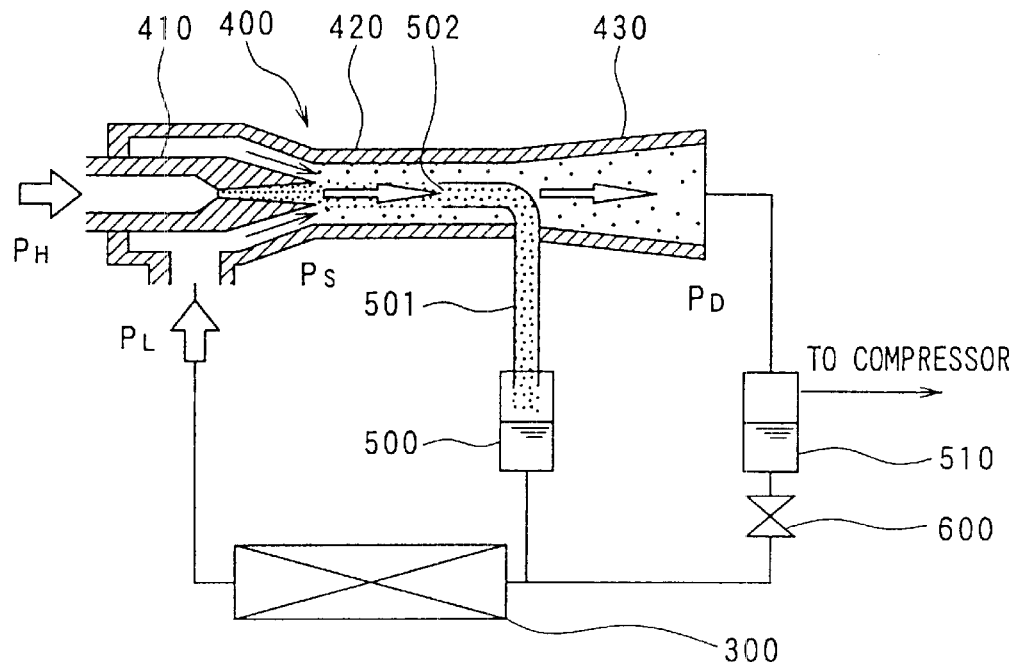
FIG. 10 is a schematic diagram showing a main part of an ejector cycle system according to a fifth preferred embodiment of the present invention.

In the fifth embodiment, as shown in FIG. 10, liquid refrigerant at the refrigerant outlet side of the mixing portion 420 is introduced into the first gas-liquid separator 500 through a refrigerant introduction pipe 501. An introduction port 502 of the refrigerant introduction pipe 501 is disposed at a center of the refrigerant passage section at the refrigerant outlet side of the mixing portion 420 of the ejector 400, so that liquid refrigerant can be effectively separated and extracted from the ejector 400.

A sixth preferred embodiment of the present invention will be now described with reference to FIG. 12. In the above-described fifth embodiment, the first gas-liquid separator 500 and the second gas-liquid separator 510 are provided. However, in the sixth embodiment, only a single gas-liquid separator 520 is provided so that the advantage similar to that of the above-described fifth embodiment can be obtained.

Figure 12:
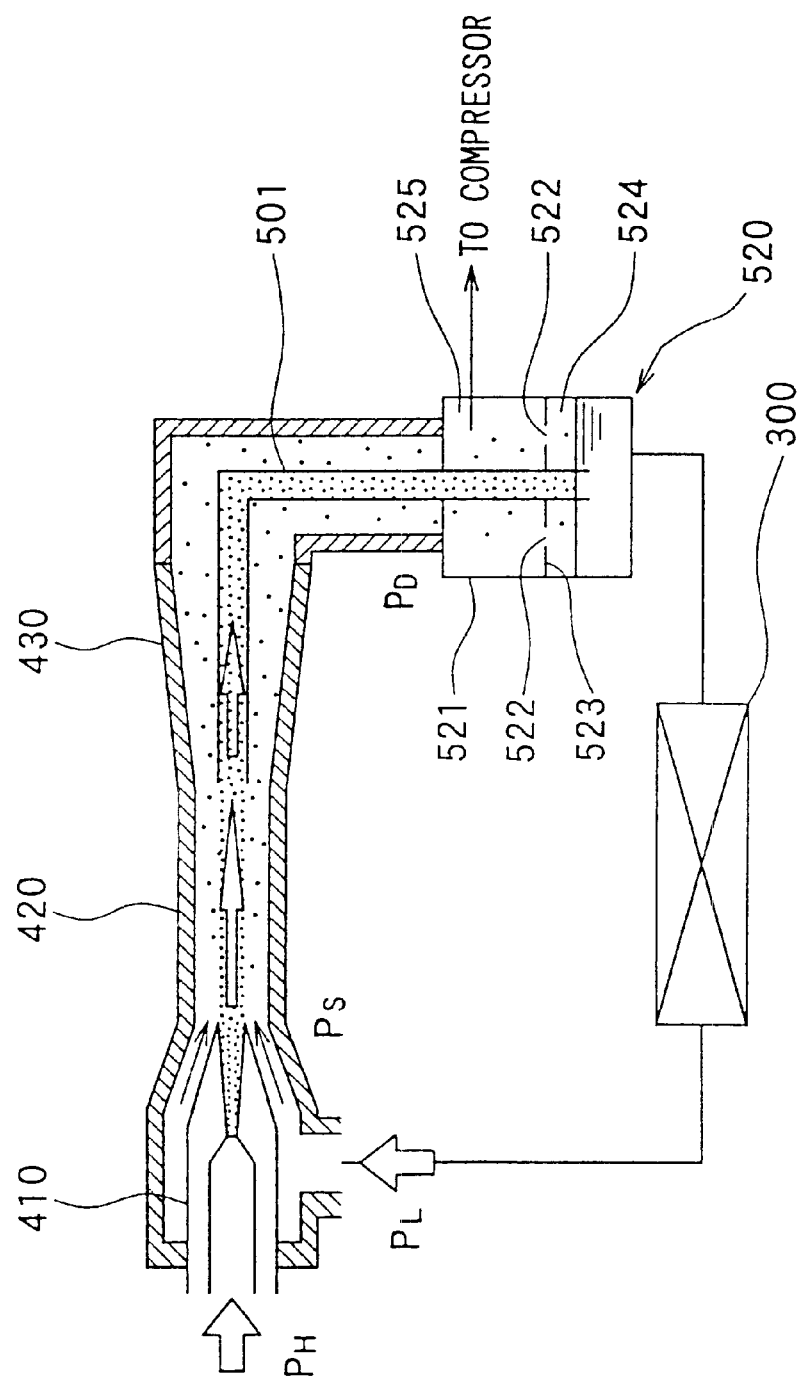
FIG. 12 is a schematic diagram showing a main part of an ejector cycle system according to a sixth preferred embodiment of the present invention.

Specifically, as shown in FIG. 12, the gas-liquid separator 520 has a casing 521 in which an inner space is partitioned into a lower space 524 and an upper space 525 by a partition member 523 having plural orifices 522. The refrigerant introduction pipe 501 extends into the lower space 524 under the partition member 523 so that refrigerant at the outlet side of the mixing portion 420 is introduced into the lower space 524. On the other hand, the outlet side of the diffuser 430 of the ejector 400 extends to communicates with the upper space 525 upper than the partition member 523.

Further, the upper space 525 of the gas-liquid separator 520 communicates with a suction side of the compressor 100 so that gas refrigerant is sucked into the compressor 100. On the other hand, liquid refrigerant stored in the lower space 524 is supplied to the evaporator 300. In the sixth embodiment, the orifice 522 provided in the partition member 523 is used as decompression means (throttle means) for reducing pressure of refrigerant flowing from the upper space 525 to the lower space 524. Further, the partition member 523 is used as a disturbance prevention unit for preventing refrigerant introduced from the diffuser 430 from disturbing liquid refrigerant within the gas-liquid separator 520.

A seventh preferred embodiment of the present invention will be now described with reference to FIGS. 13 and 14. In the seventh embodiment, as shown in FIG. 13, the ejector 400, the gas-liquid separator 500 and the decompression unit 600 (throttle means) are integrated.

Figure 13:
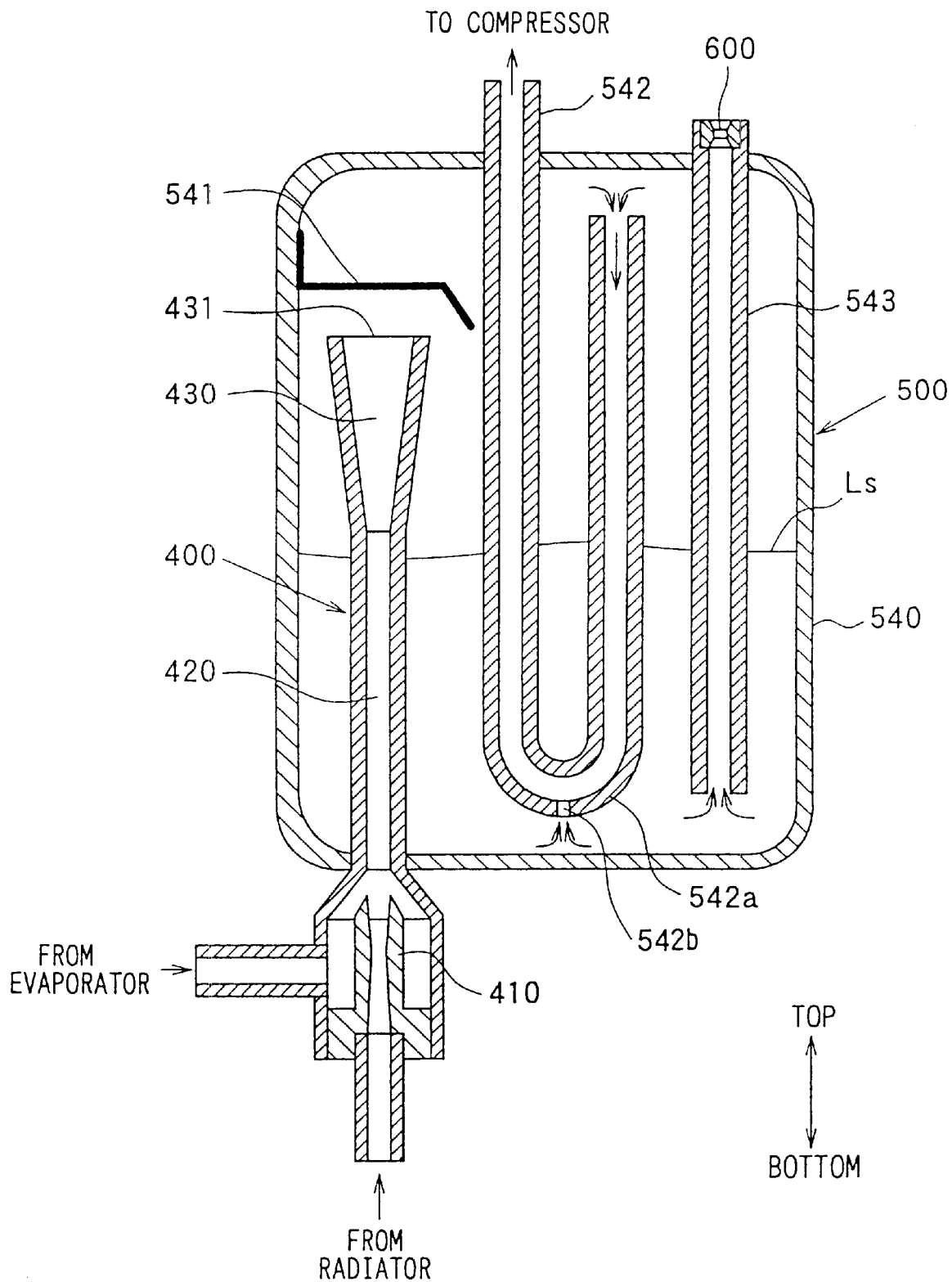
FIG. 13 is a schematic diagram showing an ejector-integrated gas-liquid separator for an ejector cycle system according to a seventh preferred embodiment of the present invention.

As shown in FIG. 13, a metal tank 540 is disposed so that refrigerant discharged from the diffuser 430 of the ejector 400 is separated into gas refrigerant and liquid refrigerant within the metal tank 540 and the separated liquid refrigerant is stored in the metal tank 540. The ejector 400 is disposed so that refrigerant flows within the ejector 400 from a lower side upwardly. A part of the ejector 400 is disposed within the metal tank 540 so that a refrigerant outlet 431 of the diffuser 430 is placed at an upper side of a refrigerant liquid surface LS within the tank 540 to be opened toward an upper side.

A refrigerant passage of the ejector 400 from the nozzle 410 to the diffuser 430 through the mixing portion 420 is formed approximately linearly. Therefore, an unnecessary pressure loss of refrigerant is not generated in the ejector 400. A collision wall (obstacle plate) 541 to which refrigerant from the refrigerant outlet 431 of the diffuser 430 collides is bonded to an inner wall of the tank 540 at a side of the refrigerant outlet 431 of the diffuser 430 of the ejector 400.

A refrigerant pipe 542, through which gas refrigerant stored at the upper side within the tank 540 is introduced into the suction side of the compressor 100, is disposed in the tank 540. The refrigerant pipe 542 is bent at a bent portion 542a by approximate 180° to form a U shape, and the U-shaped bottom part of the refrigerant pipe 542 is placed in the liquid refrigerant stored at a lower side within the tank 540. A hole 542b, from which liquid refrigerant including a lubricating oil for lubricating a sliding portion of the compressor 100 is sucked, is provided in the bent portion 542a.

A liquid refrigerant pipe 543, through which liquid refrigerant stored at the lower side within the tank 540 is introduced into the evaporator 300, is disposed in the tank 540. Therefore, a bottom opened end of the liquid refrigerant pipe 543 is disposed in the liquid refrigerant within the tank 540, and a decompression unit 600 (e.g., fixed throttle) is provided at a refrigerant outlet side of the liquid refrigerant pipe 543.

Next, operation of an ejector-integrated gas-liquid separator according to the seventh embodiment will be now described. Refrigerant from the refrigerant outlet 431 of the diffuser 430 of the ejector 400 collides with the collision wall 541 to be scattered. In this case, liquid refrigerant, having a density and a viscosity larger than those of gas refrigerant, adheres to the collision wall 541 or is not scattered greatly as compared with gas refrigerant. Therefore, refrigerant from the refrigerant outlet 431 of the diffuser 430 of the ejector 400 can be effectively separated into gas refrigerant and liquid refrigerant. Liquid refrigerant adhered on the collision wall 541 falls downwardly by the weight.

Because the refrigerant outlet 431 of the diffuser 430 of the ejector 400 is opened at the upper side of the liquid refrigerant surface LS within the tank 540, it can prevent refrigerant within the tank 540 from being stirred due to refrigerant flowing from the diffuser 430 of the ejector 400. Further, because the refrigerant outlet 431 is opened toward upwardly, liquid refrigerant having the larger density can be readily separated from refrigerant flowing from the diffuser 430 of the ejector 400.

Figure 14:
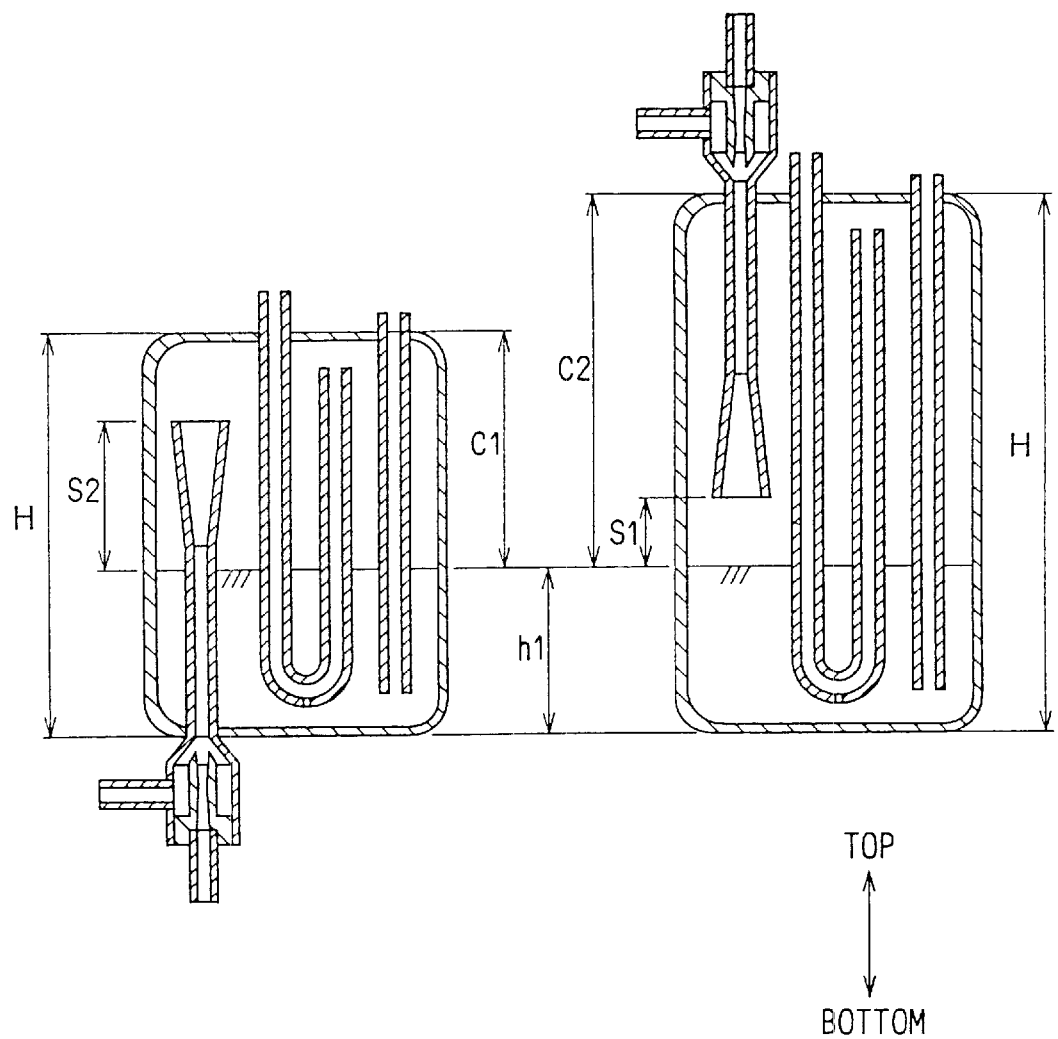
FIG. 14 is a view for explaining characteristics of the ejector integrated gas-liquid separator of the seventh embodiment.

When the ejector 400 is integrally connected with the tank 540 of the gas-liquid separator 500, the ejector 400 may be disposed as shown by the right side part in FIG. 14 of a comparison example, so that refrigerant flows in the ejector 400 from an upper side downwardly, and the refrigerant outlet 431 is positioned at the upper side of the liquid refrigerant surface LS. However, In this case, the vertical dimension H of the tank 540 of the gas-liquid separator 500 becomes larger as compared with the tank 540 of the seventh embodiment shown by the left side part in FIG. 14. That is, in both cases shown in FIG. 14, because it is necessary to provide the refrigerant outlet 431 at the upper side of the liquid refrigerant surface LS within the tank 540, when a liquid refrigerant height h1 within the tank 540 and a dimension from the nozzle 410 to the refrigerant outlet 431 are the same in the both cases, the comparison example shown by the right side part in FIG. 14 needs an upper dimension C2 upper from the liquid refrigerant surface LS, that is larger than the dimension (C2–S1) from the nozzle 410 to the refrigerant outlet 431. However, in the seventh embodiment, as shown the left side part h1 in FIG. 14, a large part from the nozzle 410 to the refrigerant outlet 431 is placed in the liquid refrigerant, the vertical dimension H of the tank 540 of the ejector-integrated gas-liquid separator can be made smaller as compared with the comparison example.

In the comparison example, the dimension from the nozzle 410 to the refrigerant outlet 431 can be made sufficiently smaller for reducing the vertical dimension H. However, when the dimension from the nozzle 410 to the refrigerant outlet portion 431 is made smaller, gas refrigerant from the evaporator 300 cannot be sufficiently sucked in the ejector 400, and the refrigerant pressure cannot be sufficiently increased in the diffuser 430.

In the ejector cycle system, even when refrigerant from the compressor 100 is cooled in the radiator 200, refrigerant having a relative high temperature flows into the nozzle 410. Accordingly, when all the ejector 400 including the nozzle 410 is disposed within the tank 540, liquid refrigerant within the tank 540 is evaporated by high-temperature refrigerant before being decompressed. Thus, in the seventh embodiment, because at least the nozzle 410 is disposed outside the tank 540, low-temperature refrigerant after being decompressed and expanded in the nozzle 410 is introduced into the tank 540. Accordingly, it can prevent liquid refrigerant within the tank 540 from being evaporated, and liquid refrigerant can be sufficiently supplied to the evaporator 300.

In the seventh embodiment, a part of the ejector 400 is disposed in the tank 540 so that refrigerant flows through the refrigerant passage within the ejector 400 from a lower side upwardly in the vertical direction. However, refrigerant may flow through the refrigerant passage within the ejector 400 from the lower side upwardly while being tilted relative to a horizontal direction by a predetermined tilt angle.

In the seventh embodiment, only the nozzle 410 is disposed outside the tank 540. However, the mixing portion 420 may be also disposed outside the tank 540.

In the seventh embodiment, the refrigerant passage from the nozzle 410 to the diffuser 430 through the mixing portion 420 is formed approximately linearly. However, only the refrigerant passage from the nozzle 410 to the mixing portion 420 may be formed approximately linearly, and the refrigerant passage of the diffuser 430 may be bent suitably.

Figure 15:
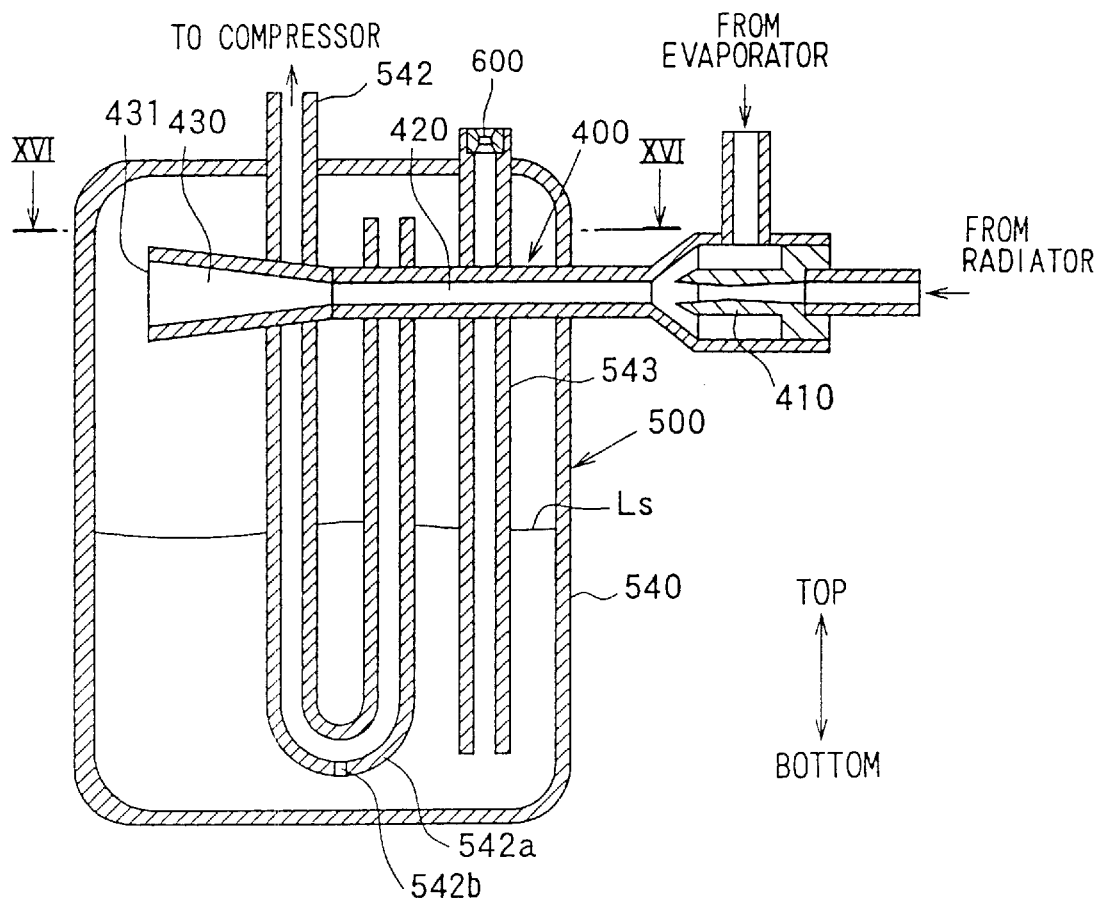
FIG. 15 is a schematic diagram showing an ejector-integrated gas-liquid separator for an ejector cycle system according to an eighth preferred embodiment of the present invention.
Figure 16:
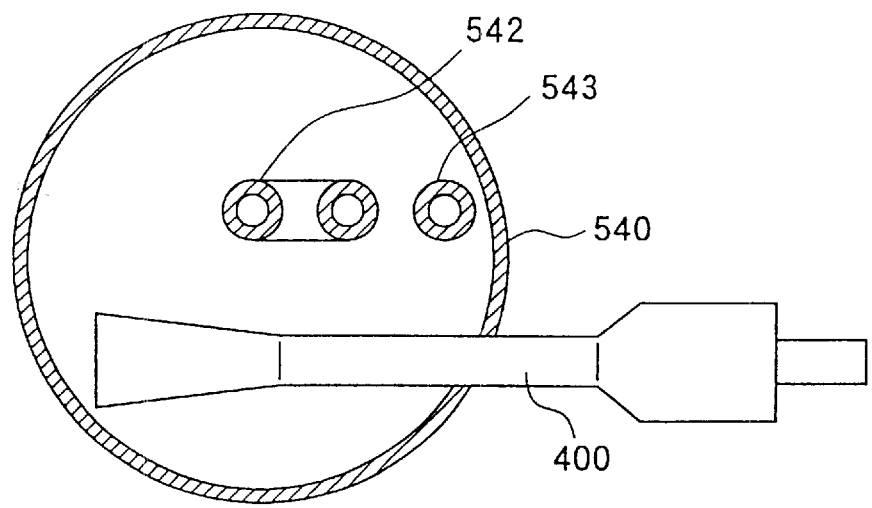
FIG. 16 is a cross-sectional view taken along line XVI—XVI in FIG. 15.

An eighth preferred embodiment of the present invention will be now described with reference to FIGS. 15 and 16. In the eighth embodiment, as shown in FIGS. 15 and 16, the refrigerant passage of the ejector 400 is provided to extend approximately horizontally, the refrigerant outlet 431 is placed at an upper side from the liquid refrigerant surface LS of the tank 540 so that refrigerant from the refrigerant outlet 431 collides with an inner wall surface of the tank 540. Accordingly, an additional collision wall is unnecessary, and the ejector-integrated gas-liquid separator 500 can be manufactured in low cost while liquid refrigerant and gas refrigerant can be effectively separated.

In the eighth embodiment, the nozzle 410 is disposed outside the tank 540. Therefore, similarly to above-described seventh embodiment, it can prevent liquid refrigerant within the tank 540 from being evaporated, and liquid refrigerant can be sufficiently supplied to the evaporator 300 from the tank 540.

In the eighth embodiment, a longitudinal direction of the ejector 400 is disposed approximately horizontally so that refrigerant flows in the refrigerant passage of the ejector 400 approximately horizontally. However, the longitudinal direction of the ejector 400 may be tilted relative to a horizontal surface to an upper side or to a lower side.

A ninth preferred embodiment of the present invention will be now described with reference to FIGS. 17 and 18. In the ninth embodiment, water is heat-exchanged with high-pressure side refrigerant in the radiator 200 of an ejector cycle system using carbon dioxide as refrigerant so that a supply water is heated. That is, an ejector-cycle type water heater is described in the ninth embodiment.

Figure 17:
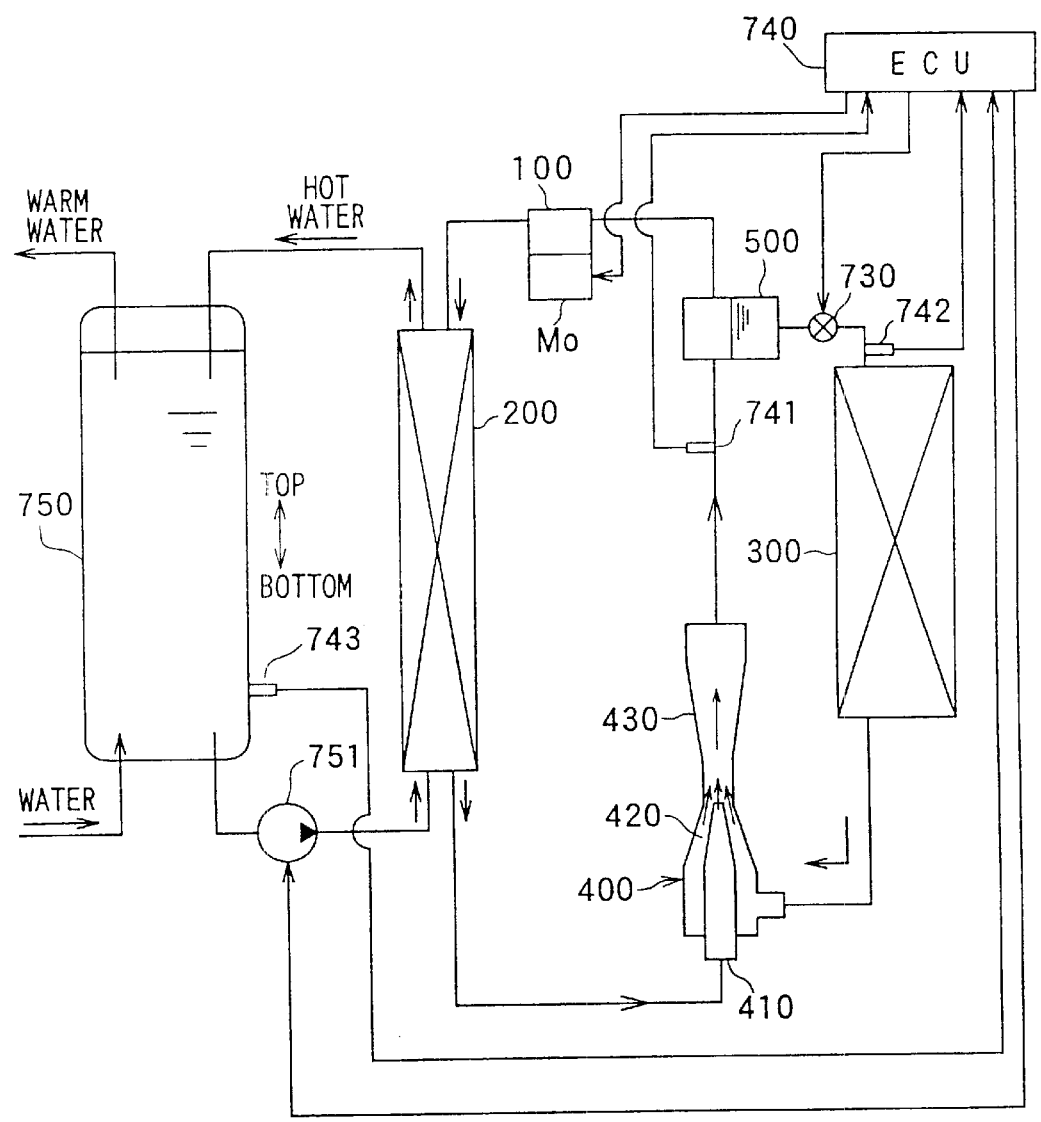
FIG. 17 is a schematic diagram showing an ejector cycle system according to a ninth preferred embodiment of the present invention.

As shown in FIG. 17, in the ninth embodiment, an electrical flow amount adjustment valve (variable throttle) 730 for adjusting a flow amount of refrigerant is disposed in a refrigerant passage through which liquid refrigerant in the gas-liquid separator 500 is supplied to the evaporator 300. A first refrigerant temperature sensor 741 for detecting temperature of refrigerant flowing into the gas-liquid separator 500 is disposed at a refrigerant outlet side of the diffuser 430 of the ejector 400, and a second refrigerant temperature sensor 742 for detecting temperature of refrigerant flowing into the evaporator 300 is disposed at a refrigerant outlet side of the flow amount adjustment valve 730. A valve opening degree of the flow amount adjustment valve 730 is adjusted based on detection temperatures of both the temperature sensors 741, 742.

In the radiator 200 (water-refrigerant heat exchanger), refrigerant flows in a direction opposite to a flow direction of water. A rotation speed (rotation number) of the compressor 10 is controlled by an electrical motor Mo so that the flow amount of refrigerant flowing into the ejector 400 becomes a predetermined value.

A water tank 750 is disposed so that water is supplied to the radiator 200 and hot water heated in the radiator 200 is stored and is supplied to a user. An electrical pump 751 for circulating water between the water tank 750 and the radiator 200 is disposed. A water temperature sensor 743 is disposed to detect temperature of water within the water tank 750. In the ninth embodiment, signals from the temperature sensors 741, 742, 743 are input into an electronic control unit (ECU) 740, and the ECU 740 controls each operation of the valve opening degree of the flow amount adjustment valve 730, the electrical motor Mo of the compressor 100 and the pump 751.

Next, operation of the ejector-cycle type water heater (hereinafter, referred to as water heater) will be described. Supply water (warm water) stored in the water tank 750 is supplied to a user in accordance with a request from the user, and tap water (water) is supplied into the water tank 750 when a water amount within the water tank 750 becomes lower than a predetermined amount.

On the other hand, when the temperature of water within the water tank 750 is equal to or lower than a predetermined temperature, the pump 751 and the compressor 100 operate so that water within the water tank 750 is heated, while the valve opening degree of the flow amount adjustment valve 730 is controlled so that a high ejector efficiency η is maintained.

The ejector efficiency η is a ratio of the pressure energy recovered in the diffuser 430 to the expansion energy generated in the nozzle 410 of the ejector 400. As the ejector efficiency η becomes larger, the recovered pressure energy becomes larger, and the coefficient of performance (COP) of the ejector refrigerant cycle becomes higher.

The COP of the refrigerant cycle is a ratio of an output (e.g., heat amount radiated from the radiator 200) to a cycle using energy (e.g., electrical power consumed in the compressor 100). On the other hand, as described in the above formula (1), the ejector efficiency η is relative to the flow amount ratio α (Ge/Gn) of the refrigerant amount Ge flowing through the evaporator 300 to the refrigerant amount Gn flowing through the radiator 200, the recovered pressure (increase pressure) ΔP, the enthalpy difference Δie between the refrigerant inlet and the refrigerant outlet of the nozzle 410, the flow rate Ue of refrigerant sucked from the evaporator 300 to the ejector 400. Because the flow rate Ue is very small, the parameter of Ge(Ue2/2) can be not considered. Here, ΔP/(ρg·Δie) is used as parameter β, and relationships between the parameter β, the ejector efficiency η and the flow amount ratio α are calculated as shown in FIG. 18.

Figure 18:
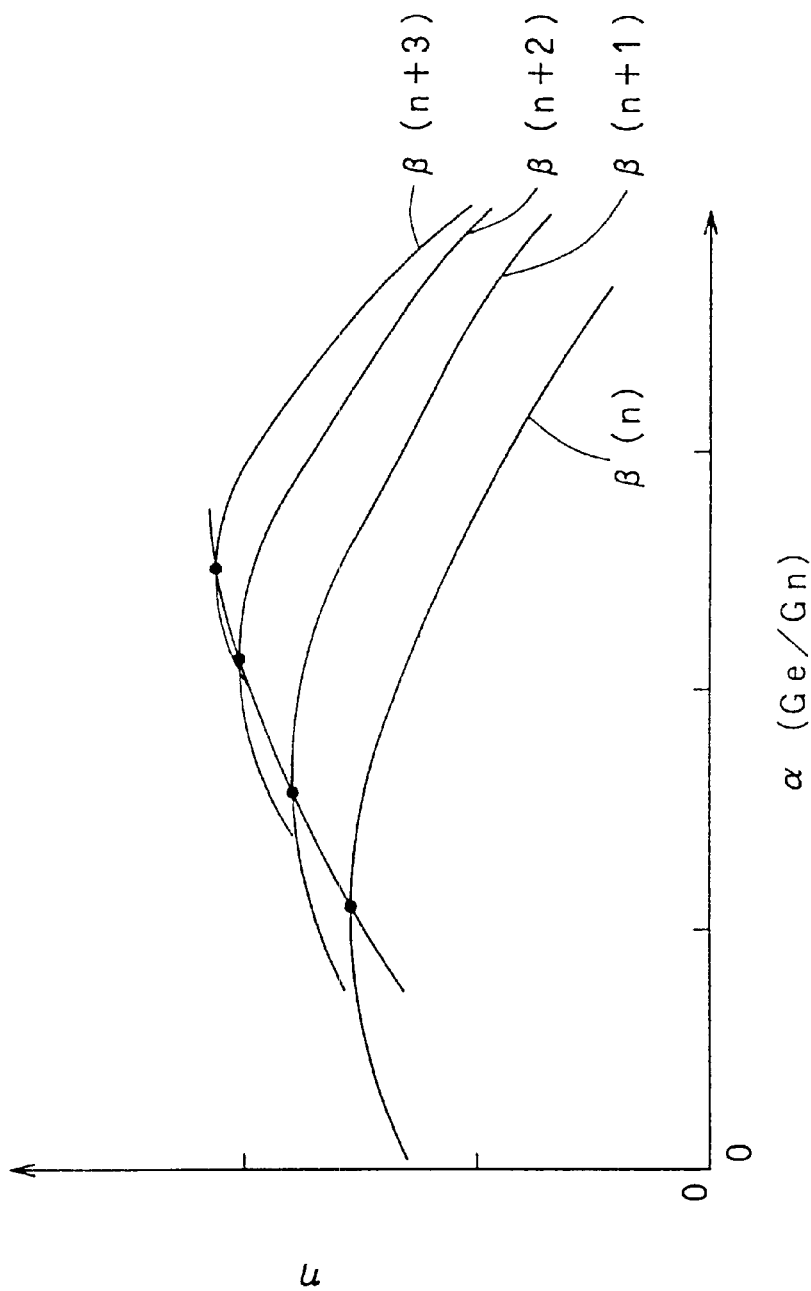
FIG. 18 is a graph showing a relationship between an ejector efficiency $\eta$ and a flow amount ratio $\alpha$ (Ge/Gn), according to the ninth embodiment.

In FIG. 18, the parameter β(n), the parameter β(n+1), the parameter β(n+2) and the parameter β(n+3) indicate different parameters, which are different from each other. Accordingly, while the parameter β changes, the valve opening degree of the flow control valve 730 is controlled to have a flow amount ratio α at which the ejector efficiency η becomes maximum in this time parameter β. As a result, the ejector efficiency η can be maintained at a high level. In the ejector cycle system, because there are the high-pressure side refrigerant flow (before being decompressed in the ejector 400) and the low-pressure side refrigerant flow (at the side of the evaporator 300), the parameter β is a function relative to a high-pressure side refrigerant state (enthalpy) and a low-pressure side refrigerant state (enthalpy).

In the ninth embodiment, the parameter β is determined based on the detection temperatures of both the refrigerant temperature sensors 741, 742, and the valve opening degree of the flow amount adjustment valve 730 is controlled. Accordingly, the ejector-cycle type water heater can be effectively operated.

In the ninth embodiment, the flow amount adjustment valve 730 constructs ejector efficiency control means for controlling an energy converting efficiency by adjusting a pressure-reduced amount (flow amount) of refrigerant flowing into the evaporator 300. When the valve opening degree of the flow amount adjustment valve 730 changes, the pressure and the temperature within the evaporator 300 and the increased pressure amount in the diffuser 430 are changed. Therefore, the flow amount adjustment valve 730 can adjust the ejector efficiency η by adjusting any one of the flow amount ratio α (Ge/Gn), the pressure and the temperature within the evaporator 300 and the increased pressure in the diffuser 430 of the ejector 400.

In the above-described ninth embodiment, the parameter β is determined based on the high-pressure side refrigerant temperature and the low-pressure side refrigerant temperature. However, because the refrigerant state (enthalpy) can be determined based on the refrigerant pressure, the parameter β maybe determined based on the high-pressure side refrigerant pressure and the low-pressure refrigerant pressure. Further, as elements for determining the parameter β, an environment condition of the ejector cycle system, such as an outside air temperature, may be used in addition to the refrigerant temperature and the refrigerant pressure.

Further, in the above-described ninth embodiment, the arrangement positions of sensors for detecting the low-temperature side refrigerant state (enthalpy) and the high-temperature side refrigerant state (enthalpy) may be changed. For example, the high-temperature side refrigerant state (enthalpy) may be detected at a refrigerant inlet side of the ejector 400, and the low-temperature side refrigerant state (enthalpy) may be detected at a refrigerant outlet side of the evaporator 300.

Figure 19:
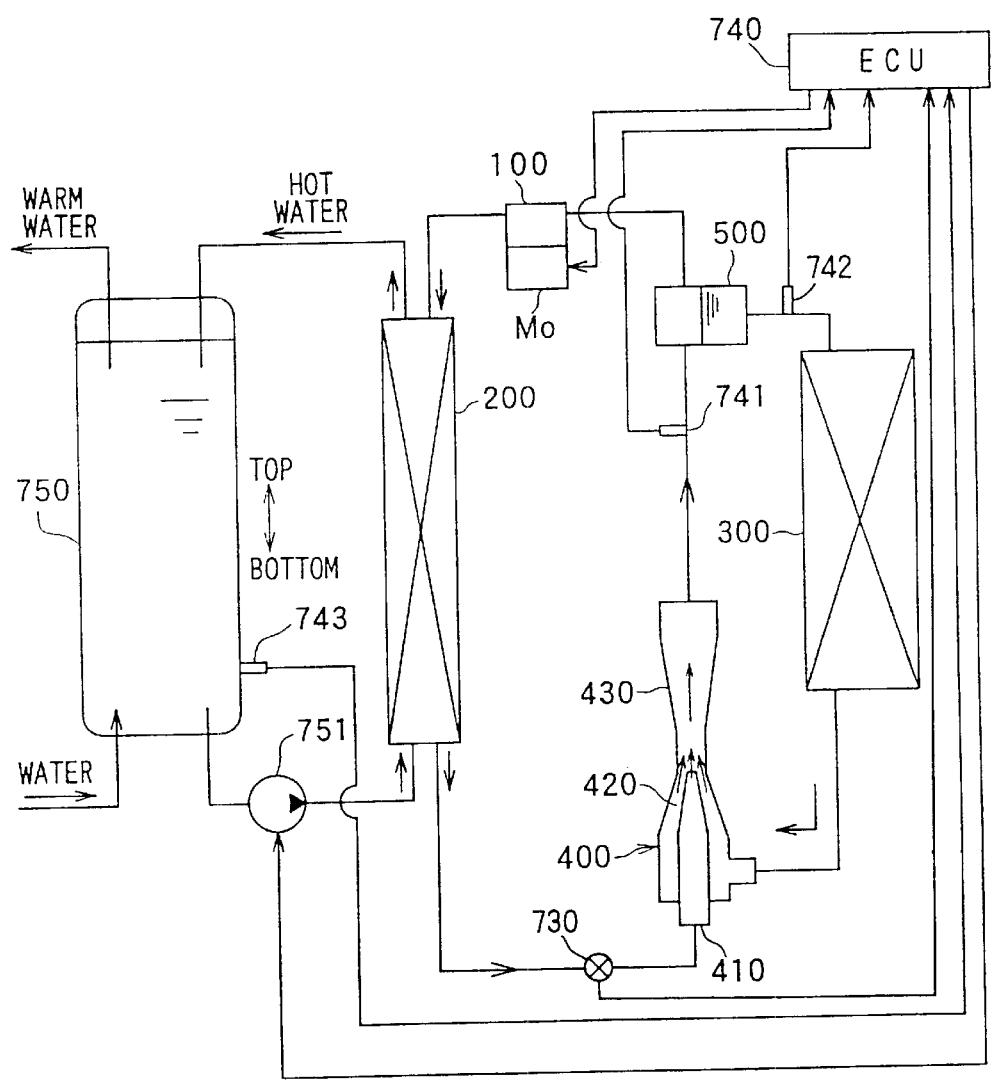
FIG. 19 is a schematic diagram showing an ejector cycle system according to a tenth preferred embodiment of the present invention.

A tenth preferred embodiment of the present invention will be now described with reference to FIG. 19. In the tenth embodiment, as shown in FIG. 19, the flow amount adjustment valve 730 is disposed at the refrigerant inlet side of the ejector 400, the parameter β is determined based on the detection temperatures of both the refrigerant temperature sensors 741, 742, and the valve opening degree of the of the flow amount adjustment valve 730 is controlled so that a high ejector efficiency η is maintained.

In the tenth embodiment, when the valve opening degree of the flow amount adjustment valve 730 is adjusted, the high-pressure side refrigerant pressure is changed. Therefore, the flow amount adjustment valve 730 can adjust the ejector efficiency η by adjusting any one of the flow amount ratio α (Ge/Gn), and the high-pressure side refrigerant pressure. In the tenth embodiment, the other parts are similar to those of the above-described ninth embodiment.

Figure 20:
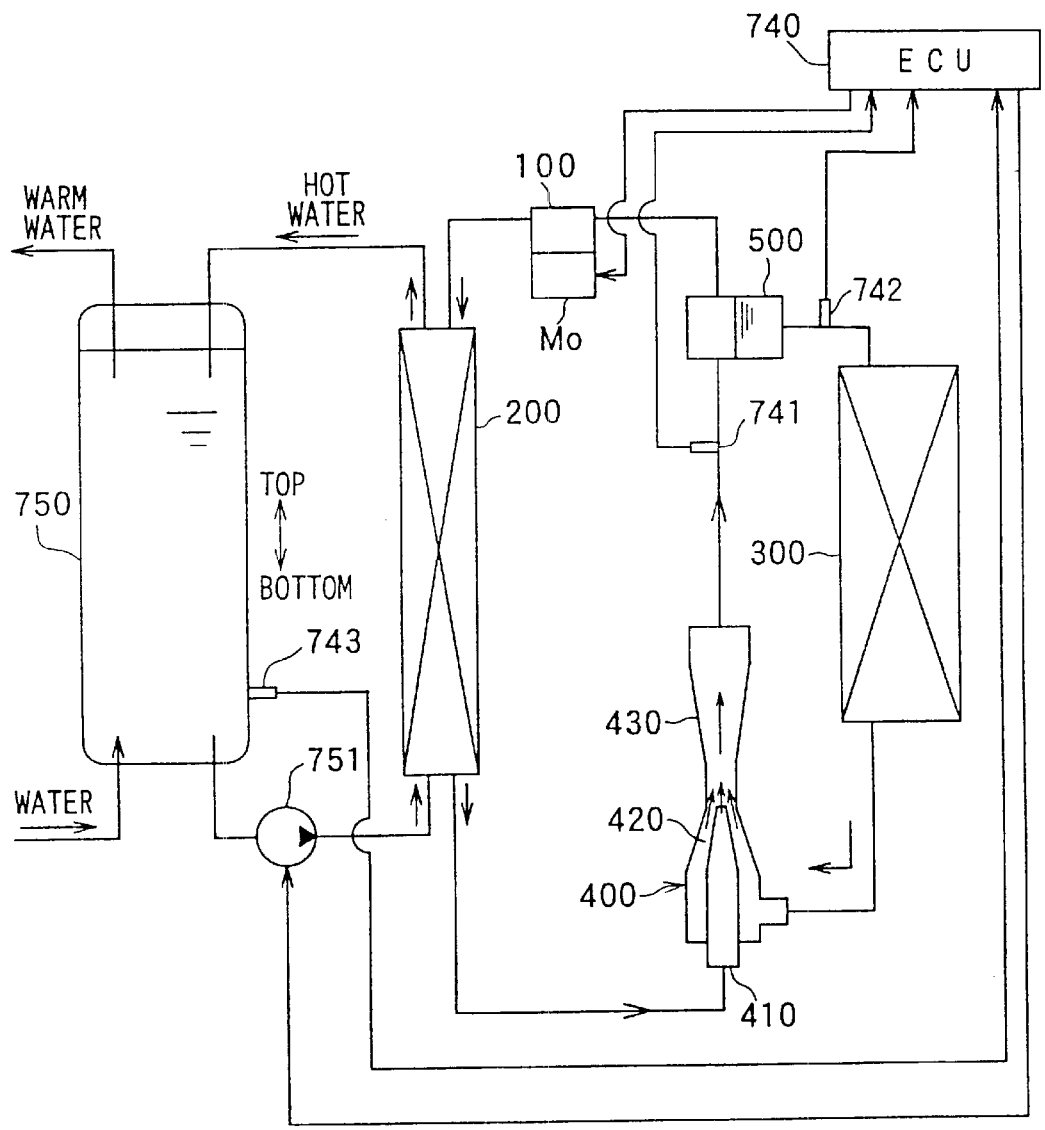
FIG. 20 is a schematic diagram showing an ejector cycle system according to an eleventh preferred embodiment of the present invention.

An eleventh preferred embodiment of the present invention will be now described with reference to FIG. 20.

In the above-described ninth and tenth embodiments, the valve opening degree of the flow amount adjustment valve 730 is adjusted, so that the ejector efficiency η becomes higher. However, in the eleventh embodiment, the flow amount adjustment valve 730 described in the ninth and tenth embodiments is not provided. That is, in the eleventh embodiment, the pump 751 is controlled based on the detection temperatures of both the refrigerant temperature sensors 741, 742 so that a flow amount of water heat-exchanged with high-pressure side refrigerant in the radiator 200 is adjusted. In this case, the temperature of hot water after the heat exchange in the radiator is adjusted, so that the energy converting efficiency (the ejector efficiency η in the ejector 400 becomes higher.

Figure 21:
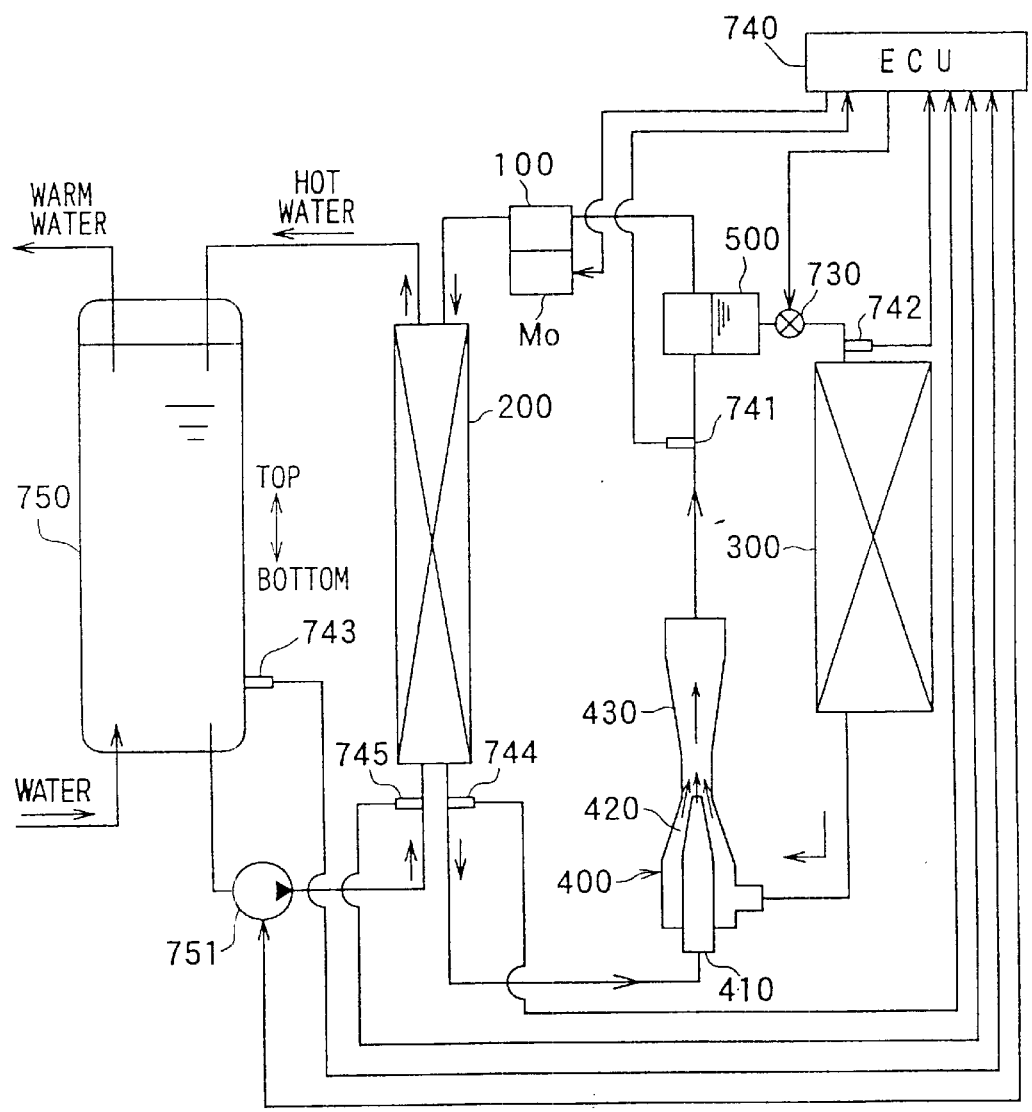
FIG. 21 is a schematic diagram showing an ejector cycle system according to a twelfth preferred embodiment of the present invention.

A twelfth preferred embodiment of the present invention will be now described with reference to FIG. 21. In the twelfth embodiment, as shown in FIG. 21, a third refrigerant temperature sensor 744 for detecting the temperature of refrigerant flowing from the radiator 200 and a water temperature 745 for detecting temperature of water flowing into the radiator 200 are further provided, as compared with the ninth embodiment shown in FIG. 17. Accordingly, in the twelfth embodiment, the pump 751 is controlled based on the detection temperatures of both the refrigerant temperature sensors 741, 742, and a temperature difference between water and refrigerant flowing through the radiator 200 is adjusted, so that the energy converting efficiency (the ejector efficiency η) in the ejector 400 becomes higher.

Figure 22:
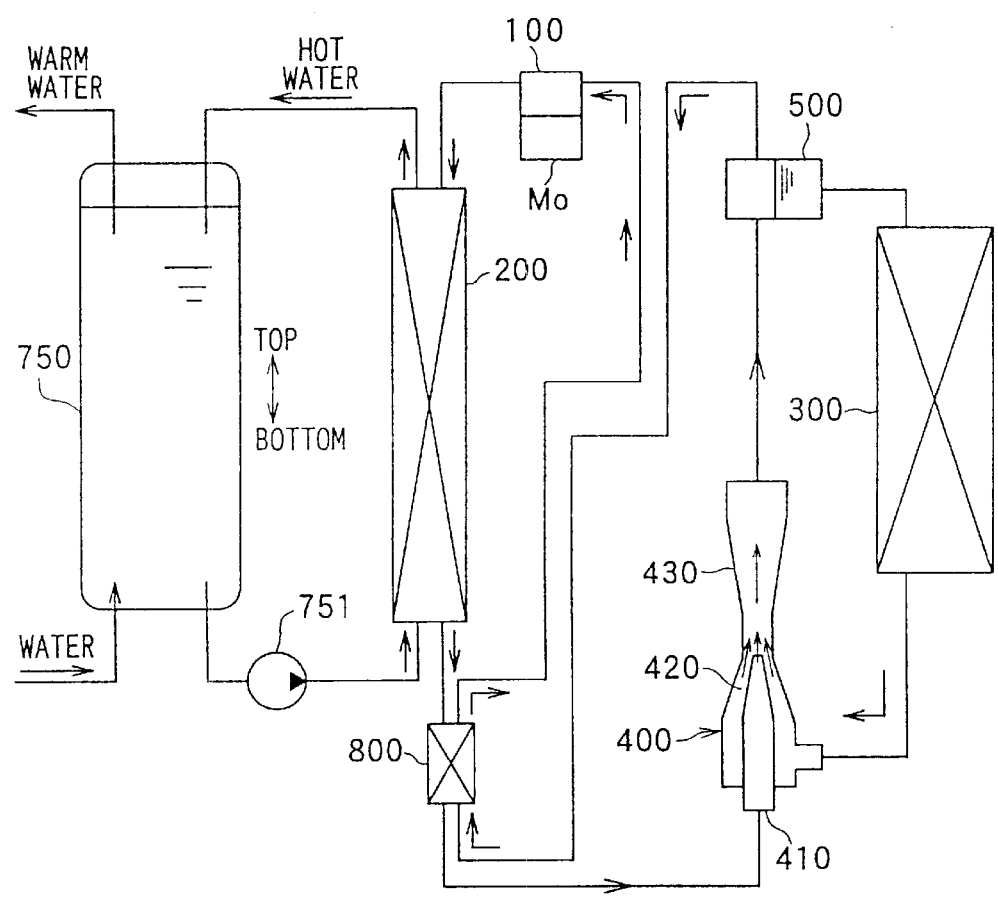
FIG. 22 is a schematic diagram showing an ejector cycle system according to a thirteenth preferred embodiment of the present invention.

A thirteenth preferred embodiment of the present invention will be now described with reference to FIG. 22. As shown in FIG. 22, in the thirteenth embodiment, a heat exchanger 800 is disposed so that refrigerant flowing from the radiator 200 and refrigerant to be sucked into the compressor 100 is heat-exchanged in the heat exchanger 800. Accordingly, refrigerant sucked into the compressor 100 is heated in the heat exchanger 800.

In the ejector cycle system, because refrigerant is sucked into the compressor 100 after being pressure-increased in the diffuser 430 of the ejector 400, the enthalpy of saturated gas refrigerant sucked into the compressor 100 is smaller as compared with a general vapor-compression type refrigerant cycle without using the ejector 400. Accordingly, when the refrigerant pressure discharged from the compressor 100 in the ejector cycle system is made equal to the refrigerant pressure discharged from the compressor of the general vapor-compression type refrigerant cycle, the temperature of refrigerant discharged from the compressor 100 becomes lower in the ejector cycle system as compared with the general vapor-compression type refrigerant cycle.

According to the thirteenth embodiment, the temperature of refrigerant sucked into the compressor 100 can be increased by the heat exchange between refrigerant flowing from the radiator 200 and refrigerant sucked into the compressor 100. Therefore, the temperature of refrigerant discharged from the compressor 100 can be increased, and the heating capacity of the radiator 200 and the COP of the ejector cycle system can be improved.

Figure 23:
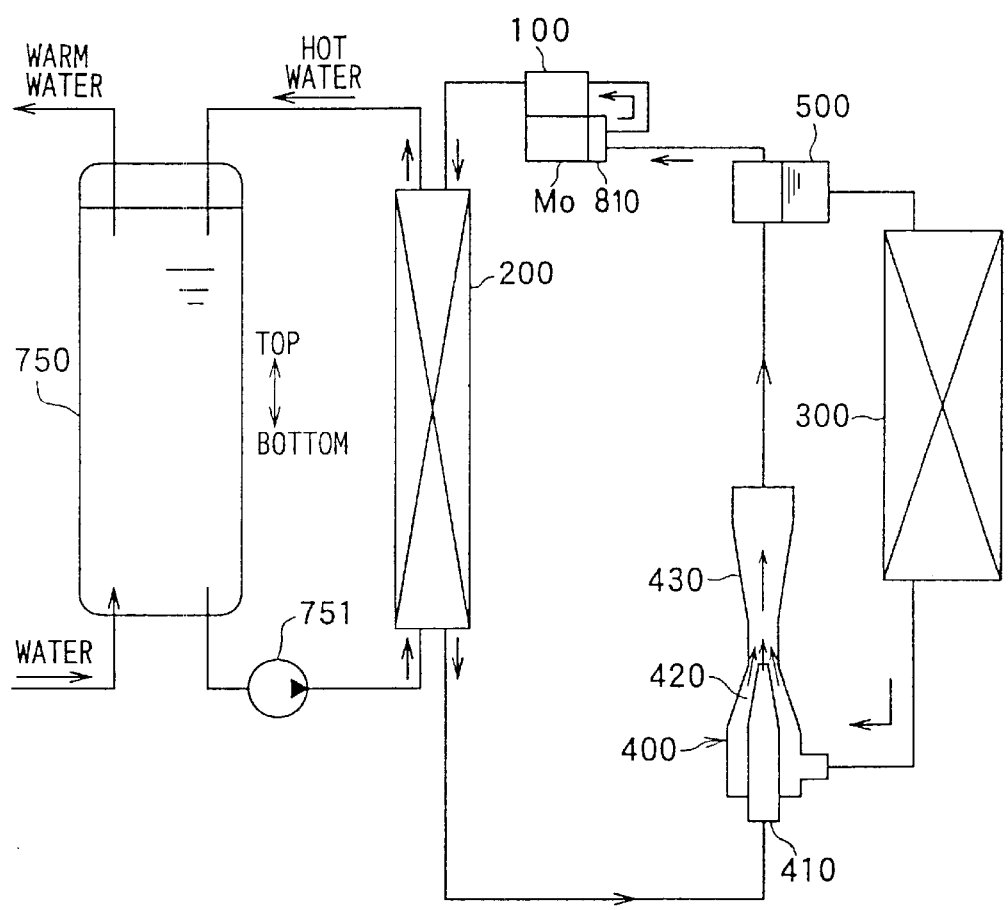
FIG. 23 is a schematic diagram showing an ejector cycle system according to a fourteenth preferred embodiment of the present invention.

A fourteenth preferred embodiment of the present invention will be now described with reference to FIG. 23. In the fourteenth embodiment, as shown in FIG. 23, a heat exchanger 810 is disposed so that the electrical motor Mo driving the compressor 100 and refrigerant sucked into the compressor 100 are heat-exchanged. Accordingly, refrigerant sucked into the compressor 100 is heated by the heat from the electrical motor Mo, and the advantage similar to that of the above-described thirteenth embodiment can be obtained.

Figure 24:
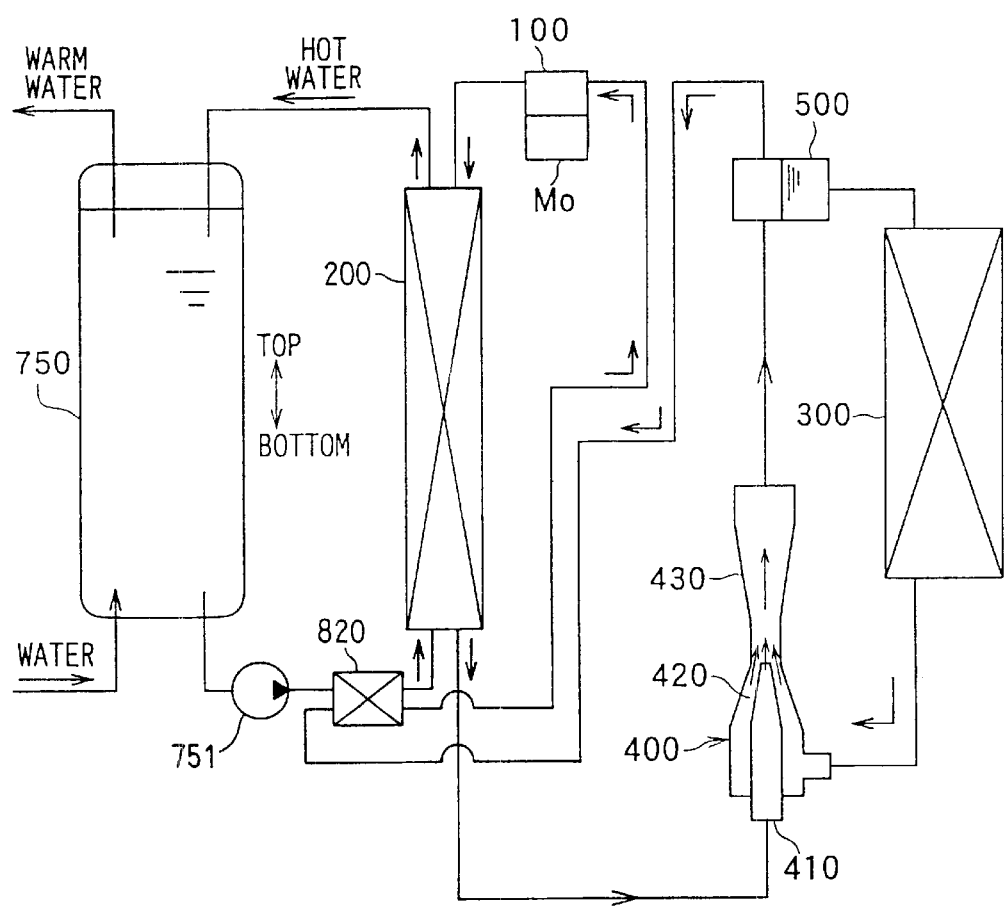
FIG. 24 is a schematic diagram showing an ejector cycle system according to a fifteenth preferred embodiment of the present invention.

A fifteenth preferred embodiment of the present invention will be now described with reference to FIG. 24. In the fifteenth embodiment, as shown in FIG. 24, a heat exchanger 820 is disposed so that refrigerant sucked into the compressor 100 is heated by water flowing from the water tank 750. Accordingly, the temperature of refrigerant sucked into the compressor 1200 is increased, the consumed power of the compressor 100 is decreased, and the COP of the ejector cycle system is improved.

Figure 25:
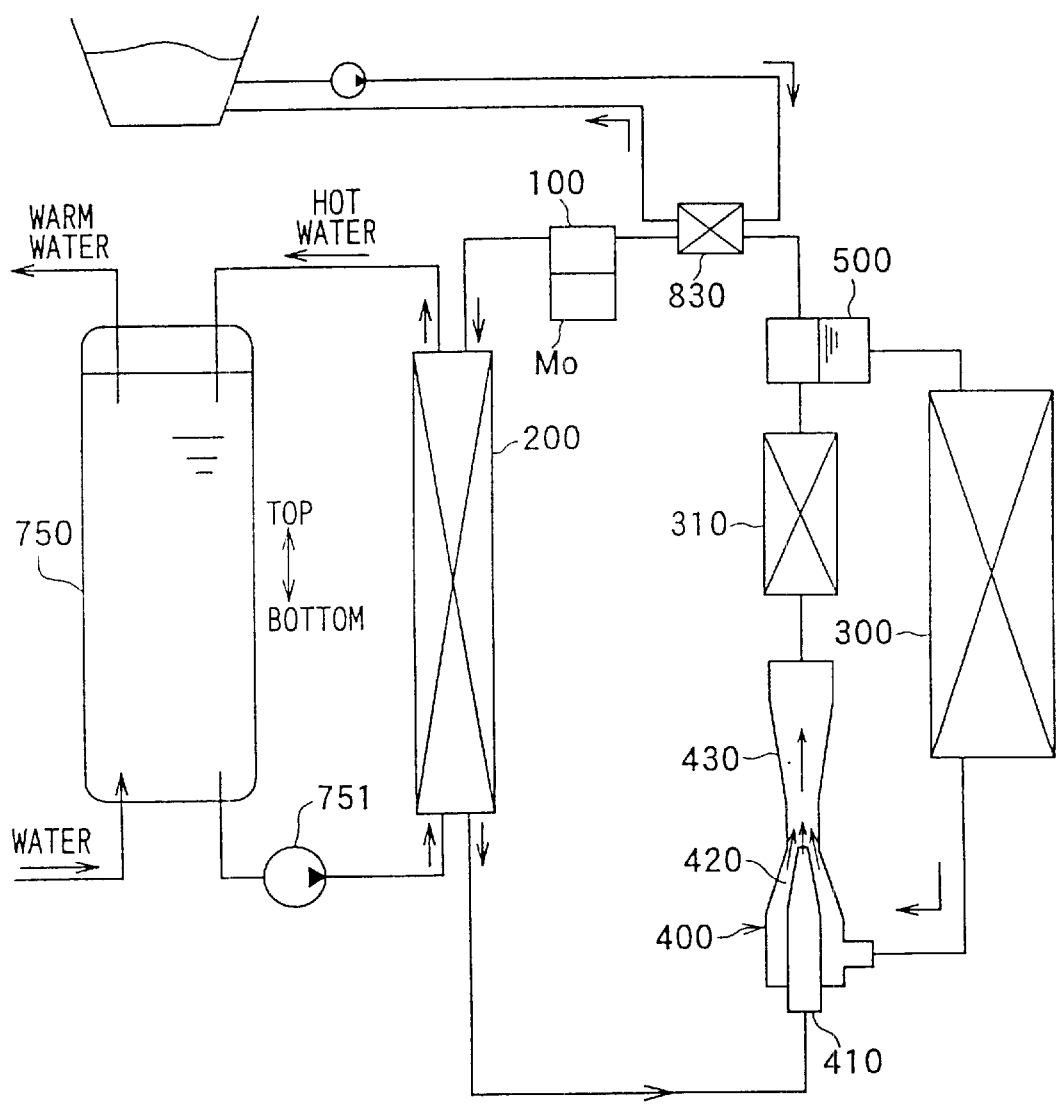
FIG. 25 is a schematic diagram showing an ejector cycle system according to a sixteenth preferred embodiment of the present invention.

A sixteenth preferred embodiment of the present invention will be now described with reference to FIGS. 25 and 26. In the sixteenth embodiment, the ejector cycle system is applied to a heat control system (heat management) of an entire building such as a house, including a water heater. Specifically, as shown in FIG. 25, exhaust heat (e.g., remained heat) generated in the building is recovered, and is heat-exchanged with refrigerant sucked into the compressor 100 in a heat exchanger 830. In addition, an additional evaporator 310 is disposed between the ejector 400 and the gas-liquid separator 500. Accordingly, using the exhaust gas, the heating capacity (water-heating capacity) in the radiator 200 and the COP of the refrigerant cycle can be improved. For example, refrigerant absorbs heat in the evaporator 300 while cooling of a compartment is performed, and water can be heated in the radiator 200 using both the absorbed heat in the evaporator 300 and the absorbed heat in the evaporator 310. In the sixteenth embodiment, the cooling (air conditioning) of the compartment is performed using the evaporator 300. However, the cooling of the passenger compartment may be performed using the evaporator 310, or may be performed using both the evaporators 300, 310.

Figure 26:
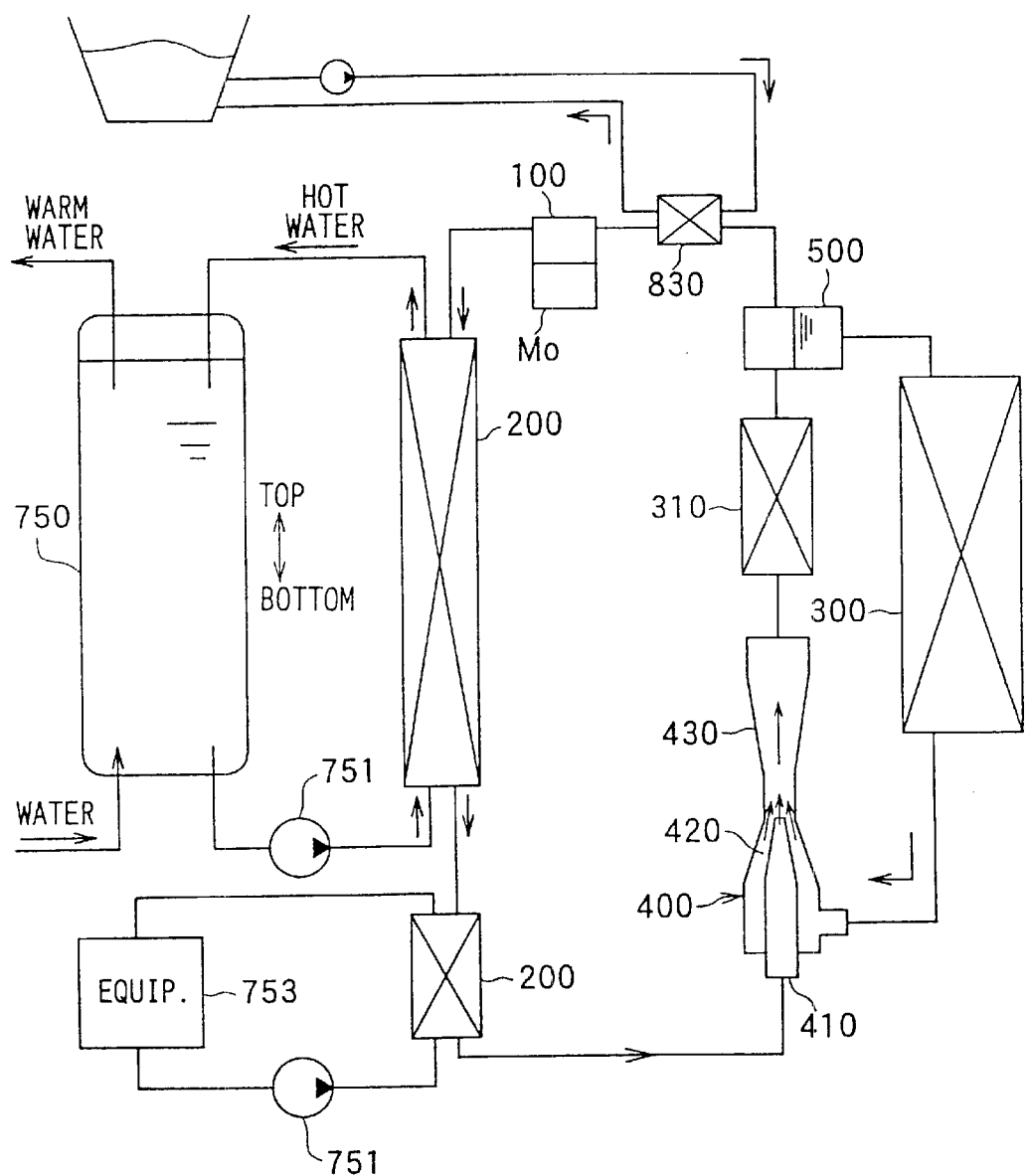
FIG. 26 is a schematic diagram showing an ejector cycle system according to a modification of the sixteenth embodiment.

Further, as shown in FIG. 26, plural radiators 200 can be provided in accordance with necessary temperature areas, respectively. For example, an equipment 753 in which a water tank is unnecessary, is provided in a water circuit, and water can be circulated in the water circuit between the equipment 753 and the radiator 200 by operation of a water pump 751. That is, heat can be supplied from the single ejector cycle system to the equipment 753 in which the water tank 750 is unnecessary, and a water heater which needs the water tank 750.

Figure 27:
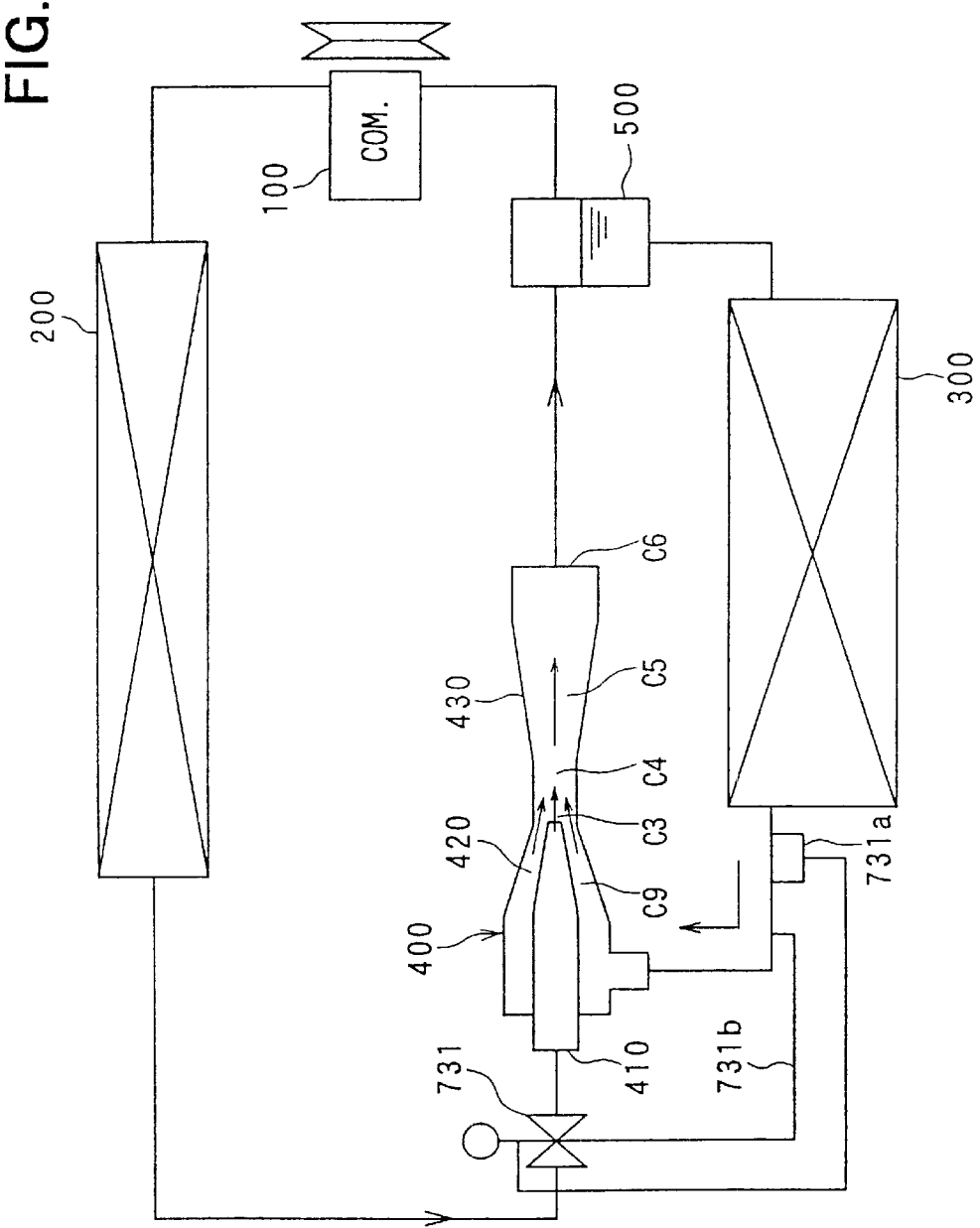
FIG. 27 is a schematic diagram showing an ejector cycle system according to a seventeenth preferred embodiment of the present invention.
Figure 28:
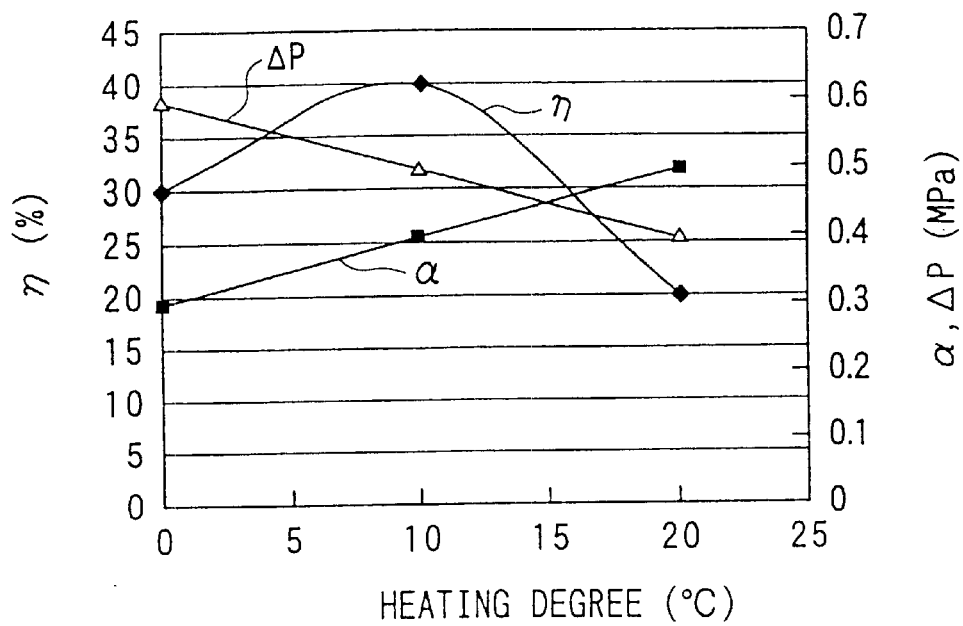
FIG. 28 is a graph showing relationships between a refrigerant heating degree of an evaporator, as well as an ejector efficiency $\eta$, a flow amount ratio $\alpha$ (Ge/Gn) and an increased pressure $\Delta P$ in an ejector, according to the seventeenth embodiment.

A seventeenth preferred embodiment of the present invention will be now described with reference to FIGS. 27 and 28. As shown in FIG. 27, in the seventeenth embodiment, a control valve 731 is disposed in a refrigerant passage between the radiator 200 and the ejector 400 to control an opening degree of the refrigerant passage based on a refrigerant heating degree (super-heating degree) at a refrigerant outlet side of the evaporator 300.

The control valve 731 is a pressure-equalizing type which mechanically senses the refrigerant temperature at the refrigerant outlet side of the evaporator 300 and maintains the refrigerant heating degree at the refrigerant outlet side of the evaporator 300 at a predetermined degree. The control valve 731 has a temperature sensitive portion 731*a* sensing the refrigerant temperature at the refrigerant outlet side of the evaporator 300, and a pressure-equalizing pipe 731*b*.

When the heating degree at the refrigerant outlet side of the evaporator 300 becomes larger, the refrigerant flow amount Ge flowing into the evaporator 300 becomes larger. On the other hand, because the operation of the ejector 400 is constant, the increased pressure $\Delta P$ in the diffuser 430 of the ejector 400 is reduced when the refrigerant flow amount becomes larger and the flow amount ratio $\alpha$ (Ge/Gn) becomes larger. Therefore, as shown in FIG. 28, the ejector efficiency $\eta$ is changed in accordance with the heating degree at the refrigerant outlet side of the evaporator 300, and becomes maximum at a heating degree.

In the seventeenth embodiment, the super-heating degree at the refrigerant outlet side of the evaporator 300 is controlled by the control valve 731 so that the ejector efficiency $\eta$ becomes maximum. However, in the seventeenth embodiment, instead of the control valve 731, an electrical valve may be used so that a control target heating degree at the refrigerant outlet of the evaporator 300 is changed in accordance with the operation state of the ejector cycle system.

Figure 30:
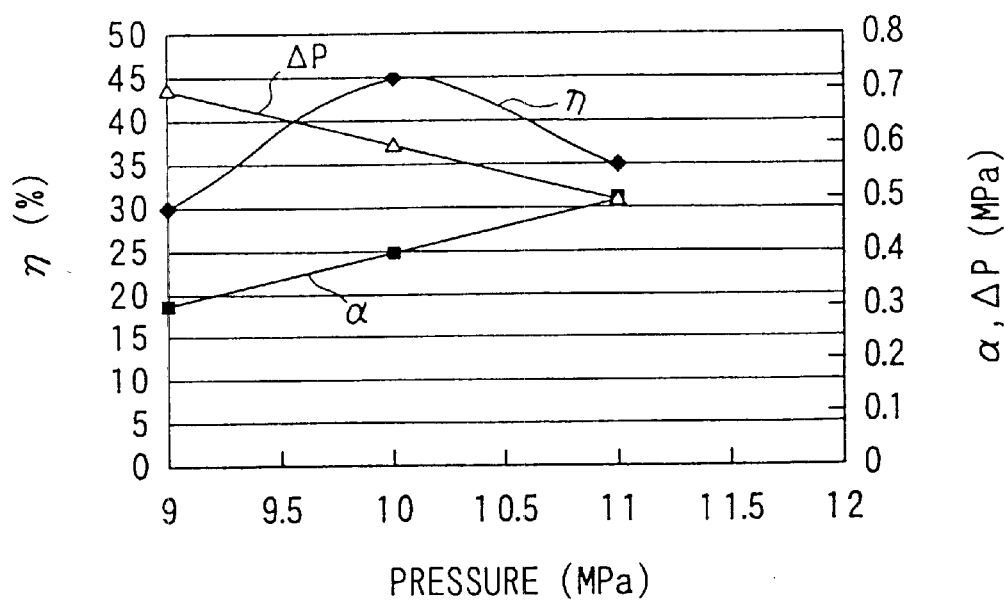
FIG. 30 is a graph showing relationships between a high-pressure side refrigerant pressure, as well as an ejector efficiency $\eta$, a flow amount ratio $\alpha$ (Ge/Gn) and an increased pressure $\Delta P$ in an ejector, according to the eighteenth embodiment.

An eighteenth preferred embodiment of the present invention will be now described with reference to FIGS. 29 and 30. As shown in FIG. 29, a control valve 732 is disposed in a refrigerant passage between the radiator 200 and the ejector 400 to control a high-pressure side refrigerant pressure flowing from the radiator 200 based on a high-pressure side refrigerant temperature. Here, the high-pressure side refrigerant pressure means the refrigerant pressure before being decompressed in the control valve 732 and the nozzle 410 of the ejector 400.

The control valve 732 of the eighteenth embodiment has a temperature sensitive portion 732*a* which mechanically senses the refrigerant temperature at the refrigerant outlet side of the radiator 200. The control valve 732 controls the high-pressure side refrigerant pressure in accordance with the refrigerant temperature sensed by the temperature sensitive portion 732*a*.

When the high-pressure side refrigerant pressure becomes larger, the refrigerant flow amount Gn flowing into the radiator 200 becomes smaller. On the other hand, because the operation of the ejector 400 is constant, the increased pressure $\Delta P$ in the diffuser 430 of the ejector 400 is reduced when the refrigerant flow amount Gn becomes smaller and the flow amount ratio $\alpha$ (Ge/Gn) becomes larger. Therefore, as shown in FIG. 30, the ejector efficiency $\eta$ is changed in accordance with the high-pressure side refrigerant pressure.

That is, there is a high-pressure side refrigerant pressure at which the ejector efficiency η becomes maximum.

In the eighteenth embodiment, the high-pressure side refrigerant pressure is controlled by the control valve 732 so that the ejector efficiency η becomes maximum. However, in the eighteenth embodiment, instead of the control valve 732 operated mechanically, an electrical valve may be used.

Figure 31:
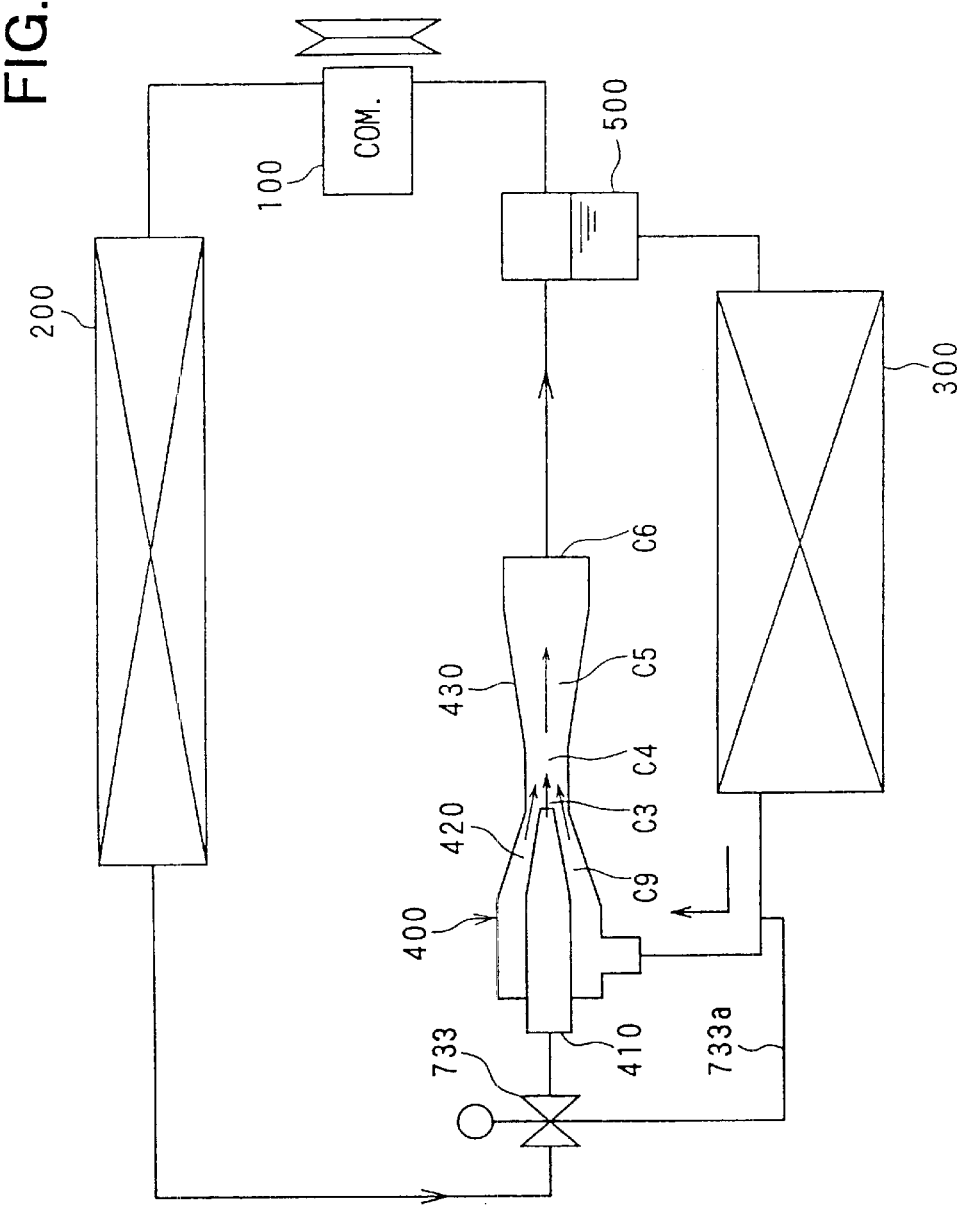
FIG. 31 is a schematic diagram showing an ejector cycle system according to a nineteenth preferred embodiment of the present invention.

A nineteenth preferred embodiment of the present invention will be now described with reference to FIG. 31. As shown in FIG. 31, a control valve 733 is disposed in a refrigerant passage between the radiator 200 and the ejector 400 to control a valve opening degree of the control valve 733 based on the pressure (heat load within the evaporator 300) within the evaporator 300.

The control valve 733 mechanically senses the refrigerant pressure within the evaporator 300, and controls the valve opening degree in accordance with the sensed pressure. The control valve 733 has a pressure-equalizing pipe 733a. When the pressure within the evaporator 300 becomes larger, the valve opening degree of the control valve 733 becomes larger. Conversely, when the pressure within the evaporator 300 becomes smaller, the valve opening degree of the control valve 733 becomes smaller.

According to the nineteenth embodiment, the valve opening degree of the control valve 733 is controlled based on the pressure (heat load of the evaporator 300) within the evaporator 300. Therefore, even when the pressure within the evaporator 300 is changed, the valve opening degree of the control valve 733 is controlled so that the ejector efficiency η can be maintained at a high value.

In the nineteenth embodiment, when the pressure within the evaporator 300 becomes larger, the valve opening degree of the control valve 733 becomes larger. Conversely, when the pressure within the evaporator 300 becomes smaller, the valve opening degree of the control valve 733 becomes smaller. Thus, the ejector efficiency η can be maintained at a high value while the flow amount of refrigerant flowing into the evaporator 300 can be suitably controlled.

Figure 32:
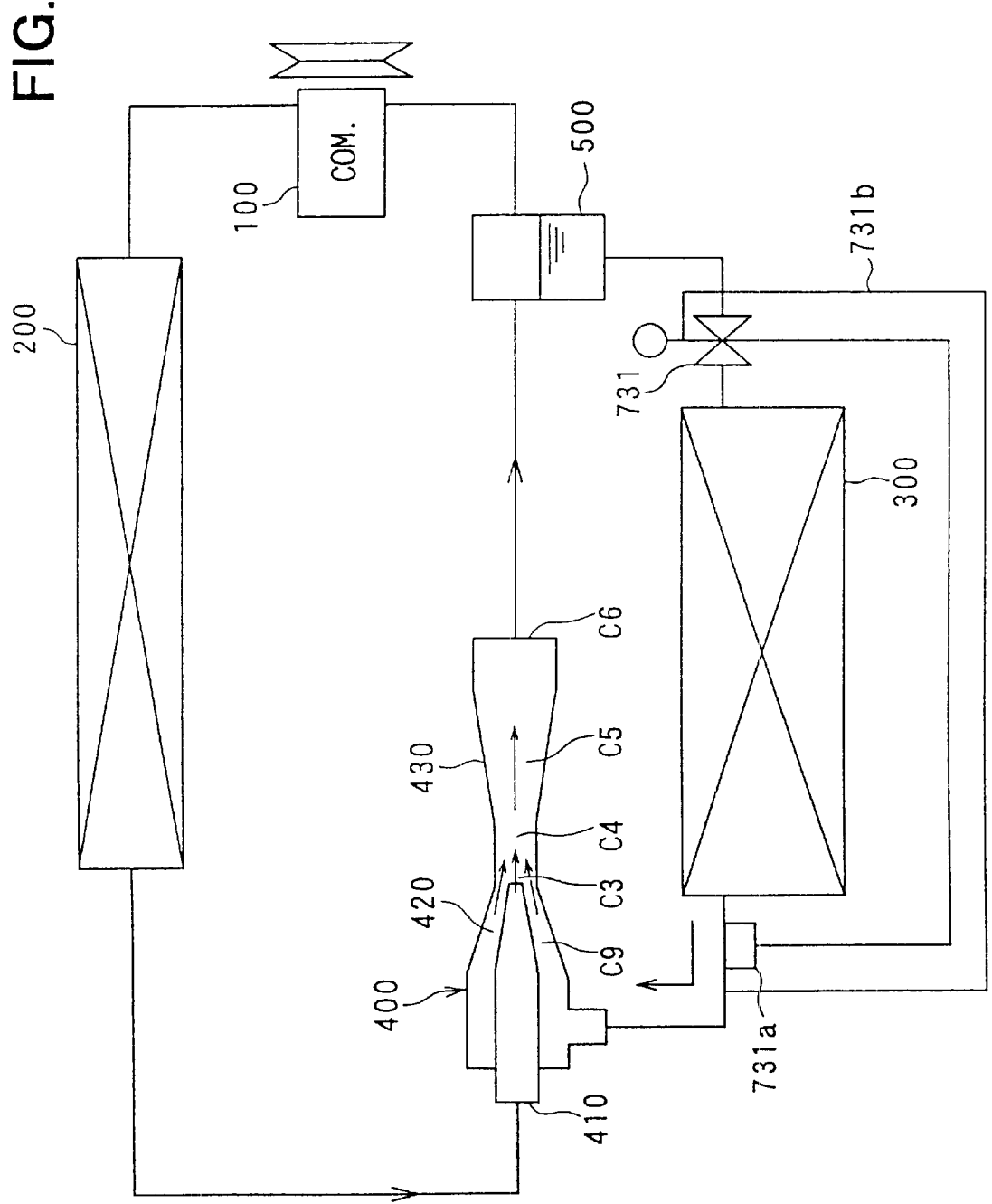
FIG. 32 is a schematic diagram showing an ejector cycle system according to a twentieth preferred embodiment of the present invention.

A twentieth preferred embodiment of the present invention will be now described with reference to FIG. 32. In the above-described seventeenth embodiment, the control valve 731 is provided in the refrigerant passage between the radiator 200 and the ejector 400, and the valve opening degree of the control valve 731 is controlled based on the heating degree of refrigerant at the refrigerant outlet of the evaporator 300. However, in the twentieth embodiment, as shown in FIG. 32, the control valve 731 is disposed in a refrigerant passage between the gas-liquid separator 500 and the evaporator 300, and the valve opening degree of the control valve 731 is controlled based on the heating degree of refrigerant at the refrigerant outlet of the evaporator 300. In the twentieth embodiment, because pressure applied to the control valve 731 can be made smaller as compared with the above-described seventeenth embodiment, the size and the production cost of the control valve 731 can be reduced.

Figure 33:
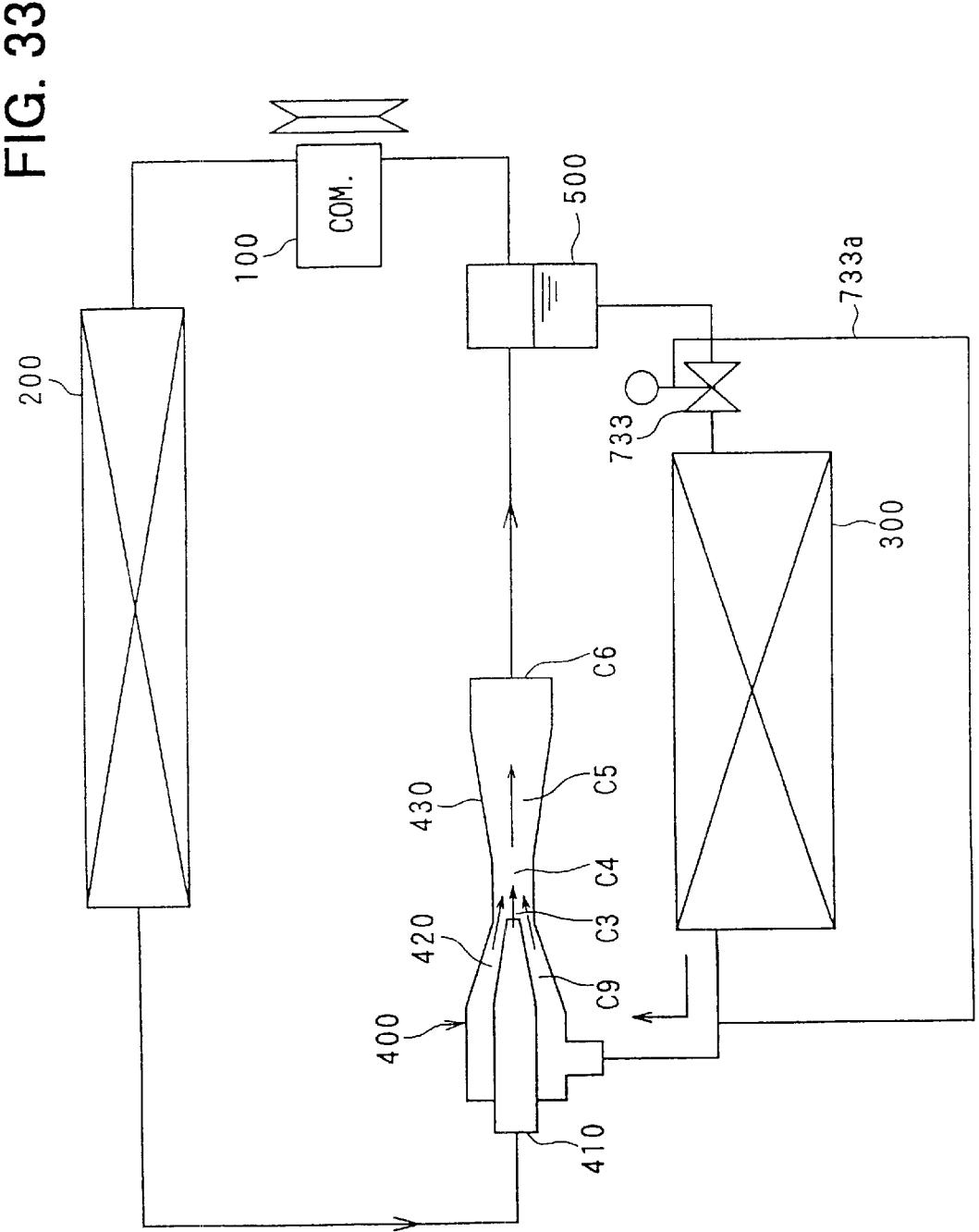
FIG. 33 is a schematic diagram showing an ejector cycle system according to a twenty-first preferred embodiment of the present invention.

A twenty-first preferred embodiment of the present invention will be now described with reference to FIG. 33. In the above-described nineteenth embodiment, the control valve 733 is provided in the refrigerant passage between the radiator 200 and the ejector 400. However, in the twenty-first embodiment, as shown in FIG. 33, the control valve 733 is disposed in the refrigerant passage between the gas-liquid separator 500 and the evaporator 300, and the valve opening degree of the control valve 733 is controlled based on the pressure (heat load in the evaporator 300) of the evaporator 300.

Figure 34:
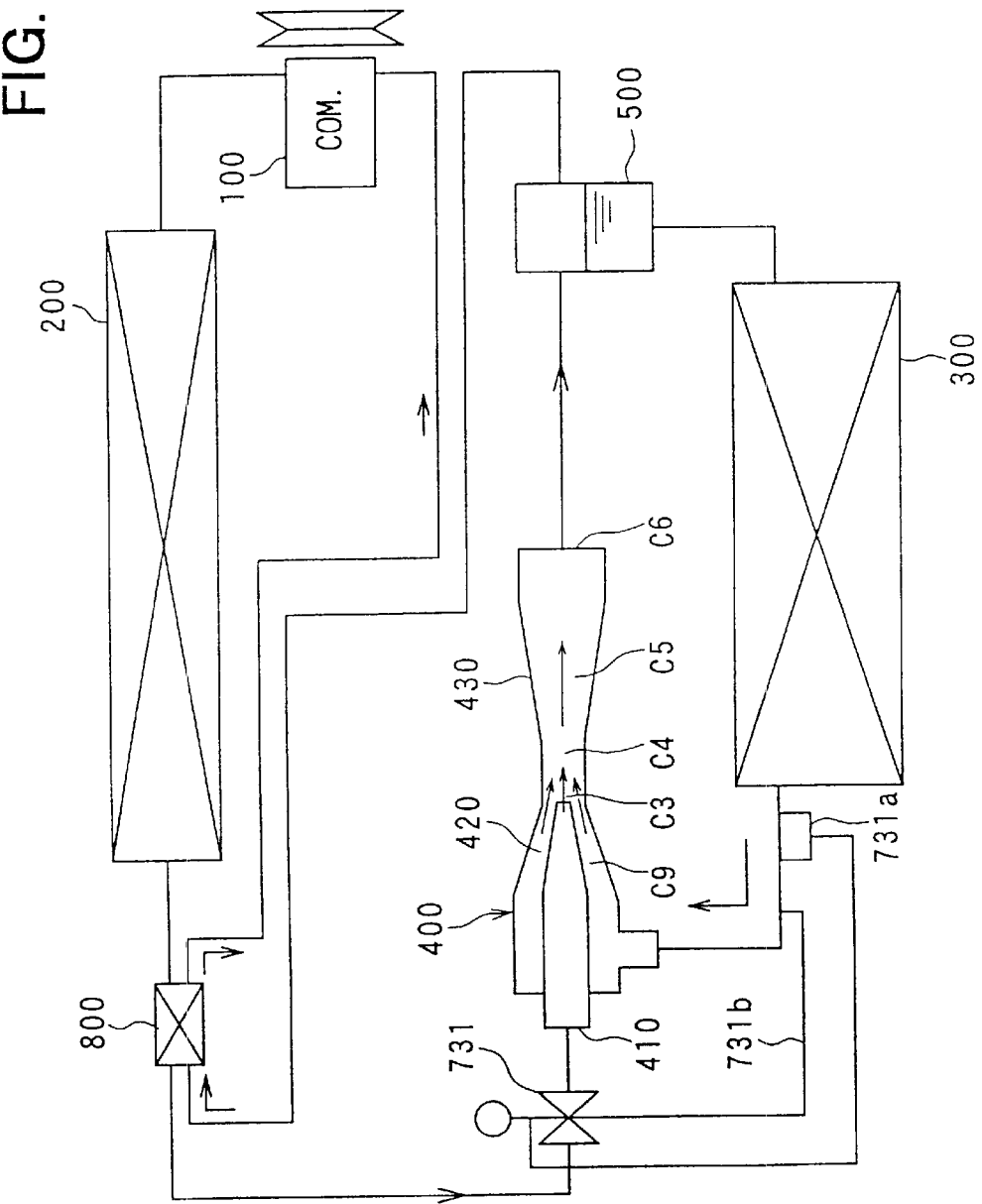
FIG. 34 is a schematic diagram showing an ejector cycle system according to a twenty-second preferred embodiment of the present invention.
Figure 35:
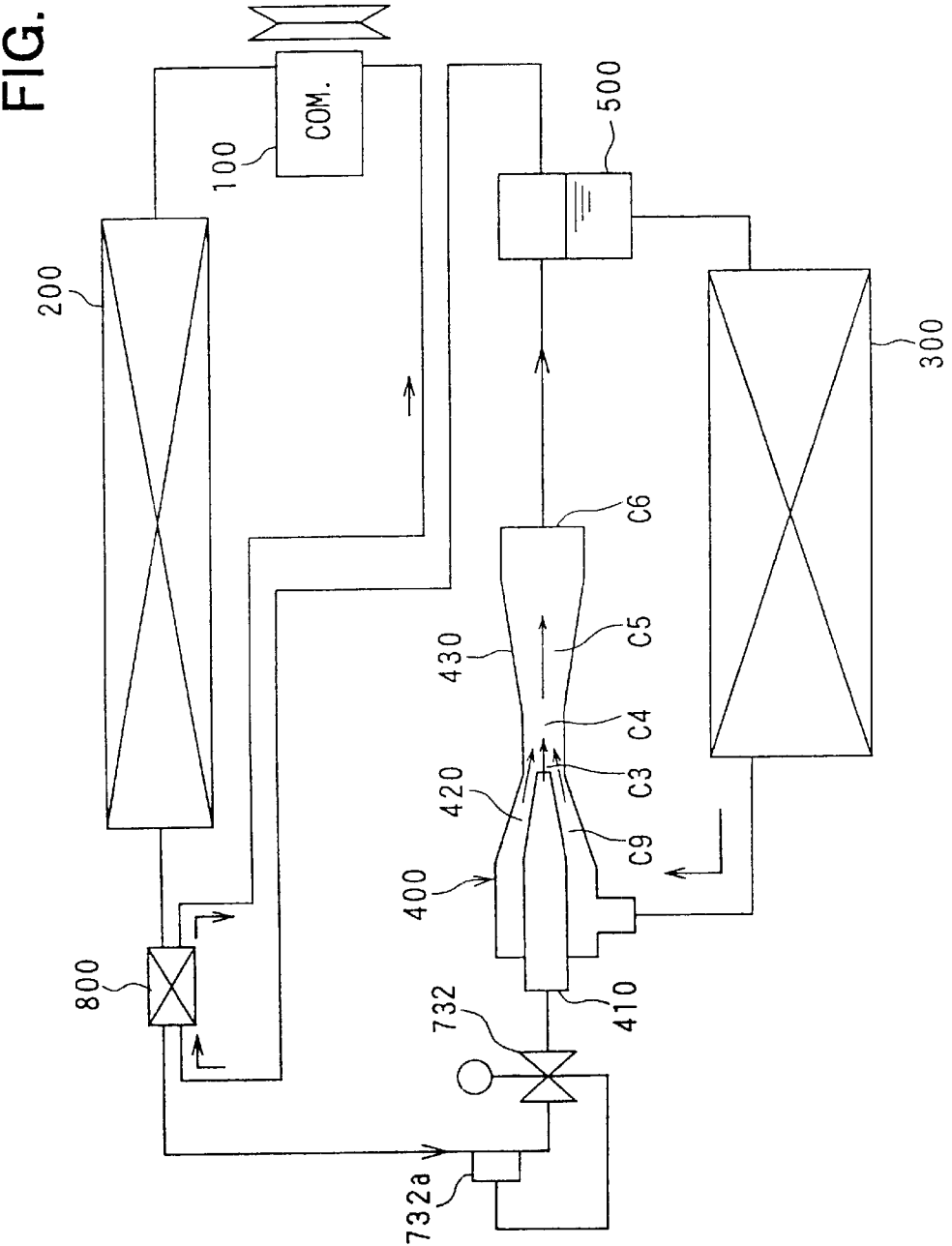
FIG. 35 is a schematic diagram showing an ejector cycle system according to a modification of the twenty-second embodiment.
Figure 36:
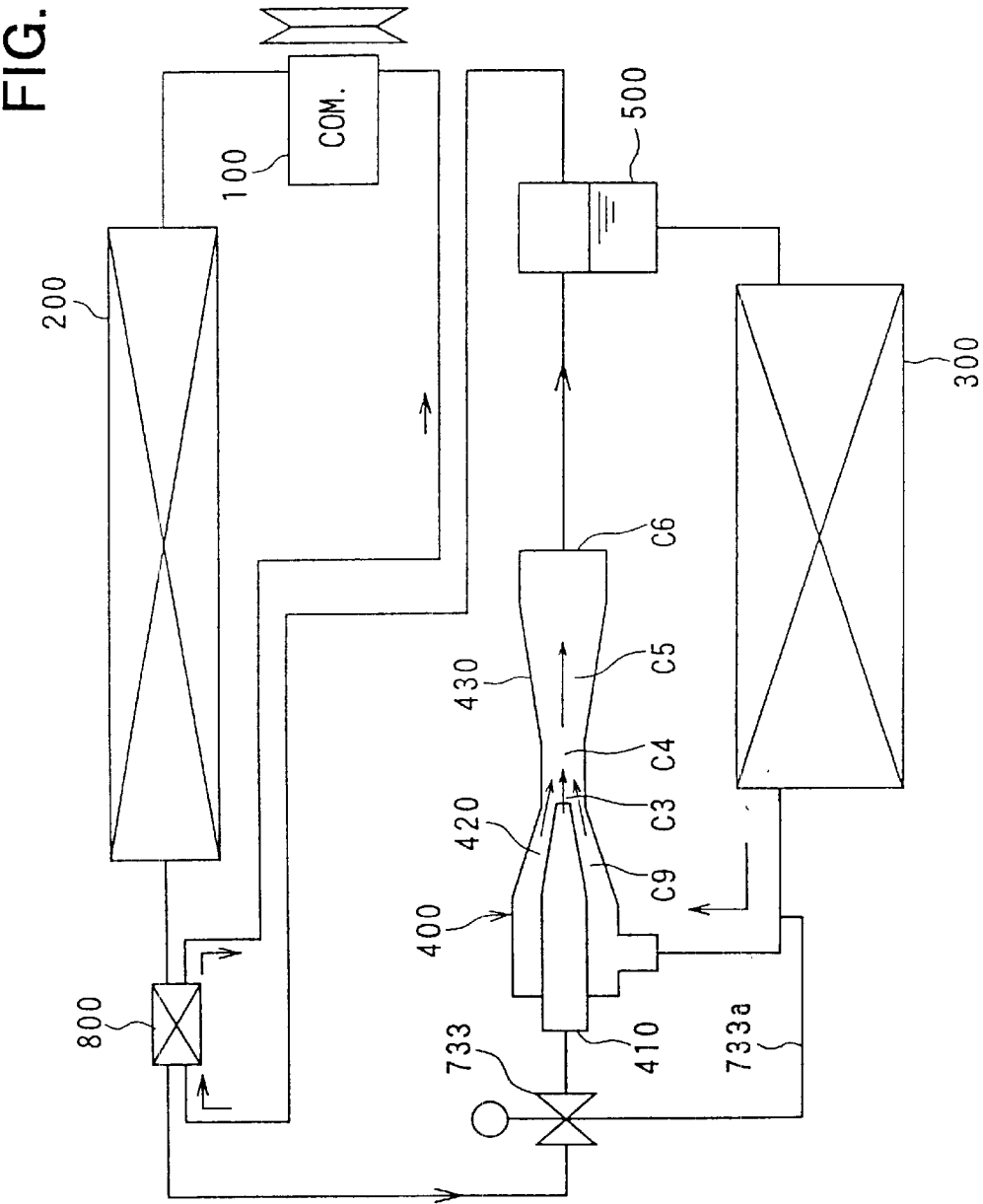
FIG. 36 is a schematic diagram showing an ejector cycle system according to a modification of the twenty-second embodiment.
Figure 37:
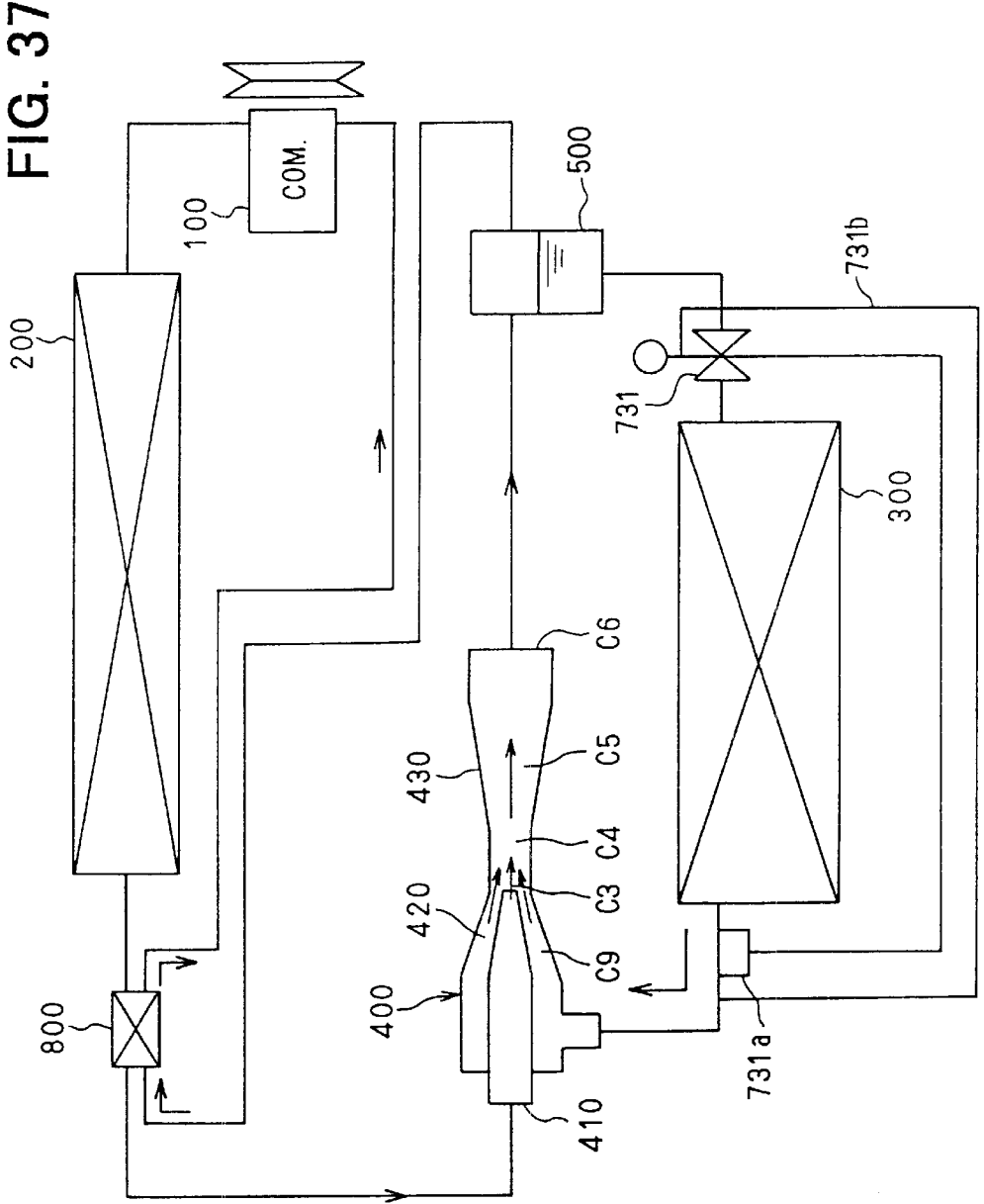
FIG. 37 is a schematic diagram showing an ejector cycle system according to a modification of the twenty-second embodiment.
Figure 38:
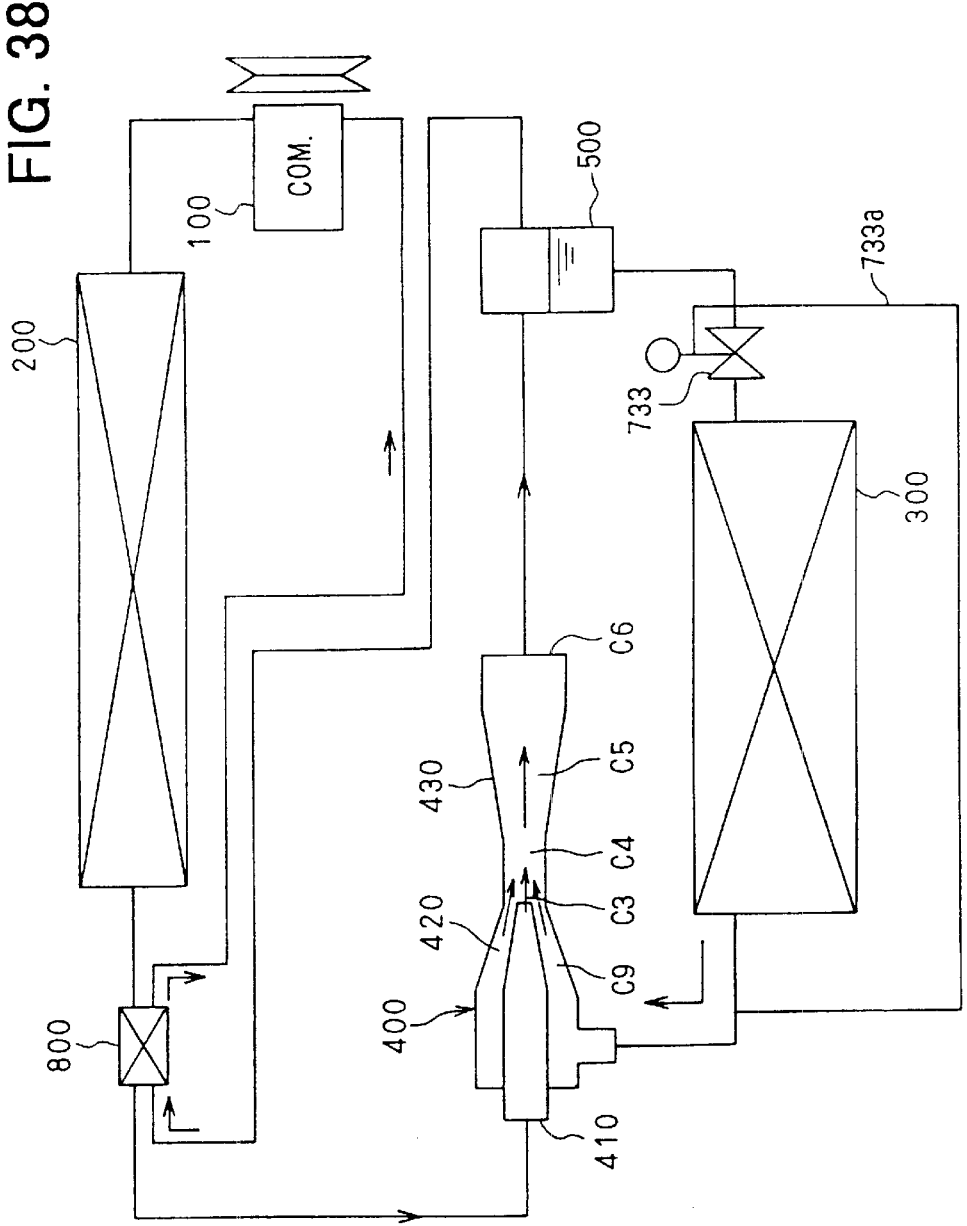
FIG. 38 is a schematic diagram showing an ejector cycle system according to a modification of the twenty-second embodiment.

A twenty-second preferred embodiment of the present invention will be now described with reference to FIGS. 34–38. As shown in FIGS. 34–38, a heat exchanger (i.e., inner heat exchanger) 800, in which refrigerant discharged from the radiator 200 and refrigerant sucked into the compressor 100 are heat-exchanged, is provided. FIG. 34 is an example where the heat exchanger 800 is provided in the ejector cycle system of the above-described seventeenth embodiment. FIG. 35 is an example where the heat exchanger 800 is provided in the ejector cycle system of the above-described eighteenth embodiment. FIG. 36 is an example where the heat exchanger 800 is provided in the ejector cycle system of the above-described nineteenth embodiment. FIG. 37 is an example where the heat exchanger 800 is provided in the ejector cycle system of the above-described twentieth embodiment. FIG. 38 is an example where the heat exchanger 800 is provided in the ejector cycle system of the above-described twenty-first embodiment.

According to the twenty-second embodiment, refrigerant flowing into the control valve 731–733 is cooled by the heat exchanger 800. Therefore, expansion energy in the nozzle 410 of the ejector 400 is reduced, the flow rate (flow speed) of refrigerant flowing from the nozzle 410 is decreased, and the dryness of refrigerant at the outlet of the nozzle 410 is decreased. Thus, the flow amount and flow speed of refrigerant sucked from the evaporator 300 to the ejector 400 are increased, and a flow speed difference between the refrigerant flow discharged from the nozzle 410 and the refrigerant flow sucked from the evaporator becomes smaller. Accordingly, an eddy loss, with an eddy generated when the refrigerant sucked from the evaporator and refrigerant discharged from the nozzle 410 are mixed, can become smaller. As a result, the ejector efficiency η can be improved.

Figure 39:
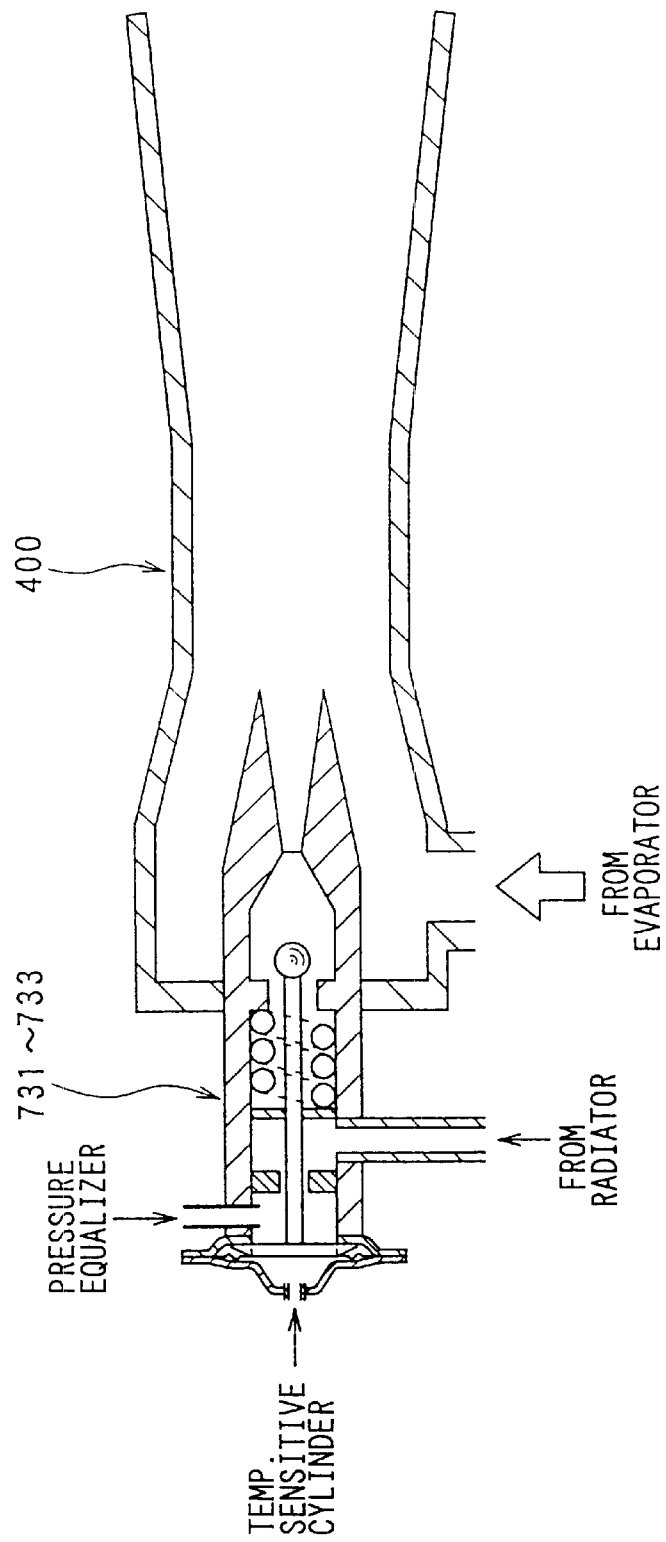
FIG. 39 is a schematic diagram showing an ejector for an ejector cycle system according to a twenty-third preferred embodiment of the present invention.

A twenty-third preferred embodiment of the present invention will be now described with reference to FIG. 39. In the twenty-third embodiment, as shown in FIG. 39, the control valve 731–733 disposed in the refrigerant passage between the ejector 400 and the radiator 200 is integrated with the nozzle 410, so that the ejector 400 and the control valve 731–733 are integrated. Because the control valve 731–733 are provided, refrigerant can be decompressed (throttled) at two steps of the control valve 731–733 and the nozzle 410 in the ejector 400. That is, refrigerant can be boiled once at the first step of the control valve 731–733, and is expanded at the second step around an inlet portion of the nozzle 410 so that the refrigerant pressure can be effectively recovered. Accordingly, refrigerant with boiling cores is boiled at the second step of the nozzle 410, the boiling of refrigerant at the second step of nozzle 410 can be facilitated, and refrigerant can be boiled even at a center portion separated from an inner wall of the nozzle 410. As a result, liquid drop can be sufficiently atomized in the nozzle 410, and the ejector efficiency η can be improved.

As shown in FIG. 39, in an integrated structure of the ejector 400 and the control valve 731–733, connection portions connecting a pressure equalizer and a temperature sensitive cylinder are provided.

Figure 40:
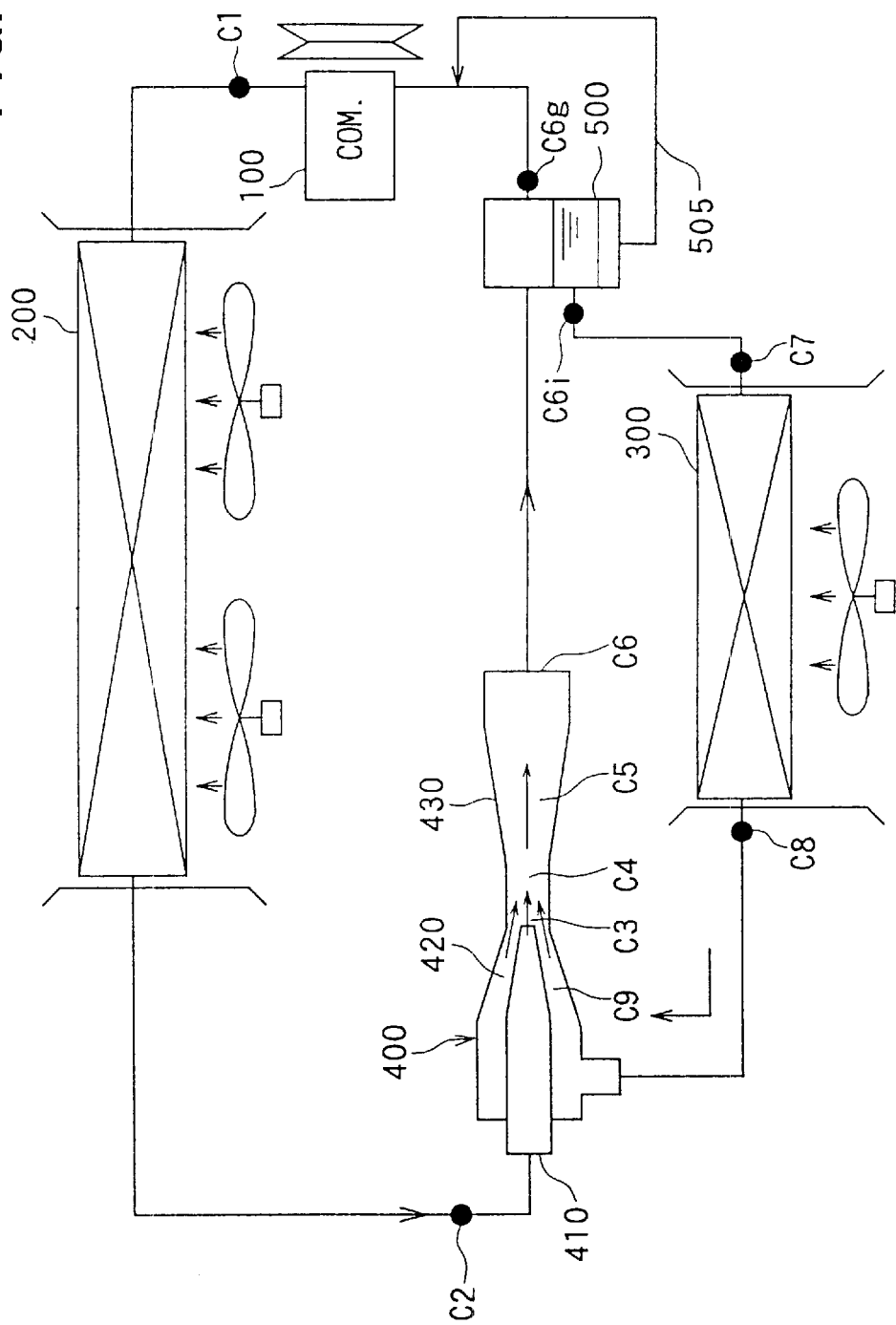
FIG. 40 is a schematic diagram showing an ejector cycle system according to a twenty-fourth preferred embodiment of the present invention.
Figure 41:
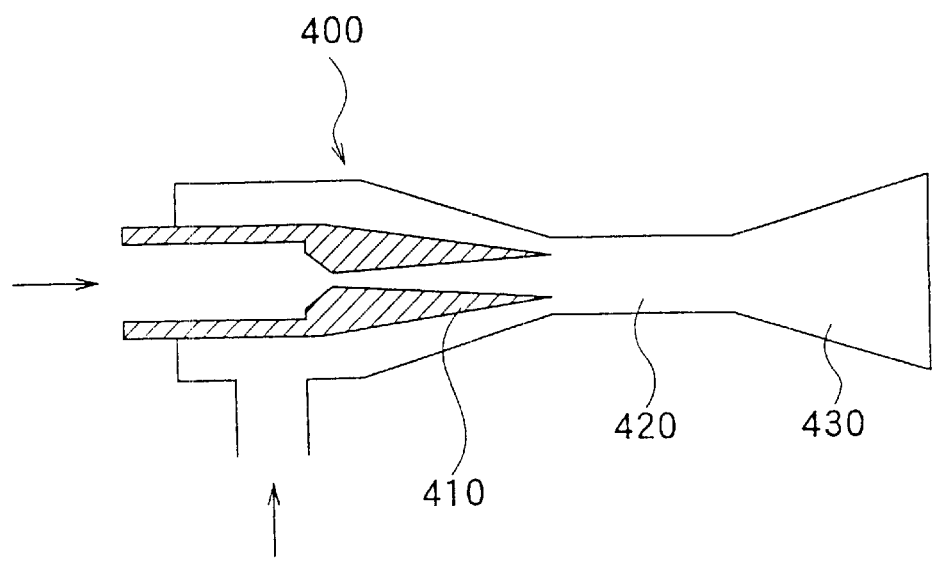
FIG. 41 is a schematic diagram showing an ejector for the ejector cycle system according to the twenty-fourth embodiment.

A twenty-fourth preferred embodiment of the present invention will be now described with reference to FIGS. 40–42. In the twenty-fourth embodiment, an oil-returning pipe 505, through which liquid refrigerant having a large mixing ratio of lubricating oil is introduced into the compressor 100, is provided. As shown in FIG. 40, refrigerant flowing from the ejector 400 flows into the gas-liquid separator 500 to be separated into gas refrigerant and liquid refrigerant in the gas-liquid separator 500. Gas refrigerant separated in the gas-liquid separator 500 is sucked into the compressor 100, and liquid refrigerant separated in the gas-liquid separator 500 is introduced into the evaporator 300.

In the twenty-fourth embodiment, a mineral oil such as polyglycol (PAG) having a liquid density larger than that of refrigerant is used as the lubricating oil, and the oil-returning pipe 505 is connected at a most bottom position of the gas-liquid separator 500. Therefore, the lubricating oil separated from refrigerant in the gas-liquid separator 500 can be returned to the refrigerant suction side of the compressor 100. Here, the lubricating oil separated from refrigerant does not mean a pure lubricating oil, but means a liquid fluid including a large amount of the lubricating oil.

A decompression unit such as a capillary tube and a fixed throttle is disposed in the refrigerant passage between the gas-liquid separator 500 and the evaporator 300, so that refrigerant flowing into the evaporator 300 can be sufficiently decompressed. In the twenty-fourth embodiment, the ejector 400 has the structure similar to the above-described first embodiment, as shown in FIG. 41.

According to the twenty-fourth embodiment, the oil-returning pipe 505 is provided so that lubricating oil can be introduced to the suction side of the compressor 100 through the oil-returning pipe 505. Therefore, even when the ejector cycle system continuously operates in a long time, the lubricating oil can be sufficiently supplied to the compressor 100. Accordingly, a breakdown of the compressor 100, due to an insufficient lubricating oil, can be effectively prevented, and durability of the ejector cycle system can be improved.

Figure 42:
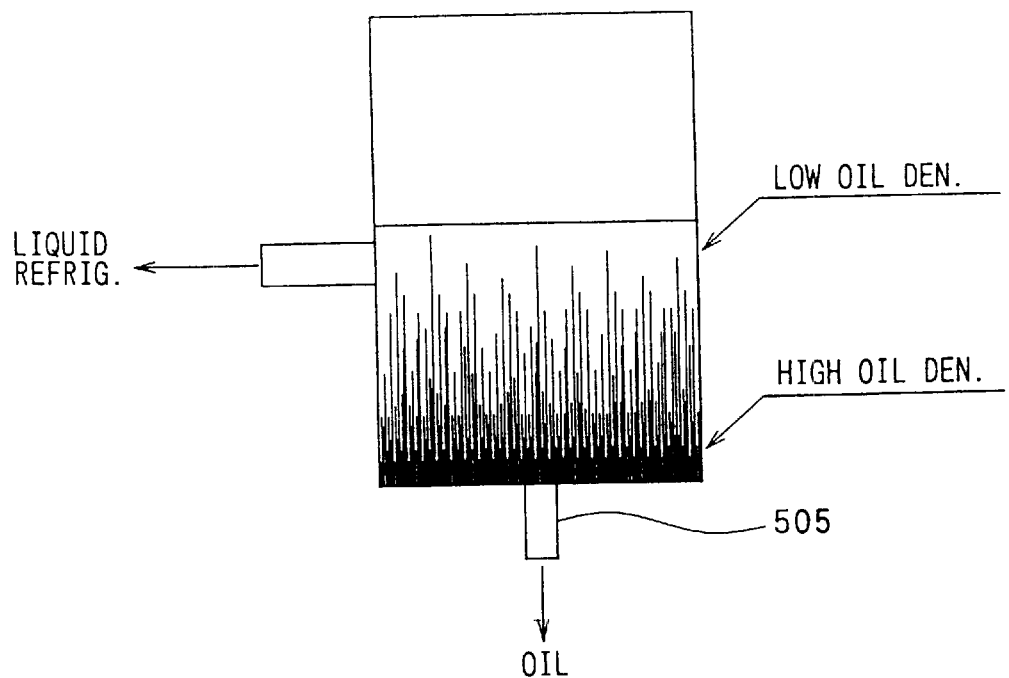
FIG. 42 is a schematic diagram showing a gas-liquid separator for the ejector cycle system according to the twenty-fourth embodiment.

In the twenty-fourth embodiment of the present invention, the lubricating oil having the liquid density larger than that of liquid refrigerant is used, the lubricating oil has a density distribution as shown in FIG. 42. That is, in liquid refrigerant within the gas-liquid separator 500, the bottom side has a high oil density, and the liquid surface side has a low oil density. Accordingly, in the twenty-fourth embodiment, the lubricating oil can be sufficiently supplied to the compressor 100, while liquid refrigerant having the low oil density is supplied to the evaporator 300. Therefore, lubricating oil stayed in the evaporator 300 can be reduced, and heat exchanging capacity (cooling capacity) of the evaporator 300 can be improved. In addition, because the oil-returning pipe 505 is connected to the bottom of the gas-liquid separator 500, lubricating oil can be sufficiently accurately returned to the compressor 100.

As a result, a breakdown of the compressor 100, due to an insufficient lubricating oil, can be prevented, and the heat-exchanging capacity of the evaporator 300 can be improved while the durability of the ejector cycle system can be improved.

Figure 43:
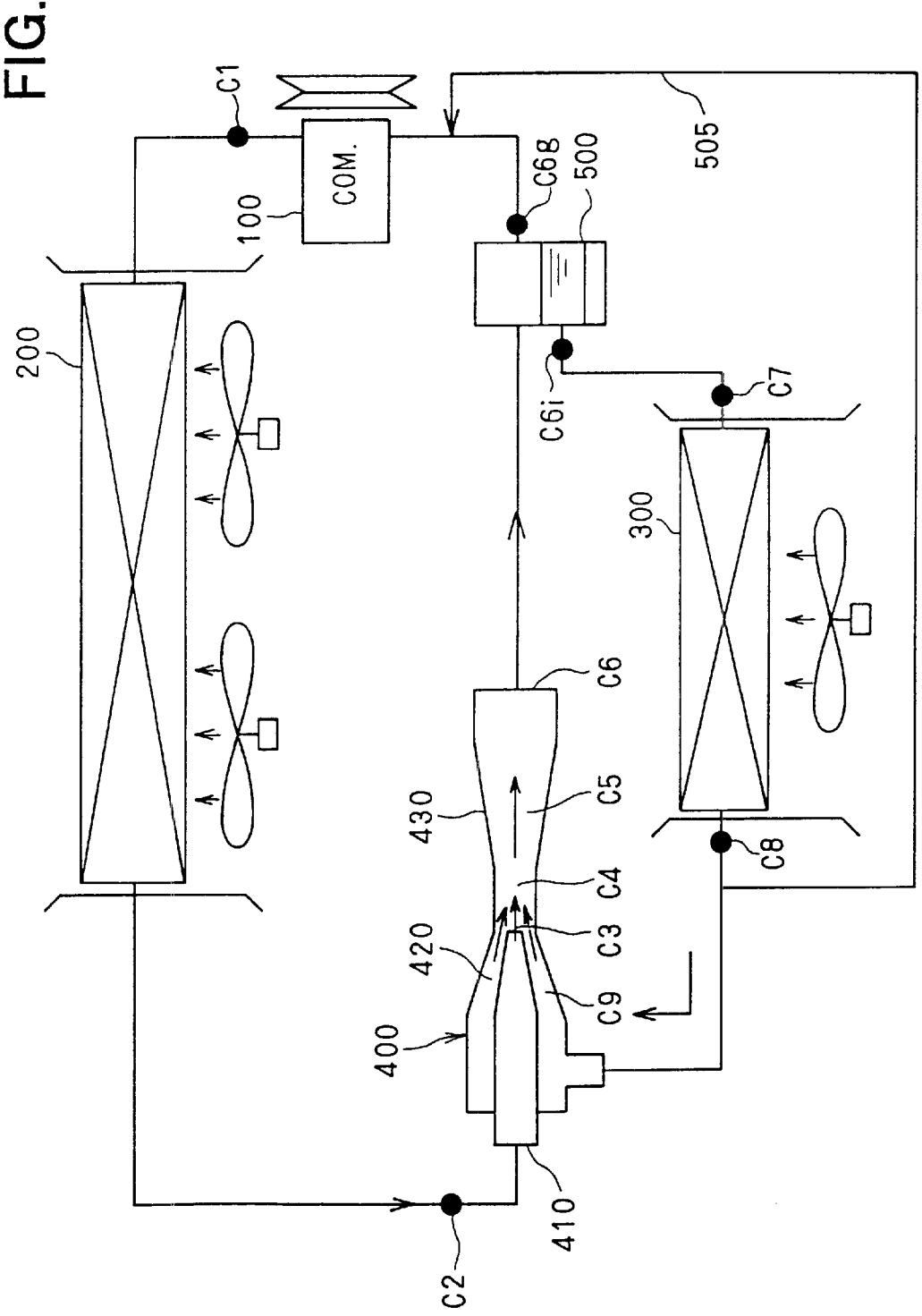
FIG. 43 is a schematic diagram showing an ejector cycle system according to a twenty-fifth preferred embodiment of the present invention.

A twenty-fifth preferred embodiment of the present invention will be now described with reference to FIG. 43. In the above-described twenty-fourth embodiment, the lubrication oil separated from refrigerant in the gas-liquid separator 500 is returned to the suction side of the compressor 100. However, in the twenty-fifth embodiment, as shown in FIG. 43, the oil-returning pipe 505 is connected to the refrigerant outlet side of the evaporator 300, so that lubricating oil stored in the evaporator 300 is returned to the suction side of the compressor 100. Because the liquid lubricating oil is readily separated from gas refrigerant evaporated in the evaporator 300, lubricating oil is relatively readily stored at the refrigerant outlet side of the evaporator 300.

In the twenty-fifth embodiment, the oil-returning pipe 505 is connected to the refrigerant outlet side of the evaporator 300. However, the connection position of the oil-returning pipe 505 can be changed. For example, the oil-returning pipe 505 can be connected to the refrigerant inlet of the evaporator 300, or can be connected to between the refrigerant inlet and the refrigerant outlet of the evaporator 300.

Figure 44:
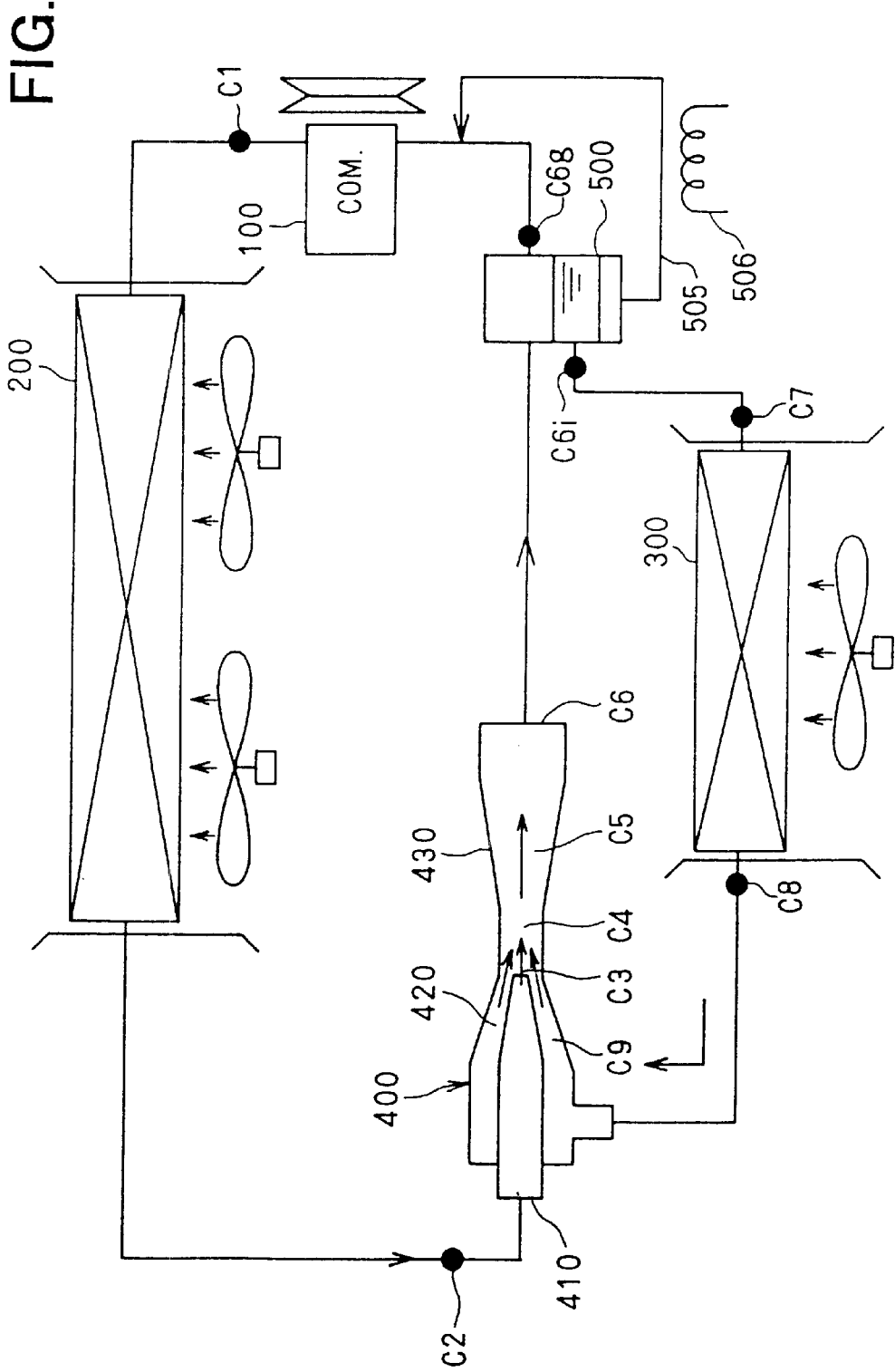
FIG. 44 is a schematic diagram showing an ejector cycle system according to a twenty-sixth preferred embodiment of the present invention.

A twenty-sixth preferred embodiment of the present invention will be now described with reference to FIG. 44. Because lubricating oil flowing in the oil-returning pipe 505 is not the pure lubricating oil but is a mixing fluid including liquid refrigerant, liquid refrigerant is sucked into the compressor 100 when the mixing fluid is directly introduced into the compressor 100. In this case, compression operation of the compressor 100 may be excessively increased. In the twenty-sixth embodiment, as shown in FIG. 44, an electrical heater 506 for heating the mixed fluid flowing in the oil-returning pipe 505 is disposed. Accordingly, liquid refrigerant, among the mixed fluid flowing in the oil-returning pipe 505, can be gasified (evaporated), and it can prevent liquid refrigerant from being sucked into the compressor 100. Accordingly, it can prevent the compression operation of the compressor 100 from being unnecessary increased.

Figure 45:
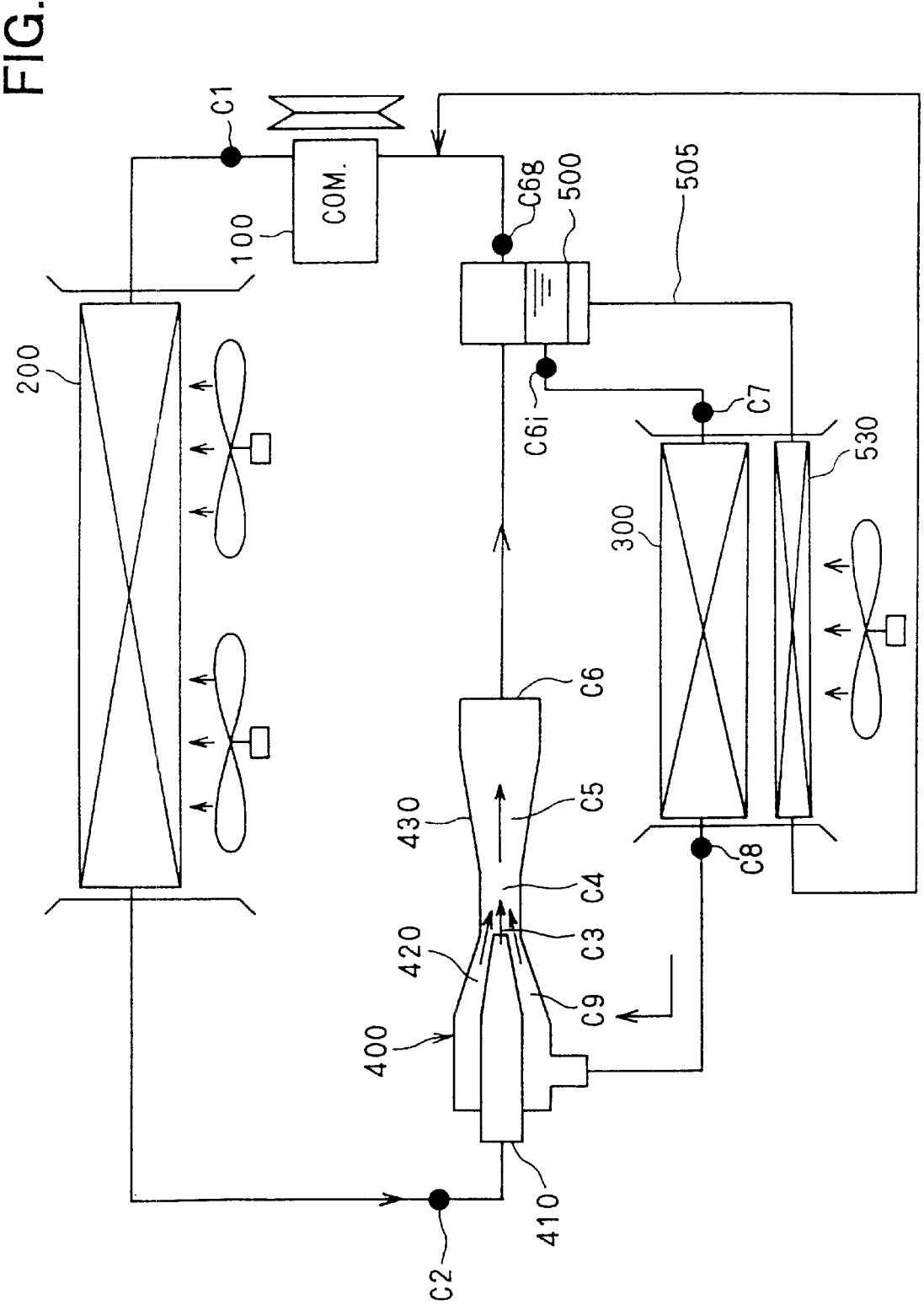
FIG. 45 is a schematic diagram showing an ejector cycle system according to a twenty-seventh preferred embodiment of the present invention.

A twenty-seventh preferred embodiment of the present invention will be now described with reference to FIG. 45. In the above-described twenty-sixth embodiment, the mixed fluid flowing through the oil-returning pipe 505 is heated by the electrical heater 506. However, in the twenty-seventh embodiment, a heat exchanger 530 is disposed at an upstream air side of the evaporator 300 so that the mixed fluid flowing through the oil-returning pipe 505 is heated with air in the heat exchanger 530. Accordingly, in the twenty-seventh embodiment, the advantage similar to the above-described twenty-sixth embodiment can be obtained.

Figure 46:
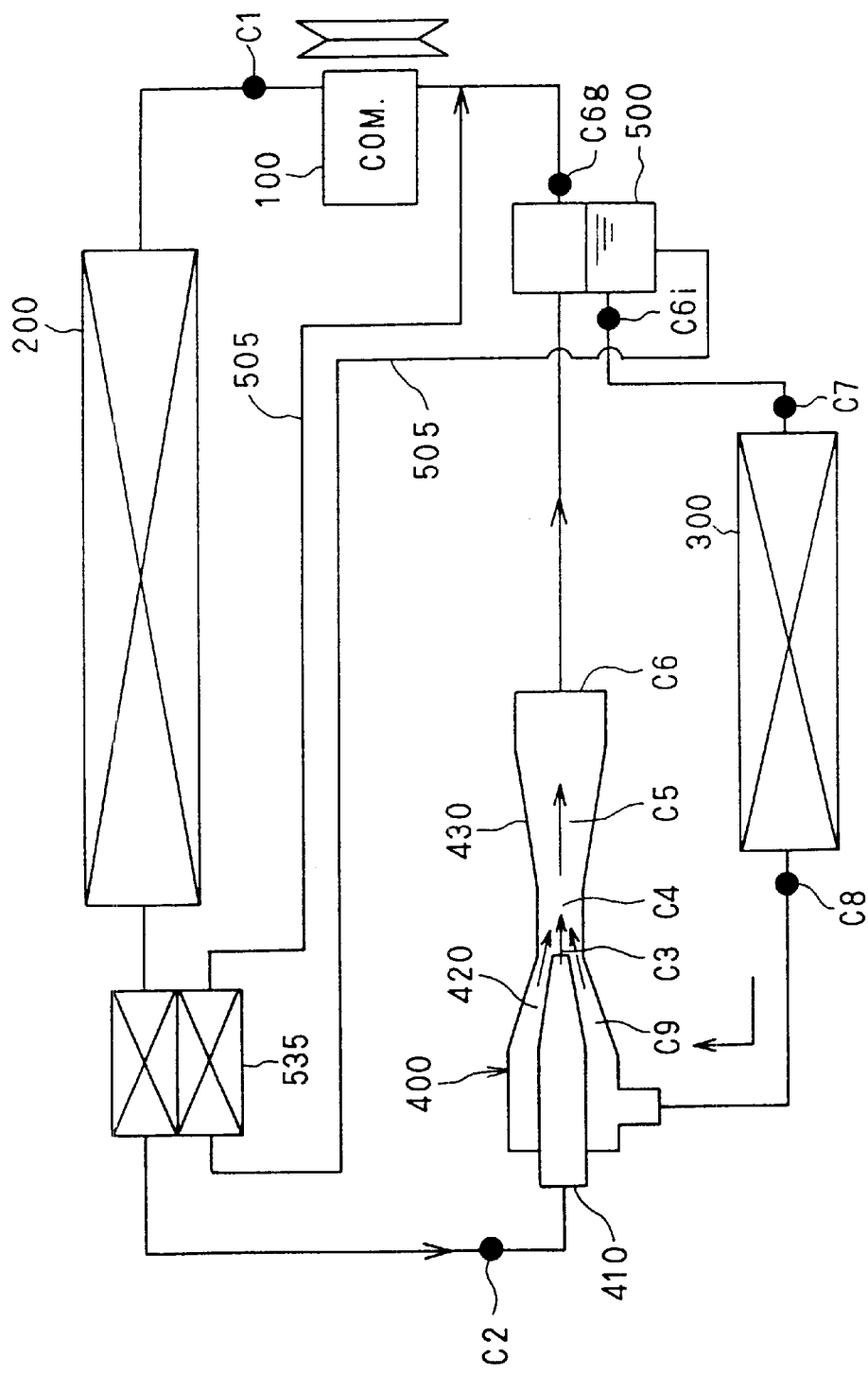
FIG. 46 is a schematic diagram showing an ejector cycle system according to a twenty-eighth preferred embodiment of the present invention.

A twenty-eighth preferred embodiment of the present invention will be now described with reference to FIG. 46. In the twenty-eighth embodiment, as shown in FIG. 46, a heat exchanger 535, for performing a heat exchange between the mixed fluid flowing through the oil-returning passage 505 and high-pressure side refrigerant from an outlet side of the radiator 200 is provided, so that the mixed fluid sucked into the compressor 100 is heated. Accordingly, in the twenty-eighth embodiment, the advantage similar to the above-described twenty-sixth embodiment can be obtained.

A twenty-ninth preferred embodiment of the present invention will be now described with reference to FIGS. 47 and 48. In the above-described each embodiment, carbon dioxide is used as refrigerant. However, in the twenty-ninth embodiment, flon is used as refrigerant, and polyglycol is used as the lubricating oil. Because the liquid density of the lubricating oil is smaller than that of liquid refrigerant as shown in FIGS. 47 and 48, an oil suction port 511 communicating with an oil-returning pipe 505 is opened in the liquid refrigerant within the gas-liquid separator 500 at a predetermined position separated from the liquid surface by a predetermined distance.

Figure 47:
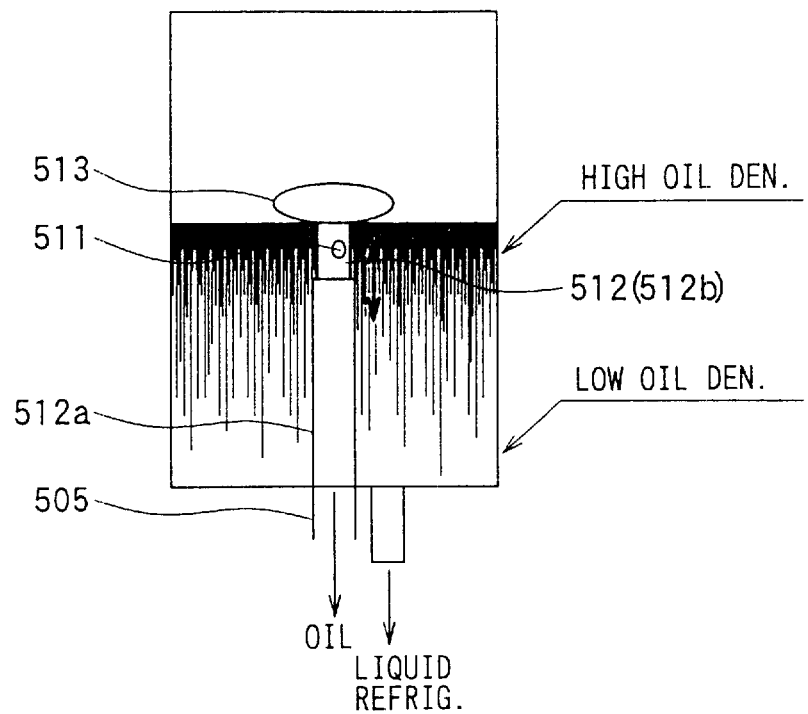
FIG. 47 is a schematic diagram showing a gas-liquid separator for an ejector cycle system according to a twenty-ninth preferred embodiment of the present invention.
Figure 48:
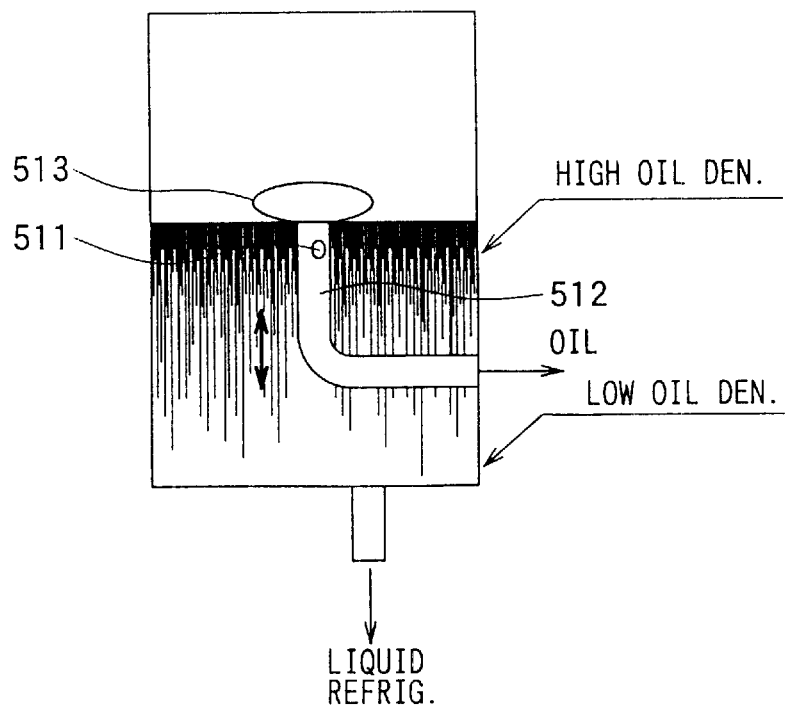
FIG. 48 is a schematic diagram showing an another gas-liquid separator for the ejector cycle system according to the twenty-ninth embodiment.

That is, as shown in FIGS. 47 and 48, a movable connection pipe 512 coupled with the oil-returning pipe 505 is connected to a float 513 floating on the liquid surface. Accordingly, even when the liquid surface of refrigerant in the gas-liquid separator 500 is changed, the oil suction port 511 is always at the predetermined position separated from the liquid surface by the predetermined distance.

In FIG. 47, the movable connection pipe 512 (512b) connected to the float 513 is inserted into the fixed connection pipe 512a connected to the oil-returning pipe 505. On the other hand, in FIG. 48, the movable connection pipe 512 is a flexible pipe made of a flexible material such as rubber.

Although the present invention has been fully described in connection with the preferred embodiments thereof with reference to the accompanying drawings, it is to be noted that various changes and modifications will become apparent to those skilled in the art.

For example, in the above-described first through twenty-eighth embodiments of the present invention, carbon dioxide is used as refrigerant. However, when the refrigerant pressure before being decompressed in the ejector 400 is equal to or higher than the critical pressure of refrigerant, the other refrigerant with super-critical pressure, such as ethylene, ethane and nitrogen oxide can be used. Further, the decompression units 710 and 720 can be disposed at refrigerant upstream and downstream sides of the ejector 400, respectively. Alternatively, the first decompression unit 600 can be omitted by providing a suitable pressure loss part within the refrigerant passage.

In the above-described first through third embodiments, the decompression unit 600, 710, 730 is the fixed throttle unit; however, may be a movable valve in which the opening degree can be variably changed. For example, in the second embodiment, the second decompression unit 710 may be constructed by a movable valve. In this case, when refrigerant pressure after being increased in the diffuser 430 of the ejector 400 is smaller than the critical pressure, the valve opening degree is adjusted so that the pressure loss becomes smaller. On the other hand, when refrigerant pressure after being increased in the diffuser 430 of the ejector 400 is equal to or larger than the critical pressure, the valve opening degree is adjusted so that the refrigerant pressure at the inlet of the gas-liquid separator 500 becomes lower than the critical pressure.

In the above-described second and third embodiments, the refrigerant pressure discharged from the diffuser 430 of the ejector 400 is adjusted to be lower than the critical pressure using the second or third decompression unit 710, 720. However, a refrigerant amount discharged from the compressor 100 may be adjusted by adjusting the rotation speed of the compressor or the like, so that the refrigerant pressure discharged from the diffuser 430 of the ejector 400 may be adjusted lower than the critical pressure.

In the above-described fourth through sixth embodiments, liquid refrigerant is separated and extracted from a position around the outlet of the mixing portion 420. However, liquid refrigerant may be separated and extracted from a position between the inlet of the mixing portion 420 and the outlet of the diffuser 430.

In the above-described ninth through sixteenth embodiments, the ejector cycle system of the present invention is applied to a water heater. However, the ejector cycle system of the present invention may be applied to an air conditioner for the other use. In the above-described ninth through sixteenth embodiments, instead of the compressor 100 adjusted by the electrical motor Mo, the other compressor such as a volume-variable type compressor and a compressor having a constant rotation speed may be used.

In the above-described embodiments, the shape and the structure of the ejector 400 can be changed. For example, the throttle of the nozzle 410 may be constructed by plural steps.

Such changes and modifications are to be understood as being within the scope of the present invention as defined by the appended claims.

What is claimed is:

1. An ejector cycle system comprising:
a compressor for sucking and compressing refrigerant;
a radiator which cools refrigerant discharged from the compressor;
an evaporator in which refrigerant is evaporated by absorbing heat;
an ejector which decompresses and expands refrigerant from the radiator to suck gas refrigerant evaporated in the evaporator, and converts an expansion energy to a pressure energy to increase a refrigerant pressure to be sucked into the compressor;
a gas-liquid separator for storing refrigerant therein, in which refrigerant from the ejector is separated into gas refrigerant and liquid refrigerant;
a pipe member disposed in the gas-liquid separator, through which gas refrigerant in the gas-liquid separator is introduced into the compressor, the pipe member having a hole opened in the liquid refrigerant within the gas-liquid separator, from which oil in the gas-liquid separator is introduced into the compressor; and
a liquid refrigerant introduction pipe through which liquid refrigerant in the gas-liquid separator is introduced into the evaporator, wherein:
the liquid refrigerant introduction pipe has a throttle means for decompressing refrigerant at an outlet side;
the ejector includes a nozzle in which a pressure energy of refrigerant flowing from the radiator is converted to a speed energy so that refrigerant is decompressed and expanded, and a pressure increasing portion in which the pressure of refrigerant to be discharged is increased while refrigerant jetted from the nozzle and gas refrigerant sucked from the evaporator are mixed;
the pressure increasing portion is inserted into the gas-liquid separator such that refrigerant flows through the pressure increasing portion from below upwardly; and
the pressure increasing portion has refrigerant outlet from which refrigerant in the ejector is discharged into the gas-liquid separator.

2. The ejector cycle system according to claim 1, wherein:
at least the nozzle is disposed outside the gas-liquid separator, among the ejector.

3. The ejector cycle system according to claim 1, wherein:
the pipe member is formed into approximately a U-shaped pipe having two opened ends and a bent portion;
one opened end of the U-shaped pipe is opened in an upper space upper than a liquid surface of refrigerant within the gas-liquid separator;
the other opened end of the U-shaped pipe is provided to communicate with the suction side of the compressor; and
the hole is provided in the bent portion of the U-shaped pipe to be opened into the liquid refrigerant under the liquid refrigerant surface.

4. The ejector cycle system according to claim 3, wherein the U-shaped pipe is bent at the bent portion by an approximately 180°.

5. The ejector cycle system according to claim 3, wherein the bent portion is positioned at a bottom side of the U-shaped pipe, and the hole is provided in the bent portion near a bottom surface of the gas-liquid separator.

6. The ejector cycle system according to claim 1, wherein the liquid refrigerant introduction pipe has a reduced sectional area at the outlet side of the liquid refrigerant introduction pipe form the throttle means.

7. The ejector cycle system according to claim 1, wherein the liquid refrigerant introduction pipe is inserted into the gas-liquid separator at a position separated from the ejector, and is coupled to a refrigerant inlet of the evaporator so that liquid refrigerant is introduced into the evaporator through the liquid refrigerant introduction pipe after being decompressed in the throttle means.

8. The ejector cycle system according to claim 1, wherein the liquid refrigerant introduction pipe is inserted into the gas-liquid separator such that the liquid refrigerant flows through the liquid refrigerant introduction pipe from below upwardly within the gas-liquid separator.

9. The ejector cycle system according to claim 1, further comprising a collision all member to which refrigerant form the refrigerant outlet of the pressure increasing portion collides, the collision wall member being disposed in the gas-liquid separator above the refrigerant outlet of the pressure increasing portion.

10. The ejector cycle system according to claim 9, wherein the collision wall member is bonded to an inner wall surface of the gas-liquid separator to have a collision surface facing the refrigerant outlet of the pressure increasing portion.

11. The ejector cycle system according to claim 1, wherein the pressure increasing portion of the ejector is inserted into the gas-liquid separator approximately vertically so that the refrigerant outlet of the pressure increasing portion is opened above a liquid surface in the gas-liquid separator.

* * * * *

UNITED STATES PATENT AND TRADEMARK OFFICE
CERTIFICATE OF CORRECTION

PATENT NO. : 6,574,987 B2  Page 1 of 1
APPLICATION NO. : 10/201057
DATED : June 10, 2003
INVENTOR(S) : Hirotsugu Takeuchi et al.

It is certified that error appears in the above-identified patent and that said Letters Patent is hereby corrected as shown below:

Title page, item [75]
Inventor Hiroshi Ishikawa, "Kariya (JP)" should be
-- Hazu-gun (JP) --
Title Page, item [30] Foreign Application Priorty Data
"Jan. 12, 2001 (JP)    2000-5196" should be:
-- Jan. 12, 2001 (JP)    2001-5196 --

Signed and Sealed this

Seventeenth Day of April, 2007

JON W. DUDAS
*Director of the United States Patent and Trademark Office*